Dec. 24, 1940.  J. W. DEHN  2,225,688
TELEPHONE TESTING CIRCUIT
Filed Aug. 9, 1939   43 Sheets-Sheet 1

FIG. 1

| | | | FIG. 22 | FIG. 29 | FIG. 36 | FIG. 43 |
| | | | FIG. 21 | FIG. 28 | FIG. 35 | FIG. 42 |
| FIG. 5 | FIG. 10 | FIG. 15 | FIG. 20 | FIG. 27 | FIG. 34 | FIG. 41 |
| FIG. 4 | FIG. 9 | FIG. 14 | FIG. 19 | FIG. 26 | FIG. 33 | FIG. 40 |
| FIG. 3 | FIG. 8 | FIG. 13 | FIG. 18 | FIG. 25 | FIG. 32 | FIG. 39 |
| FIG. 2 | FIG. 7 | FIG. 12 | FIG. 17 | FIG. 24 | FIG. 31 | FIG. 38 |
| FIG. 6 | FIG. 11 | FIG. 16 | FIG. 23 | FIG. 30 | | FIG. 37 |

INVENTOR
J. W. DEHN
BY P. C. Smith
ATTORNEY

Dec. 24, 1940.  J. W. DEHN  2,225,688
TELEPHONE TESTING CIRCUIT
Filed Aug. 9, 1939  43 Sheets-Sheet 2

INVENTOR
J. W. DEHN
BY P. C. Smith
ATTORNEY

Dec. 24, 1940.  J. W. DEHN  2,225,688
TELEPHONE TESTING CIRCUIT
Filed Aug. 9, 1939  43 Sheets-Sheet 3

INVENTOR
J. W. DEHN
BY P. C. Smith
ATTORNEY

Dec. 24, 1940.  J. W. DEHN  2,225,688
TELEPHONE TESTING CIRCUIT
Filed Aug. 9, 1939   43 Sheets-Sheet 4

INVENTOR
J. W. DEHN
BY P. C. Smith
ATTORNEY

Dec. 24, 1940.  J. W. DEHN  2,225,688
TELEPHONE TESTING CIRCUIT
Filed Aug. 9, 1939  43 Sheets-Sheet 6

INVENTOR
J. W. DEHN
BY P. C. Smith
ATTORNEY

Dec. 24, 1940.    J. W. DEHN    2,225,688
TELEPHONE TESTING CIRCUIT
Filed Aug. 9, 1939    43 Sheets-Sheet 13

INVENTOR
J. W. DEHN
BY P. C. Smith
ATTORNEY

Dec. 24, 1940.   J. W. DEHN   2,225,688
TELEPHONE TESTING CIRCUIT
Filed Aug. 9, 1939   43 Sheets-Sheet 18

INVENTOR
J. W. DEHN
BY P. C. Smith
ATTORNEY

Dec. 24, 1940.            J. W. DEHN            2,225,688
                    TELEPHONE TESTING CIRCUIT
              Filed Aug. 9, 1939        43 Sheets-Sheet 21

INVENTOR
J. W. DEHN
BY P. C. Smith
ATTORNEY

Dec. 24, 1940. J. W. DEHN 2,225,688
TELEPHONE TESTING CIRCUIT
Filed Aug. 9, 1939 43 Sheets-Sheet 28

INVENTOR
J. W. DEHN
BY
P. C. Smith
ATTORNEY

Dec. 24, 1940.  J. W. DEHN  2,225,688
TELEPHONE TESTING CIRCUIT
Filed Aug. 9, 1939   43 Sheets-Sheet 31

INVENTOR
J. W. DEHN
BY P. C. Smith
ATTORNEY

Dec. 24, 1940.   J. W. DEHN   2,225,688
TELEPHONE TESTING CIRCUIT
Filed Aug. 9, 1939   43 Sheets-Sheet 36

FIG. 36

INVENTOR
J. W. DEHN
BY
P. C. Smith
ATTORNEY

Dec. 24, 1940.  J. W. DEHN  2,225,688
TELEPHONE TESTING CIRCUIT
Filed Aug. 9, 1939  43 Sheets-Sheet 37

INVENTOR
J. W. DEHN
BY
P. C. Smith
ATTORNEY

Dec. 24, 1940.  J. W. DEHN  2,225,688
TELEPHONE TESTING CIRCUIT
Filed Aug. 9, 1939   43 Sheets-Sheet 40

INVENTOR
J. W. DEHN
BY
P. C. Smith
ATTORNEY

Dec. 24, 1940. J. W. DEHN 2,225,688
TELEPHONE TESTING CIRCUIT
Filed Aug. 9, 1939 43 Sheets-Sheet 41

INVENTOR
J. W. DEHN
BY P. C. Smith
ATTORNEY

Dec. 24, 1940.  J. W. DEHN  2,225,688
TELEPHONE TESTING CIRCUIT
Filed Aug. 9, 1939  43 Sheets-Sheet 43

INVENTOR
J. W. DEHN
BY
P. C. Smith
ATTORNEY

Patented Dec. 24, 1940

2,225,688

UNITED STATES PATENT OFFICE 2,225,688

TELEPHONE TESTING CIRCUIT

Joseph W. Dehn, Great Neck, N. Y., assignor to Bell Telephone Laboratories, Incorporated, New York, N. Y., a corporation of New York Application August 9, 1939, Serial No. 289,144

15 Claims. (Cl. 179—175.23)

This invention relates to telephone systems and has for its object to facilitate the maintenance of telephone equipment by improving the means by which such equipment is tested.

The design of new telephone switching equipment requires the redesign of the equipment by which it is tested to maintain it in efficient operating condition. Therefore, just as the use of cross-bar switches in establishing telephone connections has requires the development of new circuits to control such switches, the use of the new control equipment requires modified test equipment. The present invention is directed to such test equipment.

More specifically, the invention relates to routine testing equipment for the senders which control telephone connections in cross-bar type offices.

In accordance with one feature of said invention, the test circuit makes a direct connection with a sender for test purposes and makes an auxiliary connection with the sender through a link circuit for marking the sender busy to service connections, and for testing part of the link circuit.

Terminating senders control markers, to which they are connected through connector circuits and which in turn control the switches. In order to test the reciprocal action between the sender and the marker, the test circuit controls the connector circuit in such a way as to cause the marker, which is seized by a sender under test, to establish a direct connection with the test circuit.

The test circuit connects itself with the senders to be tested by means of one or more cross-bar switches and has means for operating the cross points of the switch in sequence, with means for indicating the completion of each operation.

These and other features of the invention will be more clearly understood from a consideration of the following description in connection with the attached drawings, in which:

Fig. 1 shows the manner in which Figs. 2 to 43 should be arranged;

Figure 2:
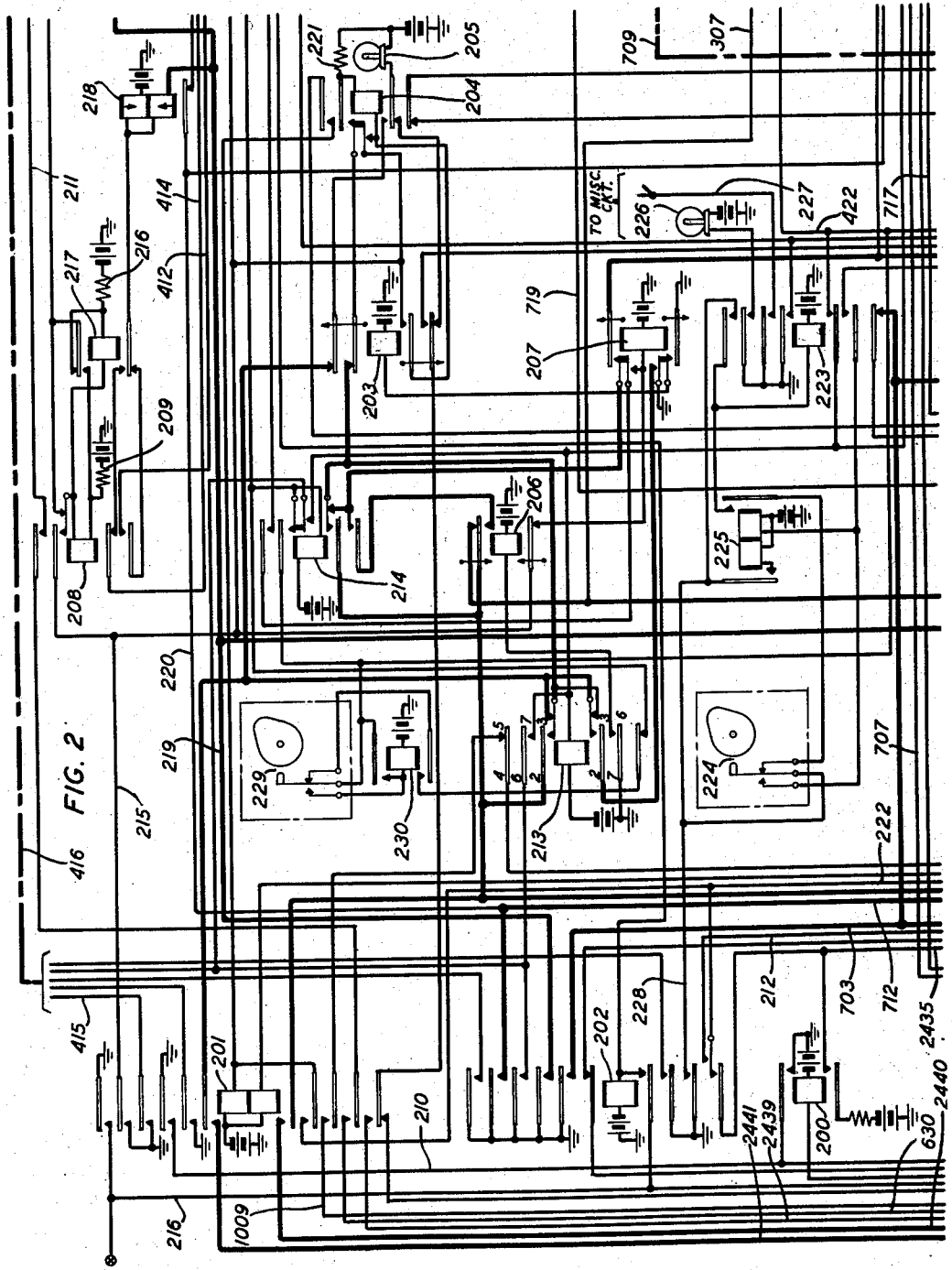
Figs. 2, 3, 4, 7 and 9 show a terminating sender.
Figure 3:
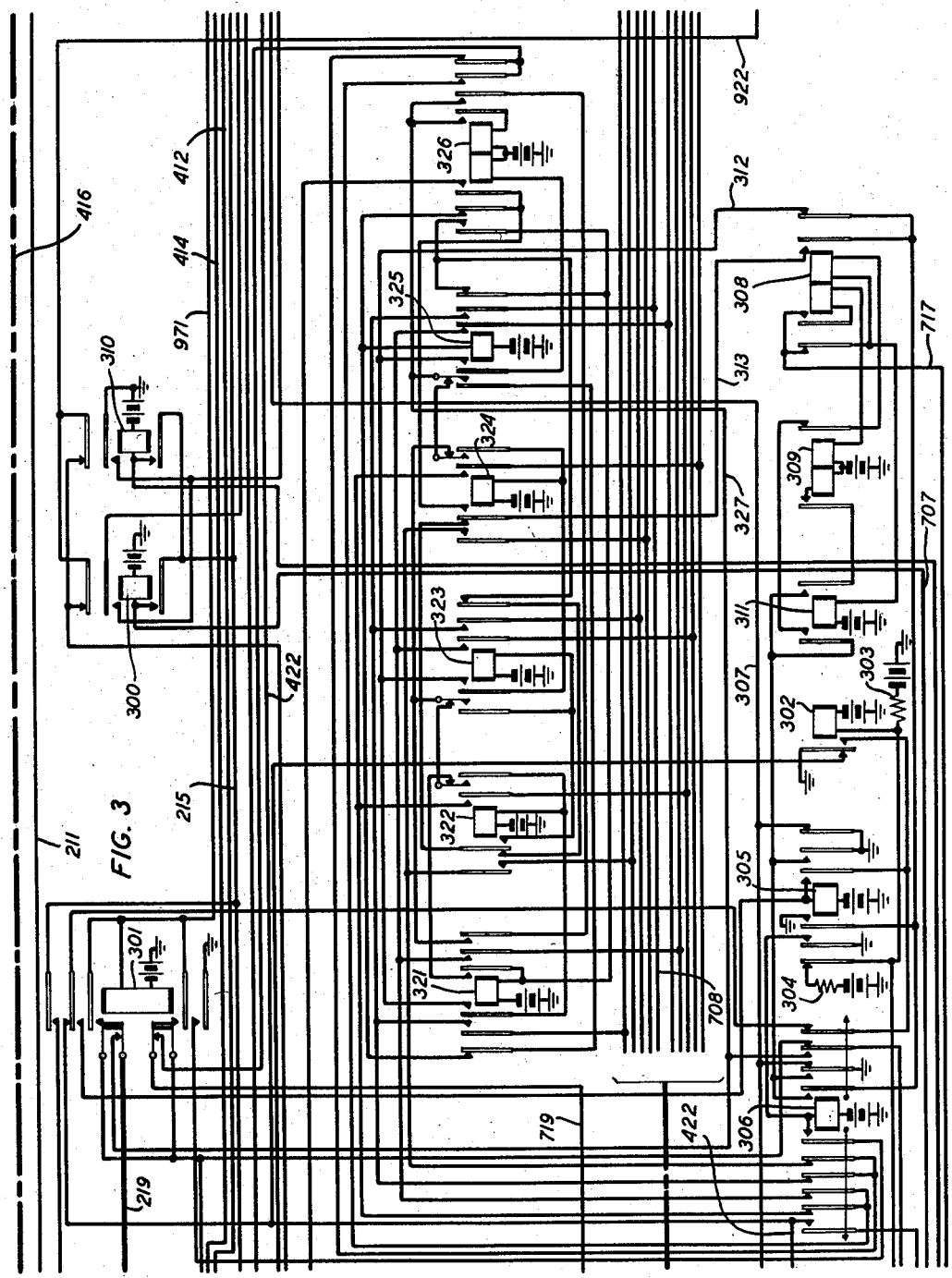
Figure 4:
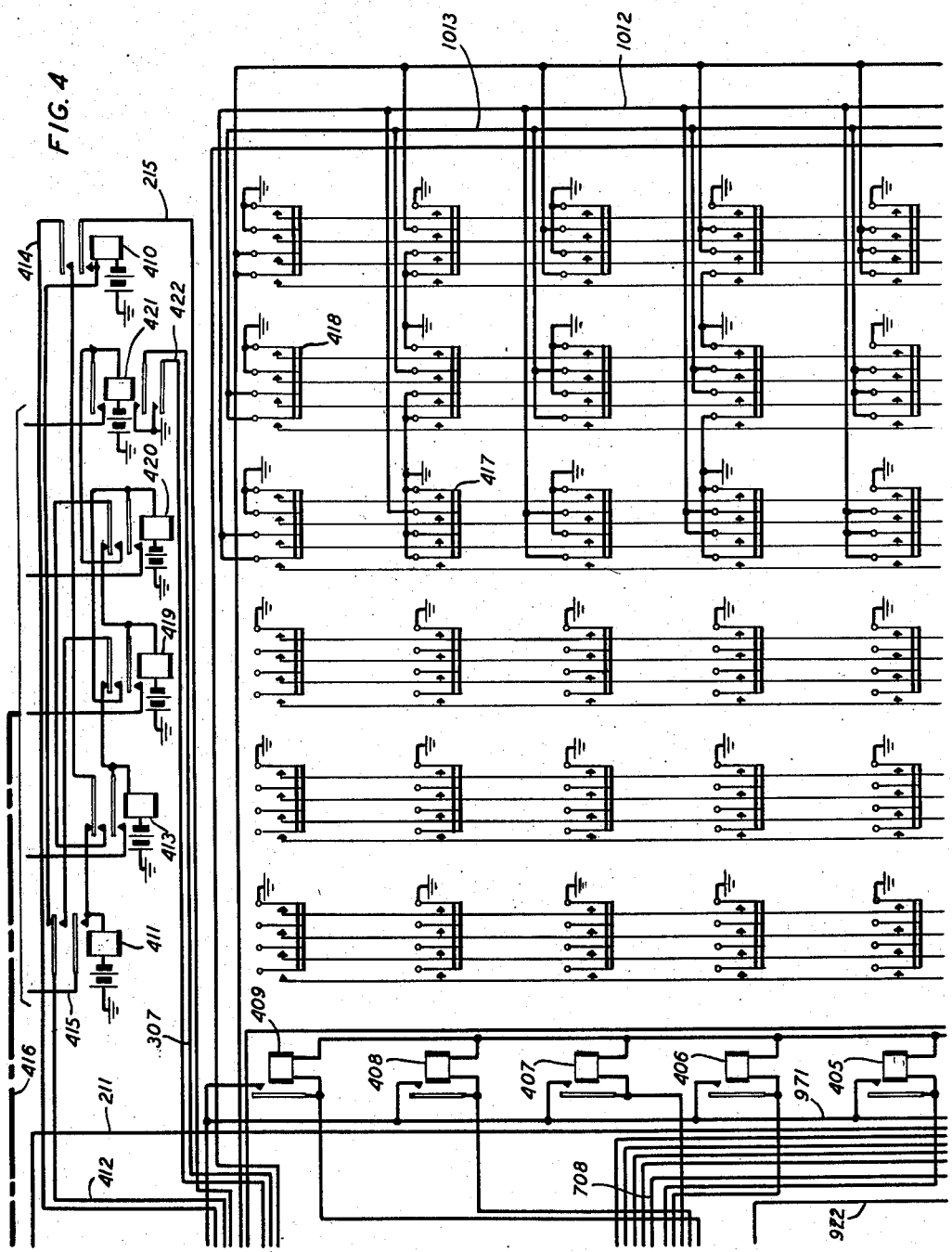
Figure 5:
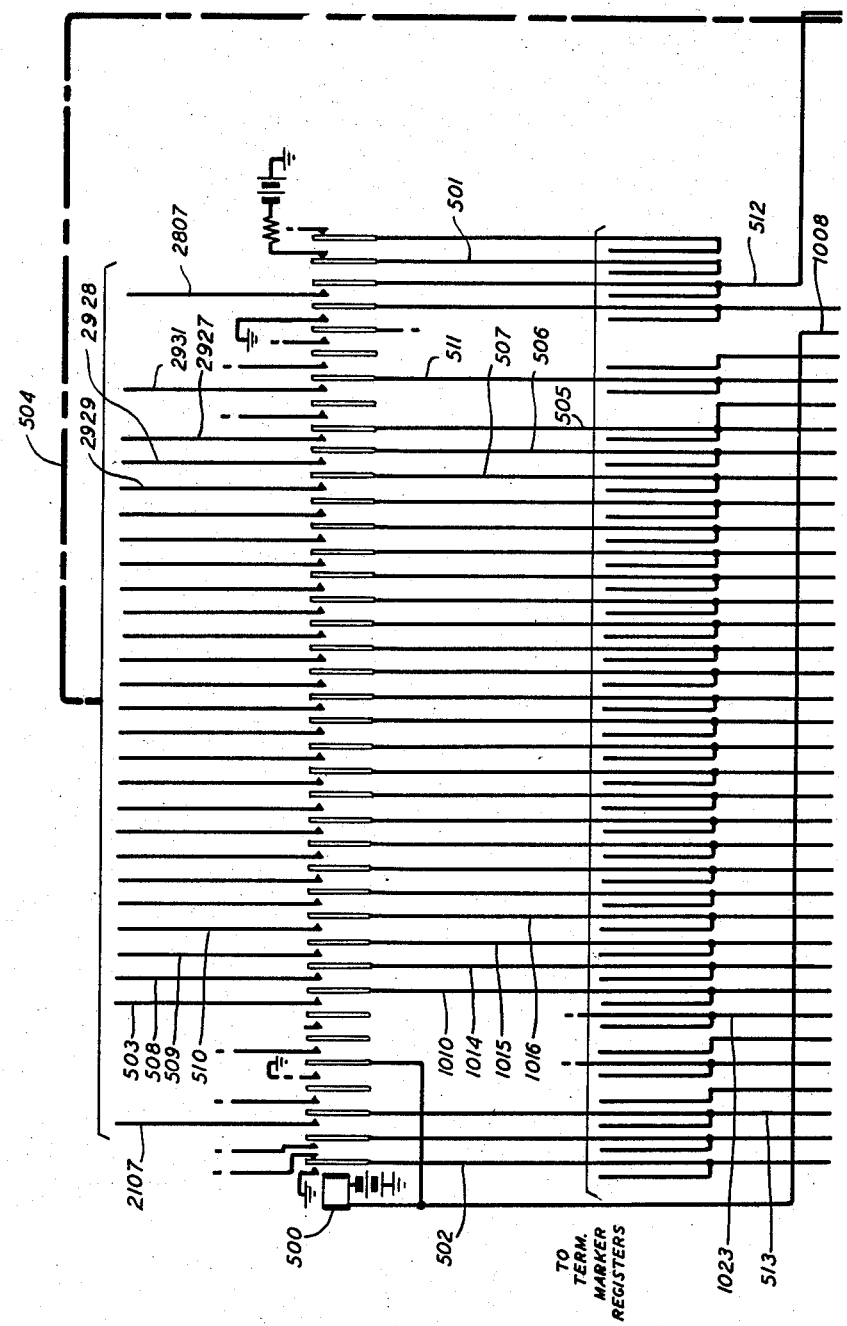
Fig. 5 shows a part of a marker.
Figure 6:
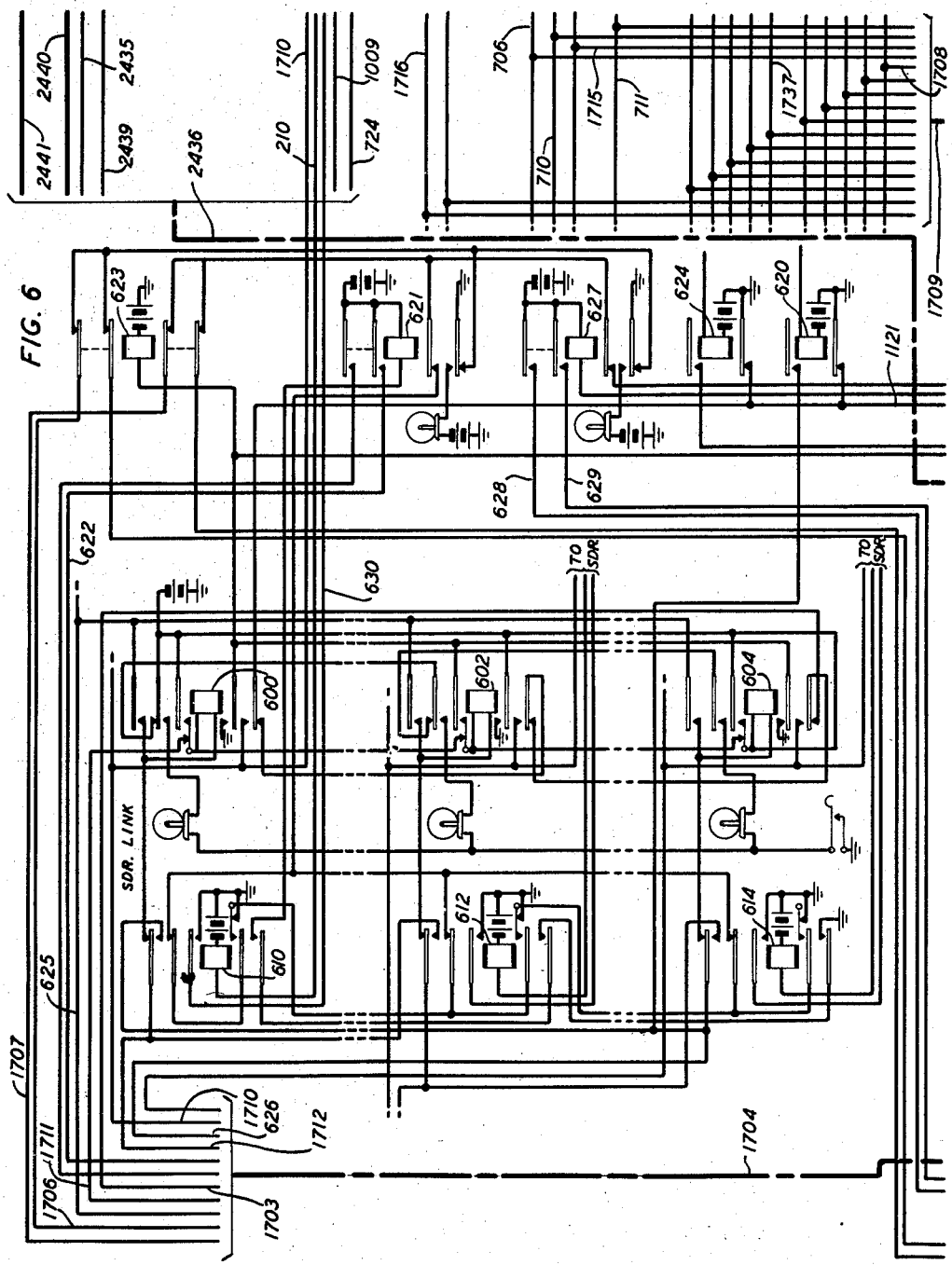
Figs. 6 and 11 show a link circuit.
Figure 7:
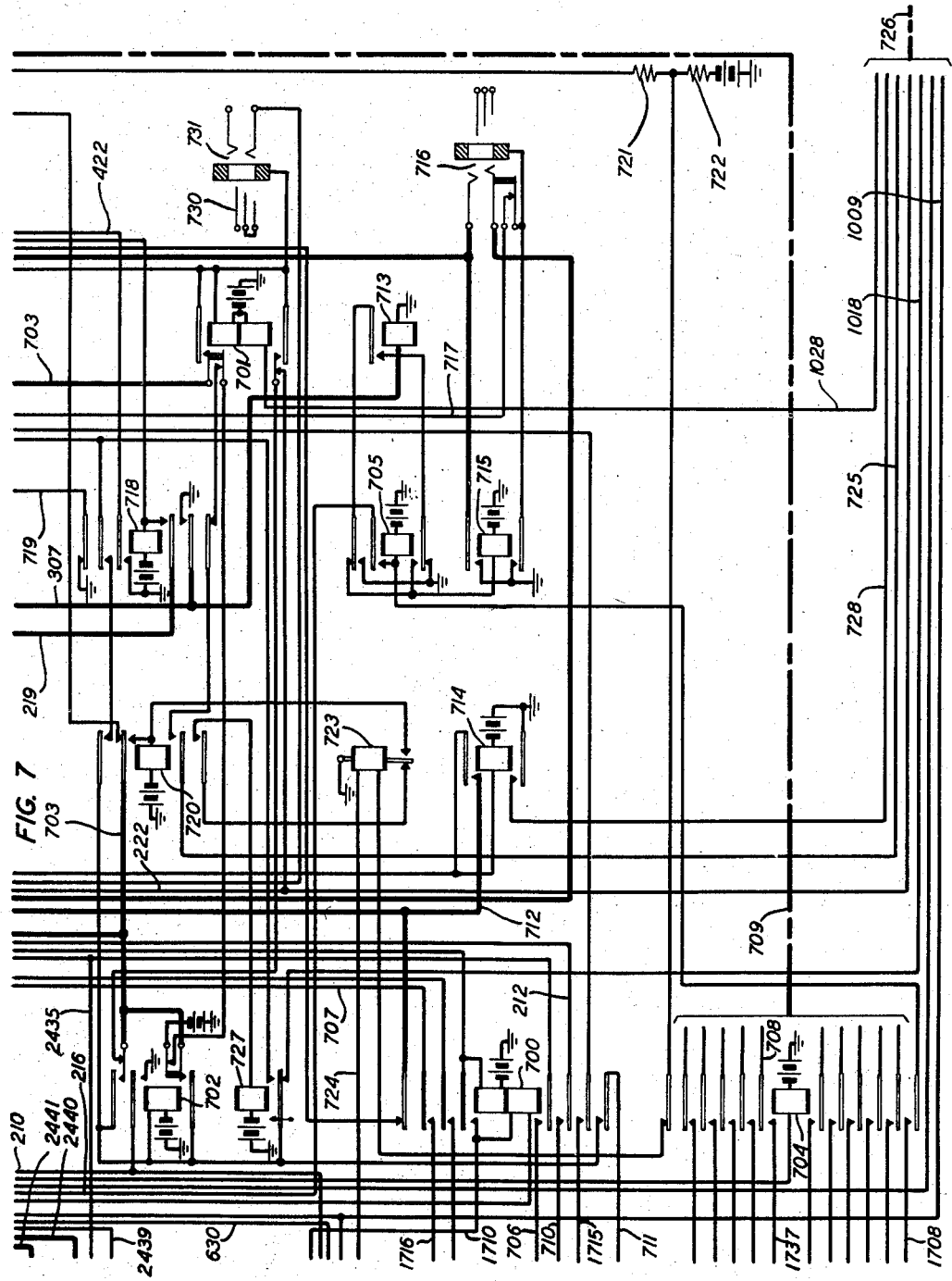

Figs. 16 to 43 show the sender test circuit, in which Figs. 16 to 20 and 23 to 27 show the connector circuit, Figs. 21, 22, 28 and 29 show the register check circuit, Figs. 30, 31, 37 and 38 show the sender group test circuit, Figs. 32 to 34 and 39 to 41 show the revertive pulsing test circuit, Figs. 35, 36, 42 and 43 show the key pulsing test circuit.

The terminating sender is similar to that shown in U. S. Patent No. 2,089,921, granted to W. W. Carpenter on August 10, 1937, while the "B" operator's sender is disclosed in U. S. Patent No. 2,075,527, granted to F. A. Korn et al. March 30, 1937. Reference is made to these patents for details in the sender operation which may be omitted from the present description.

As indicated above, the sender test circuit is divided into sections according to the function to be performed, although all sections cooperate in making a test. Briefly, the connector controls the connection of the various units of the test circuit to the senders. The group test circuit makes a busy test of the sender to be selected and of the sender group circuit of the sender link. The revertive pulsing test circuit sets up a registration on a revertive pulsing basis in the terminating sender and tests for completion of the registration or faulty registration. The key pulsing circuit sets up registrations in "B" position senders on a key pulsing basis. The register check circuit receives the information transmitted from the sender to the marker and compares it with that sent to the sender.

DETAILED DESCRIPTION

Regular call test

This circuit is arranged to make one test as determined by a test class key on each sender and therefore, before starting a test, it is necessary to operate one of the class keys 2500 to 2503, 1804 to 1807 and also a set of frame keys and a set of numerical keys. Assuming first that the senders are to be tested for a regular call, key 2500 will be operated. As an example, frame keys 3810 and 3804 may be operated as well as numerical keys 3912, 3227, 3239 and 3943. The numerical keys are common to the revertive pulsing and the key pulsing circuits. Other special test keys would also be operated at this time but for the first test to be described, it will be assumed that no such keys are operated. When these control keys have been operated, start key 1900 is operated, closing a circuit from battery, through the winding of start relay 2600, contact of key 1900, conductor 1901, to ground at the upper back contact of relay 2700.

The operation of relay 2600 starts the time alarm circuit, which functions as described hereinafter.

Relay 2600 also starts the selection of a sender for test. To this end it closes a circuit from ground over its inner lower and upper contacts, normal contacts of relay 2605, inner upper back contact of relay 1914, lower back contact of relay 1808, normal contact and winding of relay 2000, resistance 2001 and battery. Relay 2000 operates in this circuit, locking over its inner lower front contact, conductor 2002 to ground at the inner right contact of key 1915. Relay 2000 closes a circuit from battery through resistance 2003, winding of relay 2004, alternate contact of relay 2000 to ground over conductor 2002, but relay 2004 does not operate, being shunted by a branch of the operating circuit of relay 2000. Relay 2000 also closes a circuit from ground over the outer right normal contact of key 1915, conductor 1916, outer upper front contact of relay 2000, inner lower back contact of relay 2005, outer lower back contact of relay 2004, lower back contact of relay 2700, conductor 2701, back contact of hold magnet 2419 of the cross-bar switch shown in Fig. 24, and over the back contacts of the odd-numbered magnets of the same series, conductor 2430, back contact of relay 1609, auxiliary to the tenth select magnet 2429 of the switch of Fig. 24, conductor 1620, outer lower back contact of relay 2005, to the winding of relay 2702 and battery. Relay 2702 operates and locks over its inner upper front contact, upper normal contact of relay 2005, outer upper front contact of relay 2000, to grounded conductor 1916. Relay 2702 closes an obvious circuit for relay 2703 which closes a circuit from ground at its front contact, conductor 2704 to battery through the winding of relay 2320.

The operation of relay 2320 opens the operating circuits for relays 2300 to 2304, 1605 to 1609. It also closes a circuit from ground on conductor 2002, front contact of relay 2320, conductor 2321, outer lower front contact of relay 2702, normal contact and winding of relay 2705, resistance 2706 to battery. Relay 2705 operates in this circuit and locks over its alternate contact to grounded conductor 2002. It prepares a circuit for relay 2707 from battery through resistance 2708, winding of relay 2707, alternate contact of relay 2705 to grounded conductor 2002. However, relay 2207 cannot operate at this time since its winding is shunted by a branch of the operating circuit of relay 2706.

With relay 2705 operated a circuit is closed from grounded conductor 1916, outer upper front contact of relay 2705, inner lower back contact of relay 2707, conductor 2709, back contacts of auxiliary relays 1607, 1605, 2303 and 2301, conductor 2330, winding of select magnet 2420 and battery. Magnet 2420 operates and extends its operating ground over its front contact, conductor 2431, outer lower back contact of relay 2707, inner lower front contact of relay 2702 to the winding of relay 2005 and battery. Relay 2005 operates and locks over its inner upper front contact and the outer upper front contact of relay 2000 to conductor 1916. At the same time relay 2005 opens the operating and locking circuits of relay 2702 which releases, in turn releasing relay 2703. Relay 2005 also connects ground over its inner lower front contact, inner upper front contact of relay 2705 to conductor 2431, locking select magnet 2420. The release of relay 2702 opens the shunt around the winding of relay 2707 and that relay now operates. Relay 2707 opens the operating circuit for select magnet 2420 and closes a substitute locking circuit for that magnet from conductor 2431, inner upper front contact of relay 2707 to grounded conductor 1916.

The release of relay 2703 opens the circuit of relay 2320, connecting relays 2300 to 2304 and 1605 to 1609 in parallel with the windings of select magnets 2420 to 2429. Since magnet 2420 is operated and locked, the locking ground for magnet 2420 is extended over the lowermost back contact of relay 2320 to the winding of relay 2300. Relay 2300 operates and locks over its inner right front contact to conductor 2330 and over the front contact of magnet 2420 to the locking ground for that magnet. Relay 2300 lights lamp 2310 to indicate the operation of the No. 0 level of the cross-bar switch of Fig. 24.

Relay 2300 also closes a circuit from ground at the second lower front contact of start relay 2600, conductor 2609, inner and middle left front contacts of relay 2300, conductors 2331 and 2332 to the windings of multicontact relays 1700, 1701 and 1702 to connect the test circuit with the sender link circuit.

Relay 2703 in releasing, after an interval, closes a circuit from ground over its back contact, outer lower front contact of relay 2005, conductor 2007, windings of hold magnets 2400 and 2410 to battery. When hold magnet 2400 operates, it connects ground to conductor 2437 which extends through cable 2438 to the winding of relay 1800 and battery. Relay 1800 closes an obvious circuit for lamp 1820, identifying the position of the sender under test in the selected level.

In order to obtain the necessary number of circuits between the test circuit and the sender, two cross-points are needed for each sender and therefore a twenty vertical switch is used to give access to one hundred senders, the hold magnets being operated in pairs.

Hold magnets 2400 and 2410 close two cross-points on the cross-bar switch which correspond to these two hold magnets and the operated select magnet, closing eight contacts. Over these contacts circuits are closed for testing the sender, six being effective if a terminating sender is tested and seven if a "B" sender is being tested.

Means for connecting with but one hundred senders is shown, although it is to be understood that the modification of the circuit to test a greater number is within the contemplation of the invention.

Magnets 2400 and 2410 close a circuit from ground on their operating circuit, inner front contacts of magnets 2400 and 2410, conductor 2432, outer upper back contact of relay 2004, lower winding of relay 2605 and battery. Relay 2605 locks over its inner lower front contact and the outer upper back contact of relay 1914 to ground at the middle upper front contact of relay 2005. Relay 2605 closes a locking circuit for magnets 2400 and 2410 from conductor 2432, inner upper front contact of relay 2000, inner upper front contact of relay 2605, inner upper front contact of relay 2600 to grounded conductor 2002.

The operation of relay 2605 also opens the shunt around the winding of relay 2004 and that relay operates, closing a substitute locking circuit for magnets 2400 and 2410 from conductor 2432, inner upper front contact of relay 2004, conductor 1917 to ground over the inner left normal contact of key 1915. Relay 2004 also opens the operating circuit for magnets 2400 and 2410 as well as the operating circuit for relay 2605.

With relay 2605 operated, the group test circuit of Figs. 30, 31, 37 and 38 is seized. At the time relay 2600 was operated, a circuit was closed from ground at the fourth lower front contact of relay 2600, conductor 2606, inner lower back contact of relay 2008, upper back contacts of relays 2009 and 2010 which connect the test circuit with even and odd-numbered cross-points, respectively, conductor 2011, through cable 2710, right back contact of relay 3003, winding of relay 3700 and battery. Relay 3700 closes an obvious circuit for relay 3701. The circuit of relay 3700 is carried over the back contact of relay 3003 to make sure that this and other relays are normal before permitting this circuit to be used. Relays 3700 and 3701 are operated before this circuit is seized so that they may be energized for a sufficient time to insure a proper releasing time.

When relay 2605 operates to seize the sender group circuit, it closes a circuit from ground at the second lower front contact of relay 2600, conductor 2609, outer upper contact of relay 1908, conductor 3001, outer upper front contact of relay 2605, outer left back contact of relay 2012, conductor 2013, through cable 2711, inner left front contact of relay 3701 to the winding of relay 3702 and battery. At its third left front contact, relay 3702 connects battery to conductor 3703, completing a circuit over that conductor through cable 2711, winding of relay 2009, outer lower front contact of relay 2000, middle upper front contact of relay 2004, to ground over conductor 3001.

Whether relay 2009 or 2010 is to be operated depends, as appears in the above circuit, on the position of relays 2000 and 2004. If an even-numbered hold magnet is operated, relays 2000 and 2004 will be operated as above, causing the operation of relay 2009. If an odd-numbered hold magnet is operated, relays 2000 and 2004 will be normal, causing the operation of relay 2010. Either relay 2009 or 2010 connects the leads from the sender to be tested into the control circuits to be used for this particular test and also removes ground at its uppermost contact from the circuit of relay 3700 to start the busy test circuit of the sender group test circuit.

Relay 2009 also closes a circuit from battery through resistance 2607, conductor 2608, outer upper front contact of relay 2009, conductor 2014 through cable 2015, left-most contact of cross-point 2433, conductor 2434, normal contact of key 2016, conductor 2017 through cable 2710, winding of relay 3004 and ground. Prior to the operation of relay 3004, a holding circuit for relay 3700 is extended over the right back contact of relay 3003, conductor 2011, upper back contact of relays 3004 and 3005, conductor 3006 through cable 2710, inner lower back contact of relay 2008, to grounded conductor 2606, while another holding circuit extends from conductor 2011 over the outer left back contact of relay 3704 to conductor 3006 and thence to ground.

The operation of relay 2009 opens the energizing circuit of relay 3700 and the operation of relay 3004 opens one holding circuit for relay 3700.

In the sender group test circuit, relay 3702 closes a circuit from battery through the winding of relay 3110, outer right back contact of relay 3111, conductor 3112, to ground at the inner left front contact of relay 3702 in preparation for a future test. A circuit is also closed from battery through the winding of relay 3113, right back contact of relay 3800 to ground at the outer right front contact of relay 3102. Relay 3113 operates, closing an obvious circuit for relay 3114.

Figure 24:
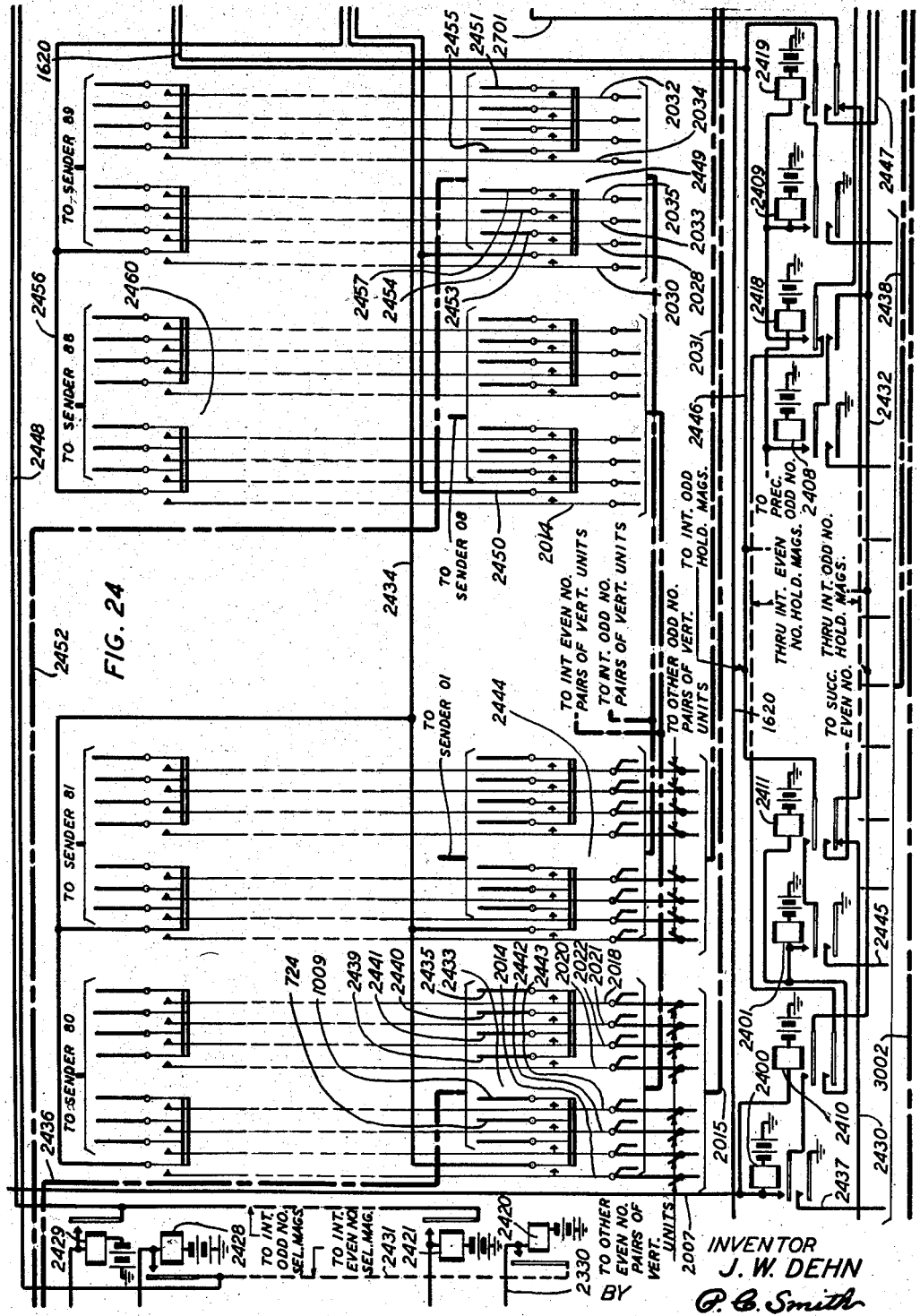
Figure 25:
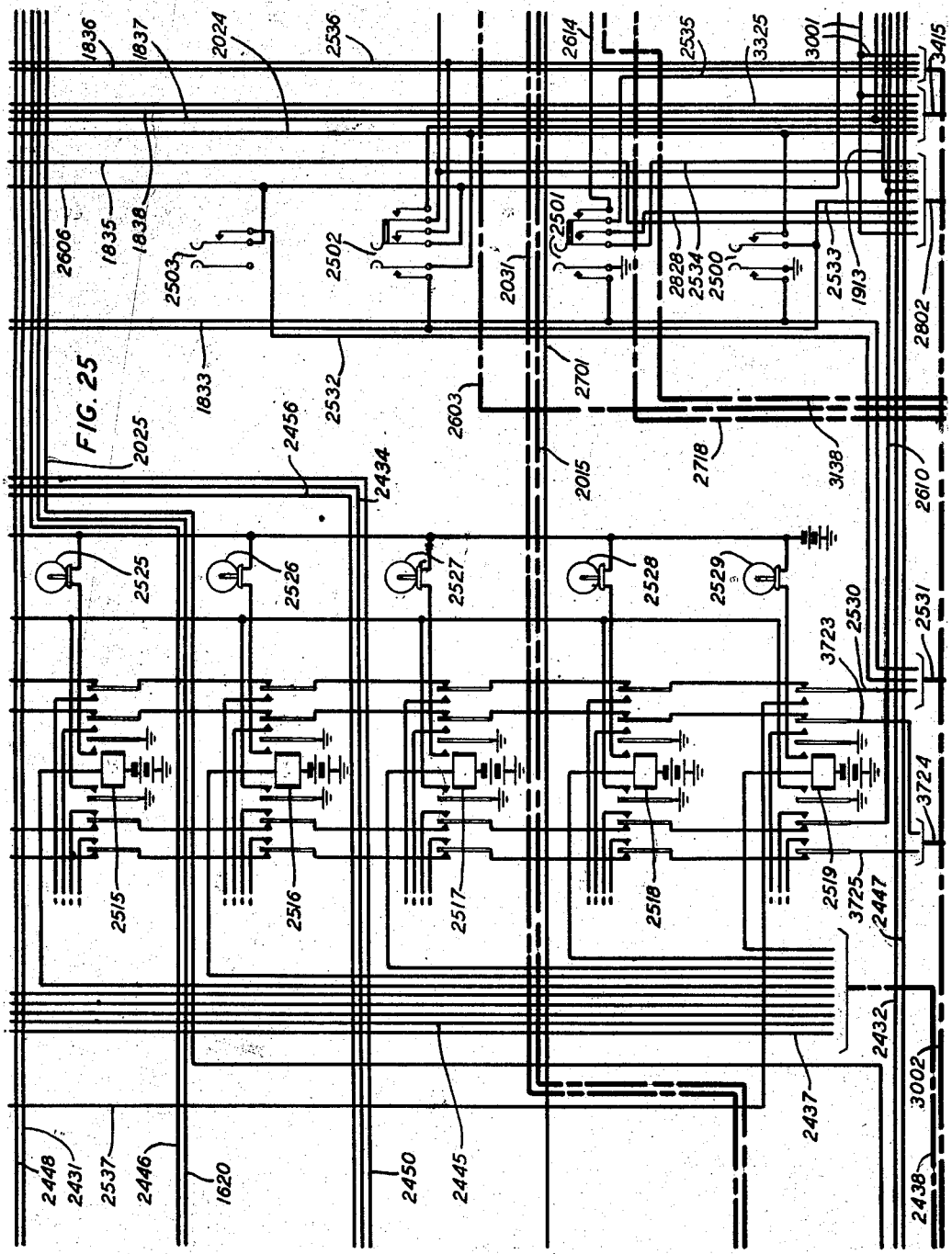
Figure 26:
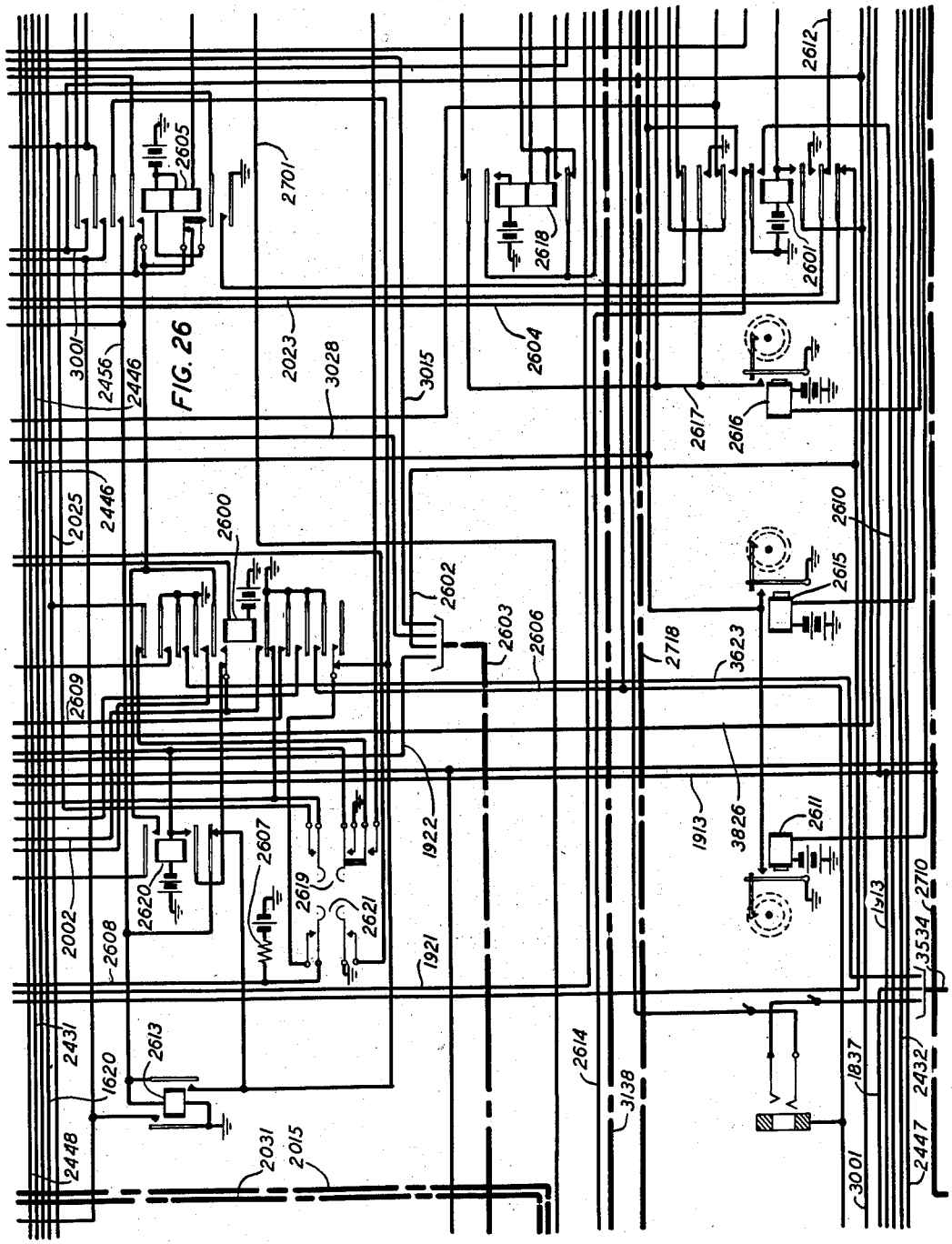
Figure 27:
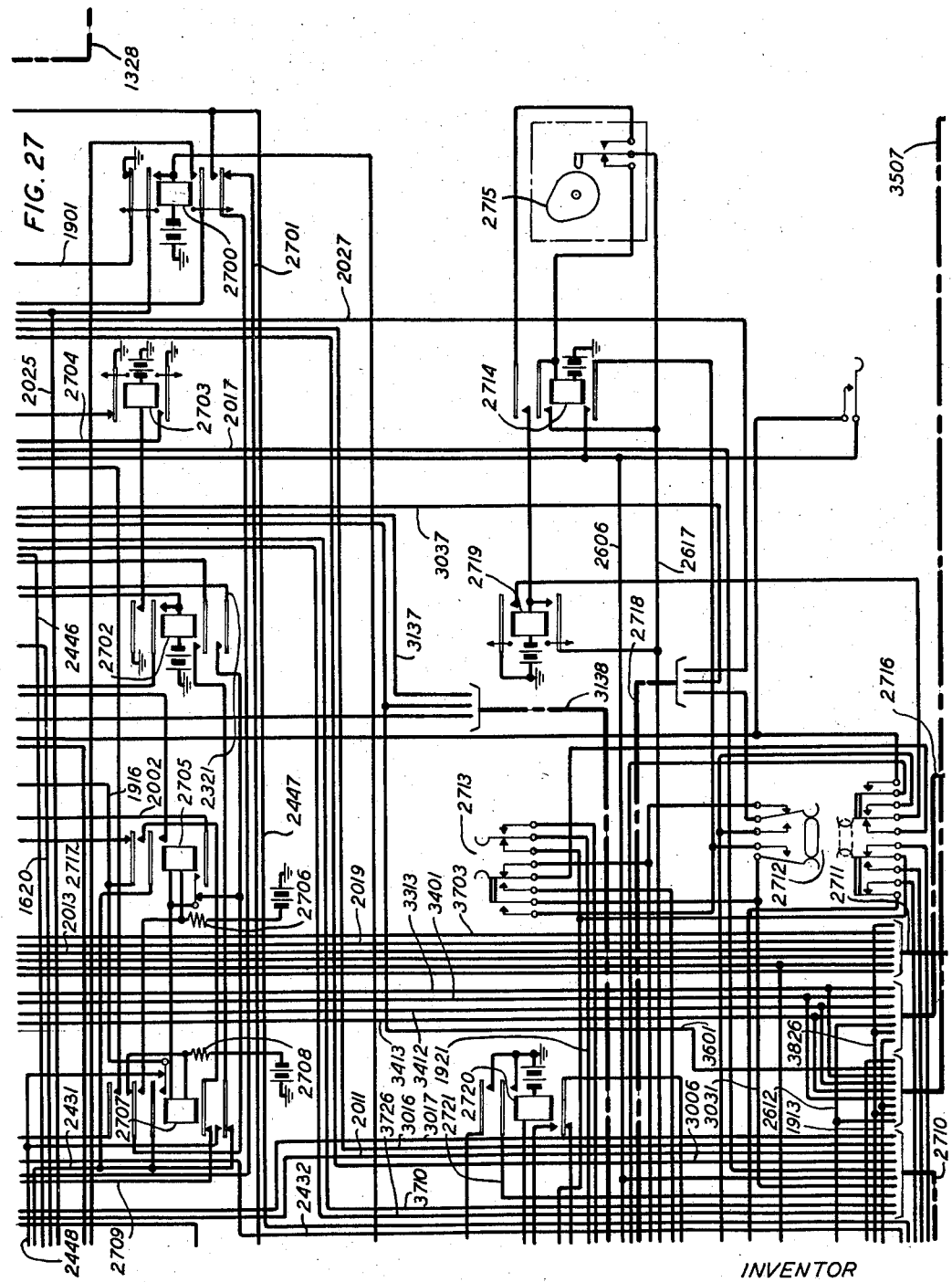
Figure 28:
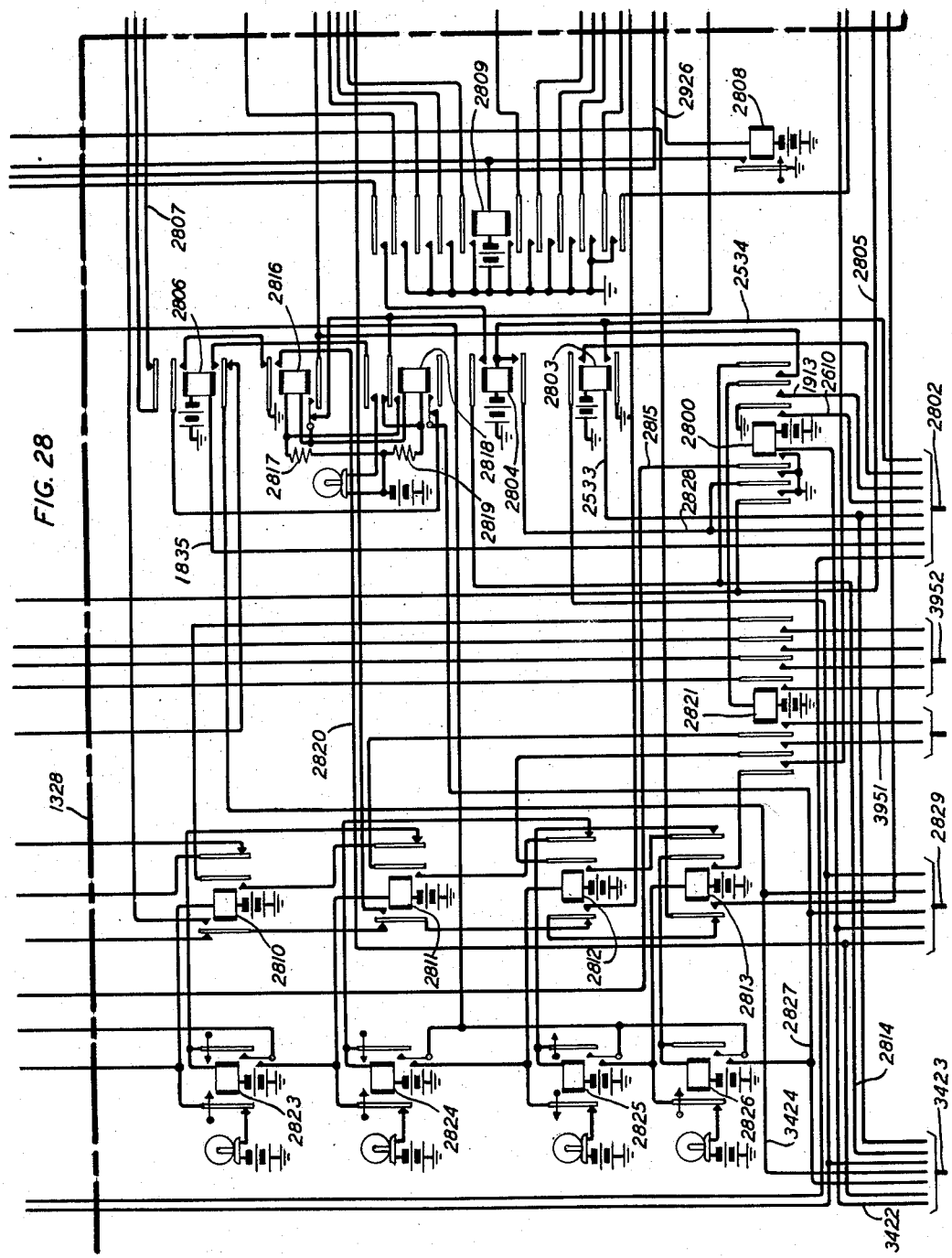
Figure 29:
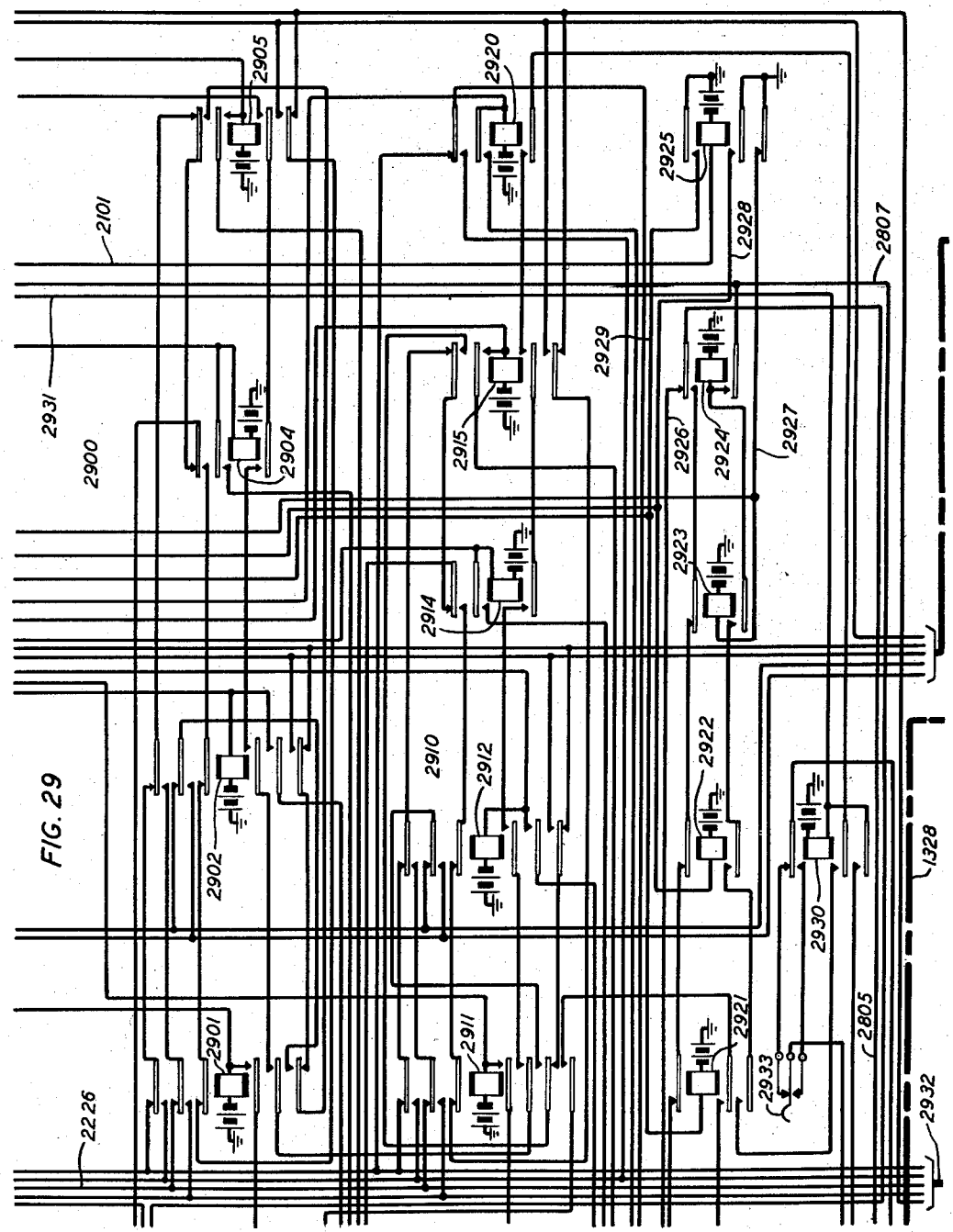
Figure 30:
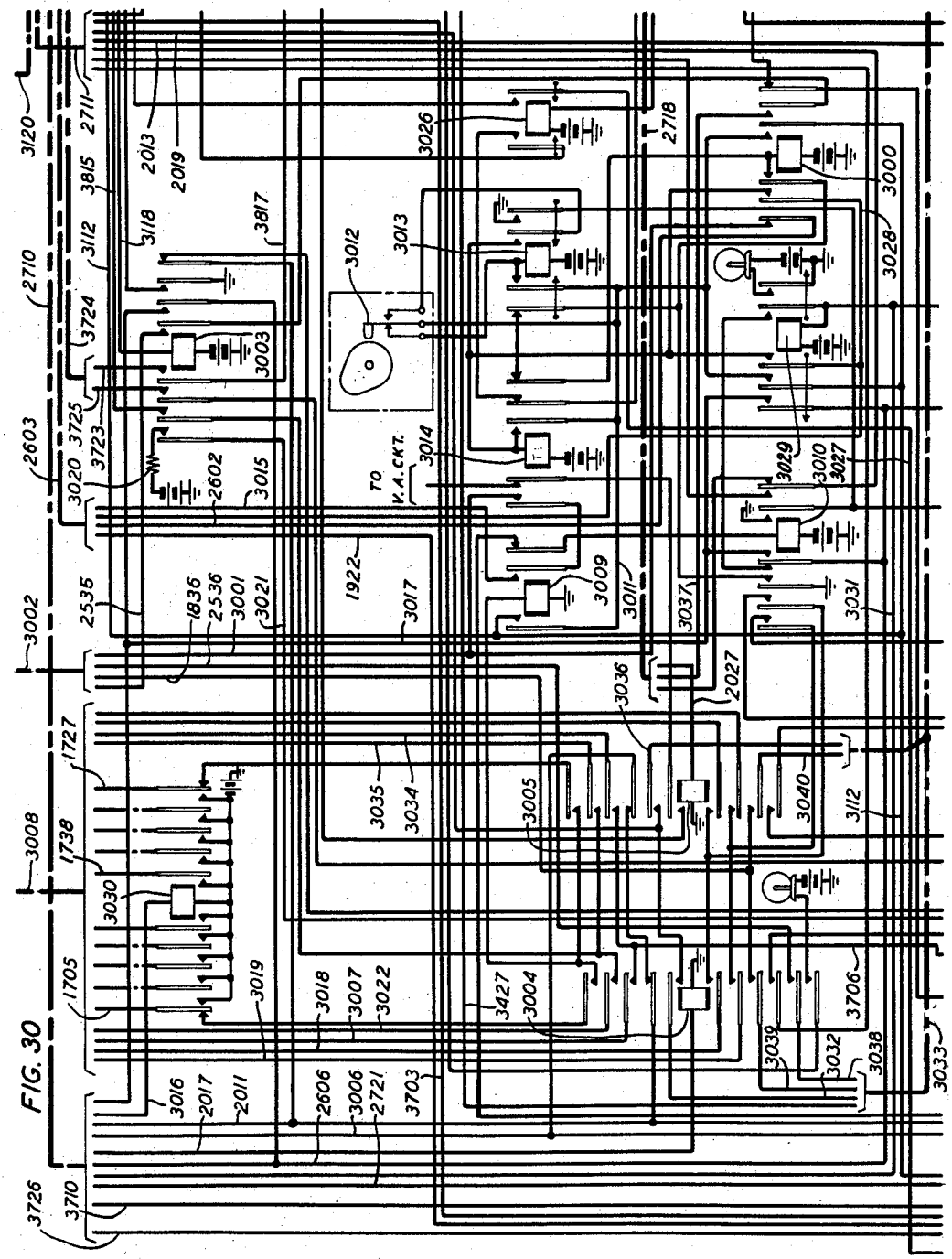

In the sender link circuit each sender appears as one of a group of ten, which may be all of one kind or may include both terminating and "B" position senders. The cross-points of one horizontal level of the cross-bar switch of Fig. 24 are wired to the senders of one sender group. The group test circuit tests the function of the sender group circuit in the link circuit.

When the sender group circuit including the sender to be tested is not in use with a service connection, a circuit is closed from battery over the inner right contact of relay 3702, winding of relay 3704, outer right back contact of relay 3705, conductor 3706, second upper front contact of relay 3004, conductor 3007, through cable 3008, armature of relay 1701, conductor 1703, through cable 1704, over a chain circuit including the back contacts of sender test relays 604 to 600, to ground at the lower back contact of relay 620.

Relay 3704 opens the remaining holding circuit for relay 3700 and that relay starts to release. Relay 3704 also closes the busy test circuits. During the releasing period of relay 3700 a circuit is closed from ground through the winding of relay 3707, left back contacts of relays 3708 and 3709 in parallel, right front contact of relay 3700, outer right front contact of relay 3704, inner left back contact of relay 3705, conductor 3710 through cable 2710, right back contact of relay 2012, second upper front contact of relay 2009, conductor 2018 through cable 2015, outer right contact of cross-point 2433 to conductor 2435 through cable 2436 to the sender to be tested.

If the sender is busy this circuit extends to battery over the lower front contact of relay 200 if the sender has been made busy artificially, or over contacts of relays 202 and 201 through the winding of relay 201 or over a contact of relay 700 to battery in the link during certain stages of service.

If battery is encountered, relay 3707 operates, in turn operating relay 3709 over a normal contact of relay 3708. Relay 3707 also closes a holding circuit for relay 3700 from conductor 2011 over the left front contact of relay 3707 to conductor 3006, preventing the release of relay 3700. Relay 3709 in operating closes another link between conductors 2011 and 3006 to hold relay 3700 operated, and closes a circuit from battery through the winding of relay 3708, right front contact of relay 3709, outer left front contact of relay 3704 to grounded conductor 3006. Relay 3708 operates and locks over its right alternate contact, outer left front contact of relay 3704 to conductor 3006. It also opens the circuits of relays 3707 and 3709. Relay 3709 is slow to release and holds the circuit of relay 3707 open for an interval. If the battery in the sender is due to a relay or hold magnet winding, the opening of this circuit will permit this battery to remove itself. If a make-busy battery was encountered it is unaffected by the opening of the test circuit. After this interval, relay 3709 recloses its back contact, again connecting relay 3707 to conductor 3710. In this case, if the battery is still present relay 3707 reoperates, holding relay 3700 and blocking the test.

If the battery has been removed both relays 3707 and 3700 release. With relay 3700 normal, conductor 3710 is extended over the right back contact of relay 3700 to the winding of relay 3711 and battery. At the same time, relay 3700 opens the circuit of relay 3701 which starts to release slowly.

If the sender is busy in service, conductor 3710, extending to conductor 2435 is grounded over the outer lower front contact of relay 202, lower normal contact of relay 701, upper normal contact of relay 702, off-normal ground conductor 703 to ground at the inner upper front contact of relay 202. Therefore, relay 3711 operates, closing a holding circuit for relay 3701. Relay 3701 is slow enough in releasing to insure that relay 3711 will operate if conductor 2435 is grounded. If relay 3711 operates, the circuit remains blocked until the sender becomes idle or until the test circuit is advanced to a new sender. While relay 3701 is operated, lamp 3712 is lighted in a circuit from battery through the lamp, over the outer left front contact of relay 3701, middle right contact of relay 3702 to ground as an indication that the sender, to which the test circuit is connected, is busy.

If the sender is idle, or becomes idle, when relays 3711 and 3701 release, a circuit is closed from ground on the middle right front contact of relay 3702, left back contact of relay 3701, right back contact of relay 3009, to the winding of relay 3010 and battery.

If, during the busy test, the sender group is seized by a service call, the chain circuit for relay 3704 is opened and that relay releases, restoring the busy test circuit to normal. When the sender group again becomes available, the busy test restarts as described.

If all of the senders of a subgroup are busy the subgroup busy relay is operated. For example, relay 621 is operated over the outer lower front contacts of relays 610 to 614, and ground, when all of the senders are busy. With relay 621 operated, battery is connected over the inner upper contact of relay 621, conductor 622, through cable 1704, contact of relay 1701, conductor 1705, through cable 3008, outer left back contact of relay 3030, outer upper front contact of relay 3004 to the winding of relay 3009 and ground.

With relay 3009 operated, the circuit for relay 3010 is held opened and ground is connected over the inner left contact of relay 3702, conductor 3112, left front contact of relay 3009 to conductor 3011 and interrupter 3012. When interrupter 3012 closes its left contact it completes a circuit for relay 3013 which locks to conductor 3011. When next interrupter 3012 closes its right contact it connects ground over that contact, inner right contact of relay 3013 to the winding of relay 3014 and battery. Relay 3014 also operates and locks to conductor 3011. This operation requires from five to twelve seconds and, if completed, relay 3014 closes a circuit from grounded conductor 3001, left front contact of relay 3014, right front contact of relay 3009, conductor 3015, through cable 2603, to the lower winding of relay 1918 and battery. Relay 1918 locks to grounded conductor 3001 and prepares a circuit for advancing to the next sender which is effective only if key 1919 is operated. Otherwise, the test remains blocked. Lamp 3728 is lighted in a circuit from battery through the lamp, over the left back contact of relay 3713, outer right front contact of relay 3013 to ground, to indicate the point at which the test failed. This timing arrangement is also controlled by relays 3000 and 3029.

Assuming that the sender subgroup was idle, so that relay 3010 operates as above described, a circuit is closed from ground at the second left front contact of relay 3010, left back contact of relay 3013, outer right back contact of relay 3014 to the winding of relay 3000 and battery. Relay 3000 operates and locks over its inner left front contact to ground at the second left front contact of relay 3010, independent of the timing relays. Relay 3010 also closes a circuit from grounded conductor 2606, inner left front contact of relay 3010, conductor 3017, through cable 2710, outer upper back contact of relay 2008, conductor 3016 through cable 2710 to the winding of relay 3030 and battery. Relay 3030 connects battery to conductor 1705 and to the corresponding conductors of other senders of the subgroup to make them appear busy to all link circuits. Relay 3010 at its inner right contact closes another circuit for lamp 3728. With relay 3010 operated, a circuit is prepared for relay 3714 over the third left contact of relay 3010, inner lower front contact of relay 3004, conductor 3018 through cable 3008, contact of relay 1701, conductor 1706 through cable 1704, outer upper back contact of relay 623 to ground at the outer lower back contact of relay 621. A circuit is also prepared from battery through the winding of relay 3715, outer left front contact of relay 3010, second lower front contact of relay 3004, conductor 3019 through cable 3008, contact of relay 1701, conductor 1707 through cable 1704, inner lower back contact of relay 623, inner lower back contact of relay 621, to the upper back contacts of relays 610, 612 and 614, which are individual to the senders of the subgroup. If two or more senders are idle, ground will be connected to this circuit over the back contacts of two senders. For example, assuming that the senders corresponding to relays 610 and 614 are idle and the remainder busy, so that relays 610 and 614 are normal and relays 612, etc., operated, the circuit just traced will extend over the inner upper back contact of relay 614, inner lower front contacts of relays 612, etc., inner lower normal contact of relay 610 to ground, and relay 3715 will operate.

If more than two senders are idle, parallel circuits will be closed over the back contacts of the sender relays in pairs. If one or more senders are idle, the group busy relay 621 is not operated and the circuit of relay 3714 is closed. Therefore, with two or more senders idle, both relays 3714 and 3715 are operated, and with one sender idle relay 3714 is operated alone.

Relay 3000 in operating opens the circuit of relay 3113 which in turn opens that of relay 3114. These two relays release slowly, to allow any service link which may have started to seize this group of senders to complete its action and exclude the test circuit and also to allow any sender which is restoring to normal to completely restore before seizing the sender.

With relays 3714 and 3715 operated and relay 3114 released, a circuit is closed from battery through the winding of relay 3713, conductor 3716, back contact of relay 3114, conductor 3115, front contacts of relays 3715 and 3714, to ground at the inner right contact of relay 3010. Relay 3713 operates and locks to ground over its middle left front contact and the inner right contact of relay 3010. In operating it extinguishes lamp 3728 and extends the lamp circuit over its outer left front contact, right back contact of relay 3711 to battery through lamp 3718. In addition, relay 3713 closes a circuit from ground at its middle right contact over conductor 3117 to battery through the winding of relay 3116. Relay 3116 prepares the circuits for giving the frame indication to the sender. Relay 3116 also closes a circuit from ground at its inner right contact, conductor 3118 to the winding of relay 3003 and battery.

The above operations are described on the assumption that key 3719 is operated, which would be the case while testing during light load periods. For testing during heavy loads, key 3719 is normal, and the contact of relay 3714 is shunted so that the test may proceed where the selected sender is the one idle sender in the group.

Relay 3003 in operating connects ground through the winding of relay 3720, second right front contact of relay 3702, outer left back contacts of relays 3705 and 3812, conductor 3815, third left front contact of relay 3003, third upper front contact of relay 3004, conductor 3022 through cable 3008, contact of relay 1701, conductor 1711 through cable 1704, normal contacts of relays 600 to 604, to battery. Relay 3720 operating in this circuit indicates that the chain circuit over which the sender test and select relays receive battery is complete. Relay 3720 locks in a circuit from ground through its winding, second right front contact of relay 3702, outer left front contact of relay 3720, to battery over the outer left back contact of relay 3717.

With relays 3704 and 3720 operated, ground is connected to the preference lead corresponding to the sender to be tested which extends through resistance 3721, inner left front contact of relay 3720, inner right and left front contacts of relay 3704, outer right back contact of relay 3816, conductor 3817, inner left front contact of relay 3003, conductor 3723 through cable 3724, over the inner right back contacts of relays 2519 to 2515 and 1814 to 1811, middle right front contact of relay 1810, conductor 1831, contact of relay 1701, conductor 1712 through cable 1704, outer upper back contact of relay 610, winding of relay 600, back contacts of relays 602, 604, etc., to battery. Relay 600 operates in this circuit, opening the circuits of relays 3714 and 3715. Relay 600 also closes a circuit from battery through resistance lamp 205, inner lower back contact of relay 204, lower back contact of relay 203, lower back contact of relay 201, lower winding of relay 700, conductor 1710, outer lower front contact of relay 600 to ground at the back contacts of relays 620 and 624. Relay 700 locks in a circuit from battery through its upper winding and inner upper front contact to conductor 1710 and closes a parallel circuit from battery through relay 704, over the inner upper back contact of relay 202, inner upper front contact of relay 700 to ground over conductor 1710. With relays 700 and 704 operated, the circuits for recording the frame designation are connected through to the sender register. In addition, other control circuits are extended into the sender.

With relay 3116 operated, ground over its second right contact is connected to the right movable springs of the even-numbered frame keys 3800 to 3804, 3105 to 3109. Assuming that key 3804 is operated, the above ground is extended over the closed inner right contact of key 3804, winding of relay 3818, middle right back contact of relay 3111, conductor 3119, through cable 3120, contact of relay 1701, conductor 1708 through cable 1709, over the lowermost front contact of relay 704 to the winding of relay 705 and battery.

With relays 3714 and 3715 released and relay 3818 operated, relay 3717 is connected to test whether the proper relay in the link has been operated, the circuit extending from battery through the right winding of relay 3717, front contact of relay 3818, back contacts of relays 3714 and 3715, second left front contact of relay 3003, conductor 3725 through cable 3724, outer left back contacts of relays 2519 to 2515 and 1814 to 1811, outer left front contact of relay 1810, conductor 1830, contact of relay 1701, conductor 1710 through cable 1704, outer lower front contact of relay 600 to ground over the back contacts of relays 620 and 624. Since relay 600 is operated, relay 3717 operates, locking through its left winding and inner left front contact to ground at the inner right front contact of relay 3713. Relay 3717 opens the circuit of lamp 3718 and extends the lamp circuit over its outer right front contact and the middle left front contact of relay 3704 to lamp 3722 and battery.

Relay 3717 opens the locking circuits of relays 3704 and 3720, leaving them connected respectively to the battery chain over the upper normal contacts of relays 600 to 604 and the ground chain over the lower back contacts of the same relays. This serves as a test for the proper opening of these chain circuits, since, if either fails to open, the corresponding relay will remain operated and block the progress of the test. Lamp 3722 lighted indicates the point of failure. If relay 3704 releases but relay 3720 fails to do so, the lamp circuit is extended over the middle left back contact of relay 3704 and the right front contact of relay 3720 to lamp 3723 to indicate that condition.

Assuming that the chain circuits open and relays 3704 and 3720 both release, the lamp circuit is extended over the right back contact of relay 3720, left back contact of relay 3819 to battery through lamp 3820. The operating circuit for relay 600 is opened but that relay locks in a circuit from battery over its inner upper alternate contact, winding of relay 600, outer upper front contact, conductor 625, through cable 1704, contact of relay 1701, conductor 1713, through cable 3120, outer left front contact of relay 3116, to ground at the inner left back contact of relay 3816.

A circuit is also closed from battery through the winding of relay 3812, conductor 3021, outer left front contact of relay 3717, left back contact of relay 3720, inner left back contact of relay 3704, outer right back contact of relay 3816, conductor 3817, inner left front contact of relay 3003, conductor 3723 through cable 3724, inner right back contacts of relays 2519 to 2515 and 1814 to 1811, middle right front contact of relay 1810, conductor 1831, front contact of relay 1701, conductor 1712, through cable 1704, outer upper back contact of relay 610, outer upper front contact of relay 600, conductor 625 and thence as above traced to ground at the inner left back contact of relay 3816.

Relay 3812 operates in this circuit, in turn operating relays 3813 and 3814 over obvious circuits. In addition, relay 3812 closes a circuit from battery through the winding of relay 3705, left front contact of relay 3812 to ground at the fourth right front contact of relay 3702. Relay 3705 locks over its inner left front contact to ground at this fourth right front contact of relay 3702.

When relay 700 operated, it connected the ten frame units leads to the select magnets of the cross-bar register, the frame tens leads to relays 300 and 310, the even frame lead to relay 705 and the special marker lead to relay 714. In the test circuit, conductors 1708, 3129 and 1716 were grounded to simulate a junctor frame 4, and relays 705 and 300 operate together with select magnet 904.

Magnet 904 in operating extends its operating ground over conductor 971 to the winding of relay 301 and battery. Relay 301 closes a circuit from battery through resistance 209, winding and normal contact of relay 208, outer upper front contact of relay 301, conductor 215, front contact of relay 300 to ground over the operating circuit of relay 300. Relay 208 operates, locking over its alternate contact to conductor 215, and closing a circuit from battery through resistance 216, winding of relay 217, alternate contact of relay 208 to conductor 215, but relay 216 is shunted by the operating circuit of relay 208 and does not operate at this time.

With relay 208 operated, a circuit is closed from battery through the winding of hold magnet 410, back contact of hold magnet 411, conductor 412, lower front contact of relay 208, back contact of relay 217 to the windings of relay 218. The upper winding of this relay, which is differentially wound, is connected to battery and the lower winding is connected to conductor 219. The circuit remains in this condition until relay 202 operates, connecting ground to conductor 219. Hold magnet 410 now operates, closing cross-point 910 and locking to conductor 215. This locking ground extends back to the windings of relay 218 and that relay now operates. When relay 218 operates, the locking circuit of relay 301 and magnet 904 is opened at the contact of relay 218 but is maintained at the back contact of relay 306 until the dialing circuit is established.

The grounding of conductor 215 by relay 300 closes a circuit over the lower back contact of relay 206 to the winding of relay 207 which closes the dialing tip conductor through to the winding of relay 302. Relay 207 also closes a circuit for relay 203 which in turn operates relay 204, relay 204 locking to conductor 215.

When relays 204, 3214 and 3705 operate, a circuit is closed from ground at the outer left front contact of relay 3814, outer left front contact of relay 3705, conductor 3710, through cable 2710, right back contact of relay 2012, second upper front contact of relay 2009, conductor 2018, through cable 2015, contact of cross-point 2433, conductor 2435, through cable 2436, inner lower front contact of relay 700, conductor 706 through cable 1709, contact of relay 1701, conductor 1714 through cable 3120, fourth left front contact of relay 3116, conductor 3121, right front contact of relay 3814, conductor 3821, inner left back contact of relay 3111, right back contact of relay 3122, resistance 3123, outer left back contact of relay 3111, third left contact of relay 3116, conductor 3124 through cable 3120, contact of relay 1701, conductor 1715 through cable 1709, third lower front contact of relay 700, outer upper front contact of relay 204 to the upper winding of relay 201 and battery. Relay 201 closes a substitute holding circuit for relays 208, 204, 300, etc., by connecting ground to conductor 215. Relay 201 also connects ground to conductor 210, operating relay 610 in the link circuit. With relay 610 operated, ground is connected to conductor 630, completing a circuit over the fourth lower front contact of relay 201, outer upper front contact of relay 208, conductor 211, left back contact of relay 970, conductor 922, back contacts of relay 300 or 310, to the winding of relay 202 and battery. Relay 202 locks over its inner lower front contact to ground at the uppermost front contact of relay 201. Relay 202 at its inner upper front contact connects ground to conductor 703, which ground extends over the upper normal contact of relay 702, lower normal contact of relay 701, conductor 222, lowermost contact of relay 202 to conductor 2435, over which the link switch hold magnets are normally held, and in parallel over the second lower contact of relay 201 to the upper winding of that relay to hold that relay operated.

The operation of relay 610 in the link circuit disconnects conductor 1712 from ground over the locking circuit of relay 600 and connects it over the outer upper front contact of relay 610 to the upper armature of relay 614 and to conductor 626.

The disconnection of conductor 1712 from ground releases relay 3812, in turn releasing relays 3813 and 3814. When relay 3814 releases, it closes a circuit from ground on conductor 222, fourth lower front contact of relay 202, conductor 212, second lower contact of relay 700, conductor 710, through cable 1709, contact of relay 1701, conductor 1717 through cable 3120, second left front contact of relay 3116, middle left back contact of relay 3111, left back contact of relay 3814, second left front contact of relay 3705, to the winding of relay 3819 and battery. Relay 3819 locks over its inner left front contact to ground at the fourth right front contact of relay 3702.

Relay 3819 disconnects the lamp circuit from lamp 3820 and extends it over its outer left front contact and the back contacts of relays 3816 and 3822 to lamp 3823. If the release signal is not received, the test circuit blocks with lamp 3820 lighted.

A circuit is also closed from ground at the right back contacts of relays 3812 and 3814, second right front contact of relay 3705, left back contact of relay 3125, right front contact of relay 3819 to the winding of relay 3816 and battery. Relay 3816 connects ground through resistance 3824 to conductor 3817 which extends, as previously traced, to the armature of relay 610 and over the front contact of that relay, to the upper armature of relay 614 to give the corresponding sender the next preference. To this armature is attached preference conductor 626 over which the circuit extends through cable 1704 to an armature of relay 1701, (not shown) which is cross connected to an armature of relay 1702. This circuit further extends over conductor 1719, outer right front contact of relay 1810, outer right back contacts of relays 1811 to 1814, 2515 to 2519, conductor 2530 through cable 2531, fifth left front contact of relay 3116, winding of relay 3825, inner right front contact of relay 3705 to battery. If the preference circuit is advanced properly relay 3825 operates, closing a circuit for relay 3822. Relay 3822 in operating opens the circuit of lamp 3823, the second branch of which was previously opened by relay 3816. This relay also closes a circuit from ground over its right contact, inner left front contact of relay 3816, middle left front contact of relay 3819 to the winding of relay 3026 and battery.

During light traffic, with key 3719 operated, a test is made for premature advance of the preference lead, by means of a circuit extending from ground over the inner left front contacts of relays 3702, 3814, and 3822, lower contact of key 3719, conductor 3725 to the winding of relay 3130 and battery. Relay 3130 blocks the test and lights lamp 3131. This circuit is closed only if relay 3825 operates before relay 3814 releases, which is an indication of premature advance of the preference lead. When testing during heavy traffic, with key 3719 normal, this test is omitted.

Relay 3816 in operating opens its inner left back contact, disconnecting ground from conductor 1713, thereby releasing relay 600 which in turn opens the locking circuit of relays 700 and 704 in the sender, permitting them to release. With these relays normal, the frame indication circuits, as well as the circuits previously traced over conductors 710, 706 and 1715, should be open. The test circuit makes a test to determine whether this is true.

With relay 3026 operated, a circuit is closed from battery in parallel through the windings of relays 3111, 3132 and 3133, right front contact of relay 3026, conductor 3027, outer left front contact of relay 3702, conductor 3726, through cable 2710, second upper front contact of relay 2009, conductor 2018 through cable 2015, contact of cross-point 2433, conductor 2435 through cable 2436, outer lower front contact of relay 202, lower normal contact of relay 701, upper normal contact of relay 702 to grounded conductor 703. Relays 3111, 3132 and 3133 operate over this circuit. One end of the winding of relay 3134 is connected to a potential of approximately 24 volts, obtained by connecting it to the point between resistances 3135 and 3136 which are connected in series between battery and a ground supplied over the inner left contact of relay 3713 The other end of the winding of relay 3834 is connected in parallel to the front contacts of relays 3111, 3132 and 3133 and with these relays operated to all the frame indicating circuits and other circuits which are to be tested for crosses. The operation of relay 3111 also opens the circuit of relay 3110, which releases slowly. If any of these circuits are connected to either 48-volt battery or ground, relay 3834 will operate, closing an obvious circuit for relay 3130 which locks to grounded conductor 3112, lights lamp 3131 and blocks the advance of the test. If no such crosses are detected, when relay 3110 closes its back contact, a circuit is closed from ground at the back contact of relay 3134, back contact of relay 3130, left front contact of relay 3026, inner right back contact of relay 3014, right back contact of relay 3110, conductor 3137 through cable 3138, to the winding of relay 2012 and battery as an indication to the connector circuit that the group test circuit has competed its functions. Relay 2012 locks over its inner left contact to ground over conductor 3001.

Relay 2012 in operating disconnects ground from conductor 2013, releasing relay 3702, which causes all other relays of the group test circuit to restore to normal. The group test circuit cannot be reseized until relays 3700 and 3701 have been operated and relay 3003 released to reclose the operating circuit of relay 3702.

In order that the test frame attendant may make a particular subgroup of senders busy from the test frame, key 3727 and relays 3029 and 3030 are provided. With the start key 1900 operated, conductor 2606 is grounded and the closure of key 3727 operates relay 3029. Relay 3029 locks to conductor 2606 over the left back contact of relay 3010. It also closes a circuit from grounded conductor 2606, outer left front contact of relay 3029, conductor 3017, through cable 2710, upper back contact of relay 2008, conductor 3016, through cable 2710, winding of relay 3030 and battery. Relay 3030 connects battery to the group busy leads of the group to which the test circuit is connected. Relay 3010 in operating opens the circuit of relay 3029 but connects conductor 3017 to conductor 2606 over its inner left front contact, holding relay 3030 operated. On repeat tests, relay 3029 is operated over conductor 3031 through cable 2710, contacts of keys 2712 and 2713, and the lower front contact of relay 2714 to conductor 2606. Relay 2714 operates under the control of interrupter 2715 as will be described hereinafter. Relay 3029 insures that the sender under test will not be seized for a service call.

*Revertive pulse test circuit*

The operation of relay 2012 as above described closes a circuit for initiating the operation of the revertive pulse test circuit by closing a circuit from ground at the second left front contact of relay 2012, conductor 2019 through cable 2711, inner upper front contact of relay 3004, conductor 3032 through cable 3033, winding of relay 3400 to battery. Relay 3400 supplies ground to the revertive pulse test circuits and at its second right front contact connects relay 3300 to conductor 3401, through cable 2716, outer right front contact of relay 2012, second upper front contact of relay 2009, conductor 2018 through cable 2015, contact of cross-point 2433, conductor 2435 through cable 2436, outer lower front contact of relay 202, normal contacts of relays 701 and 702 to grounded conductor 703.

If the sender has closed the above traced ground, relay 3300 operates, locking over its inner lower front contact, conductor 3301, inner upper back contact of relay 3402, winding of relay 3403, back contact of relay 4100, conductor 4101 to ground at the fifth left front contact of relay 3400. Relay 3403 does not operate at this time, being shunted by the operating ground of relay 3300.

Relay 3300 supplies battery over conductor 3303 to the windings of relay 3302 and of the counting relays 4000 to 4007 and 4010 to 4017. Relay 4007 operates in a circuit from battery on conductor 3303 through its winding, back contacts of relays 4005 and 4010, conductor 4008, to ground at the fourth left front contact of relay 3400. Relay 3400 also closes a circuit from battery over its inner right contact, conductor 3404, left normal contact of key 3305, resistance 3306, upper winding of relay 3304 to ground at the outer left contact of relay 3400, causing relay 3304 to hold its contact closed. Relay 3302 also operates in a circuit from battery on conductor 3303, upper winding of relay 3302, contact of relay 3304, back contact of relay 4010 to grounded conductor 4008. With relay 3302 operated, a circuit is closed from battery through the winding of relay 3405, outer lower front contact of relay 3302, fifth right front contact of relay 3400, conductor 1913 through cable 2716 to ground at the lower back contact of relay 1906. Relay 3405 locks over its inner left front contact and the fifth right front contact of relay 3400 to grounded conductor 1913 and connects the dialing circuit through to this revertive pulse circuit.

Relay 3400 also closes a circuit for lamp 3500, which indicates that the circuit is testing for ground on release of relay 700. The circuit extends from battery through lamp 3500, conductor 3501, middle lower back contact of relay 3406, outer lower back contact of relay 3407, upper back contact of relay 3408, lower back contact of relay 3400 to ground over conductor 4101 and the fifth left front contact of relay 3400.

Relay 3400 in grounding conductor 4008 also closes a circuit over the inner lower back contacts of relays 3407 and 4108, lower back contacts of relays 4019, 4020, 4021, 4022 and 4023, to the winding of relay 3311 and battery.

Relay 3300 also closes a circuit for energizing relay 4102 in a non-operate direction, the circuit extending from battery through resistance 3307, second upper front contact of relay 3300, conductor 3308, outer lower back contact of relay 4103, outer lower normal contact of key 4104, upper winding of relay 4102, conductor 3323, inner upper front contact of relay 3300 to ground.

Relay 3311 closes a locking circuit for itself through the winding of relay 4023, lower contact of relay 3311, outer upper back contact of relay 4022 to grounded conductor 4008. Relay 4023 does not operate in this circuit, being shunted by the operating circuit of relay 3311. With relay 3311 operated, a circuit is closed from battery through the winding of relay 3407, upper contact of relay 3311, conductor 3312, inner upper back contact of relay 3410, second lower front contact of relay 3300, conductor 3313, through cable 2716, third left front contact of relay 2012, third lower contact of relay 2009, conductor 2020 through cable 2015, cross-point 2433, conductor 2439, through cable 2436, lowermost front contact of off-normal relay 201, outer lower front contact of relay 203, upper back contact of relay 700, conductor 712 to ground at the fourth upper front contact of relay 202.

If this circuit is closed in the sender, relay 3407 operates, locking over its inner upper front contact to its operating circuit at conductor 3312, independent of relay 3311. Relay 3407 opens the circuit of lamp 3500 and the operating circuit of relay 3311, permitting relay 4023 to operate. Relay 4023, at its uppermost contact, closes a circuit for incoming brush lamp 4024 to grounded conductor 4008.

Figure 32:
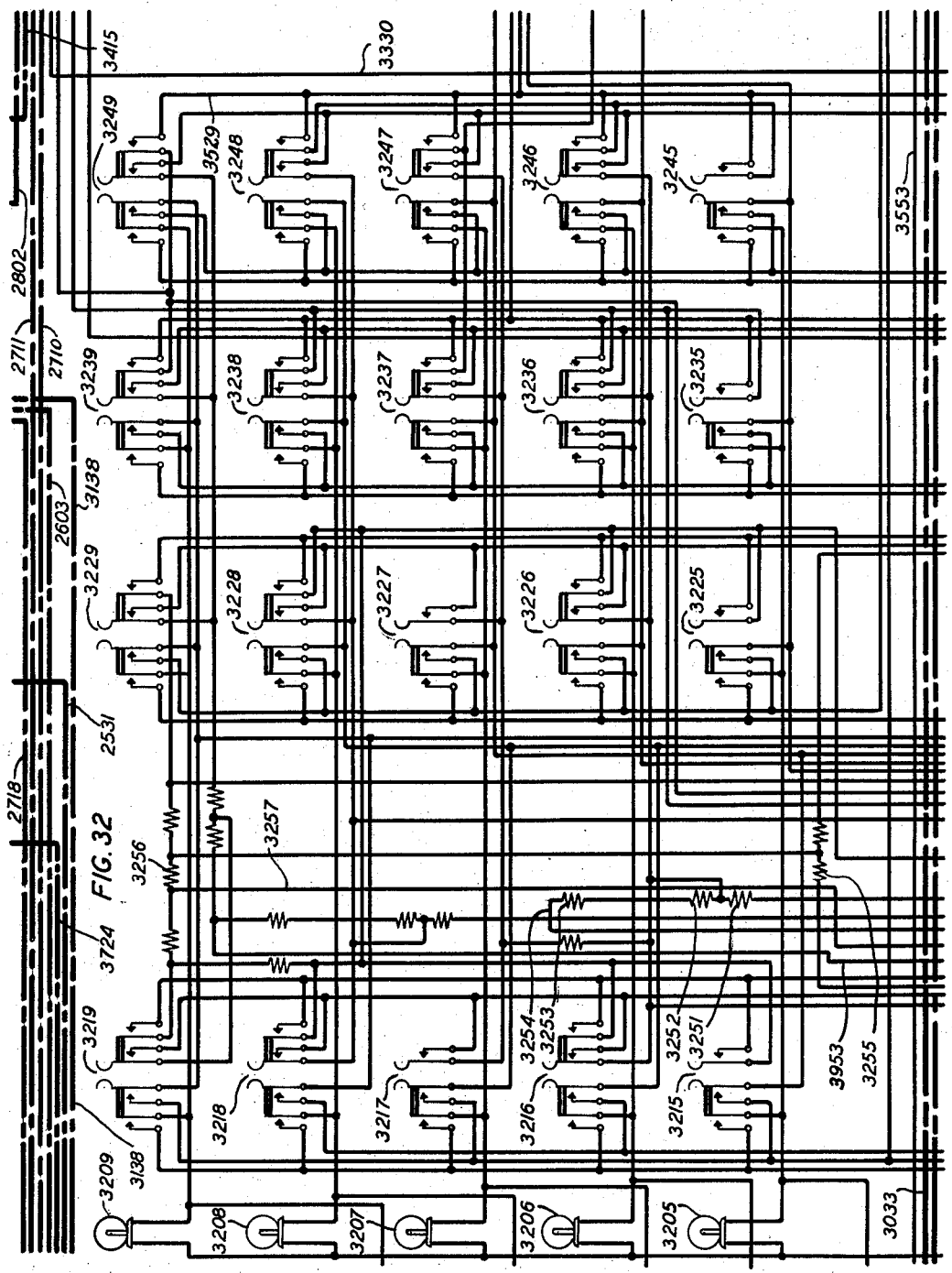
Figure 33:
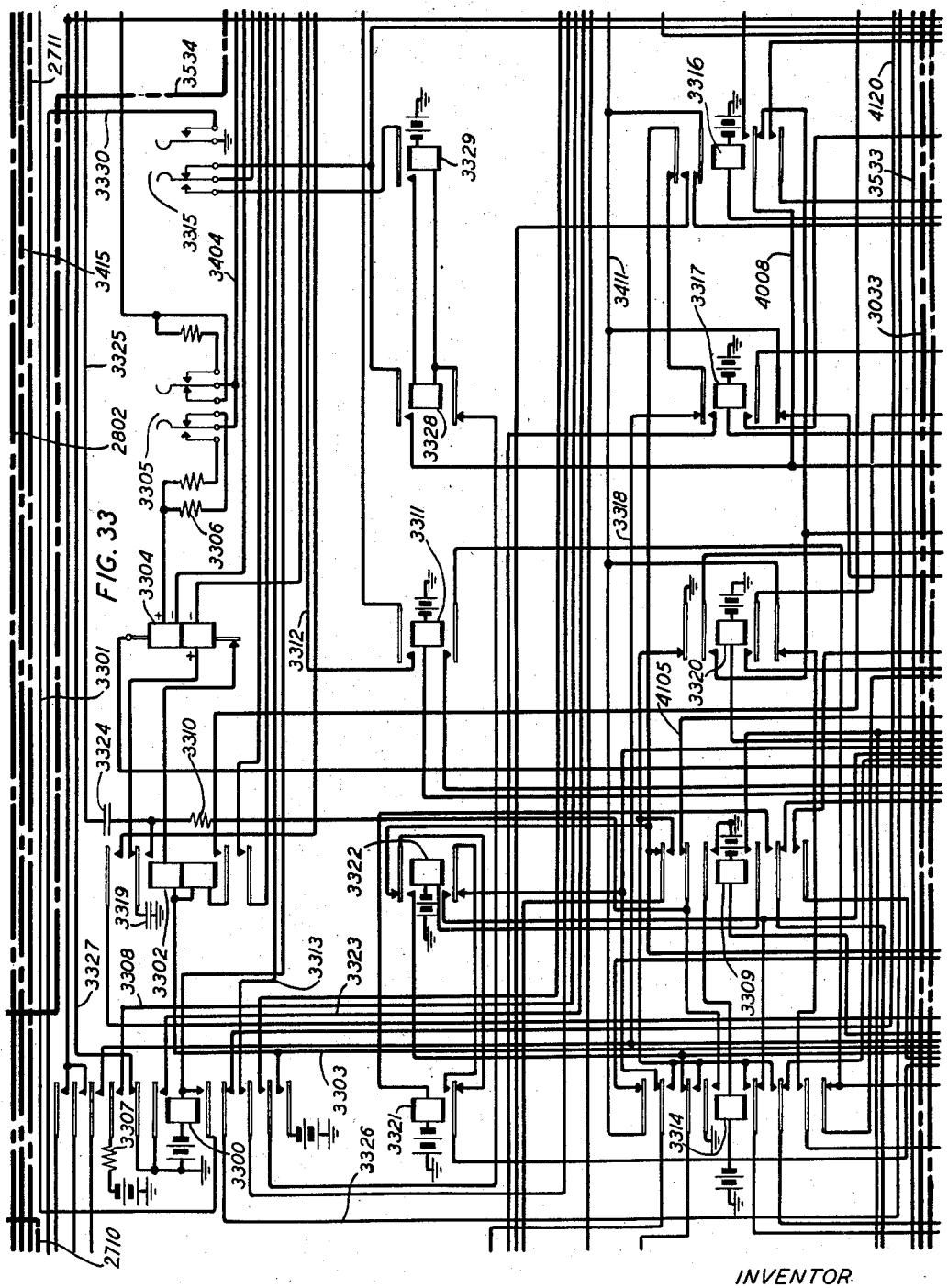
Figure 34:
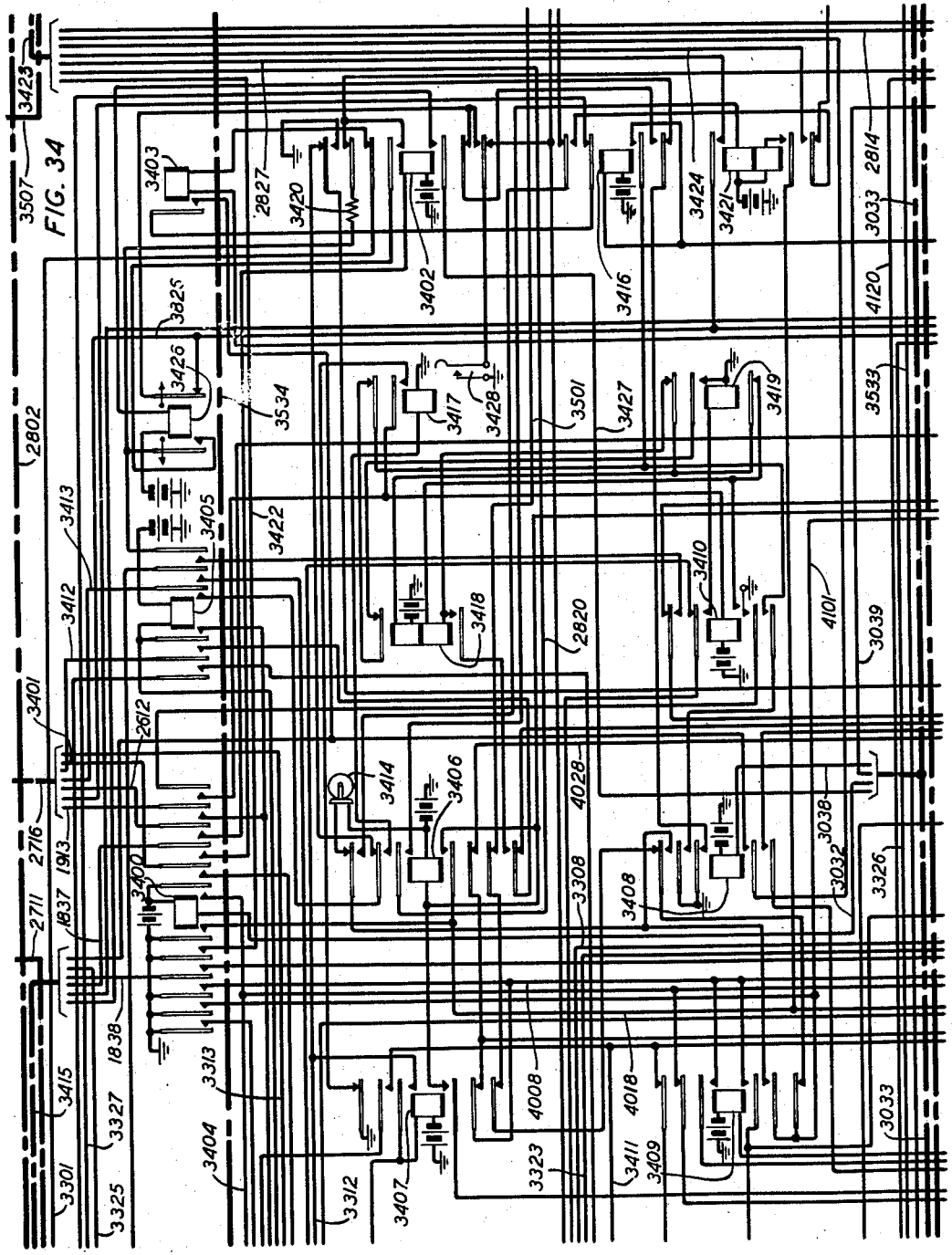
Figure 35:
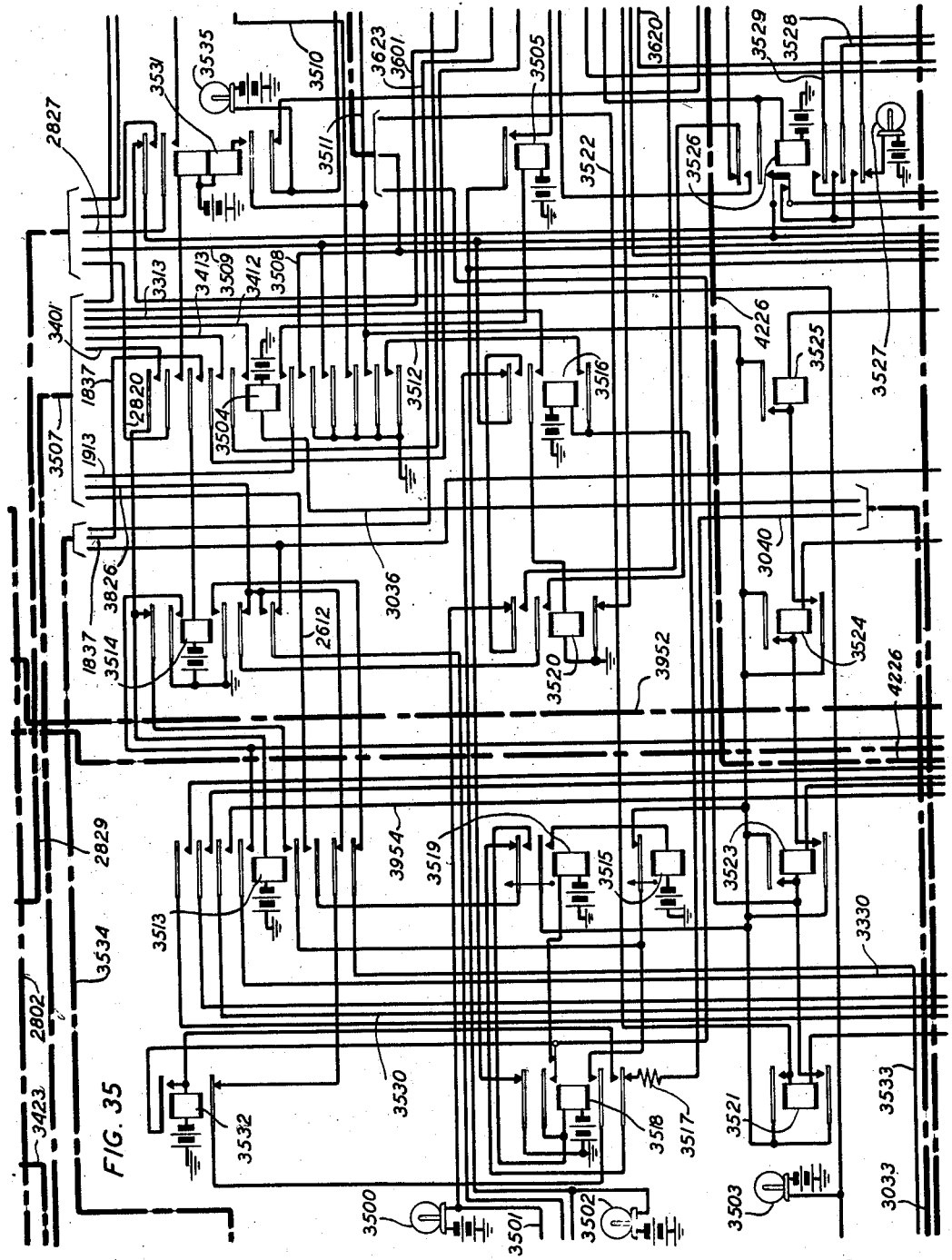
Figure 37:
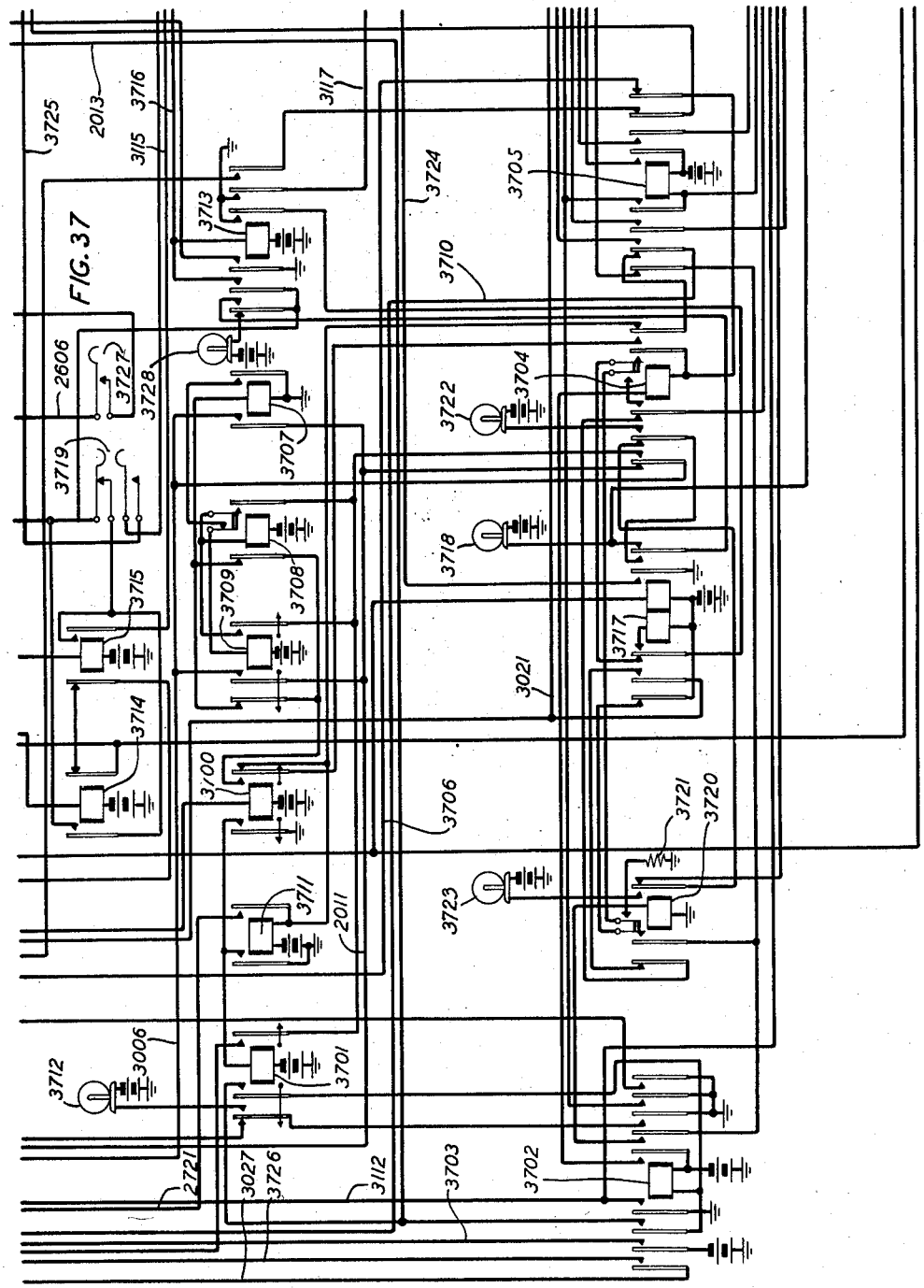
Figure 39:
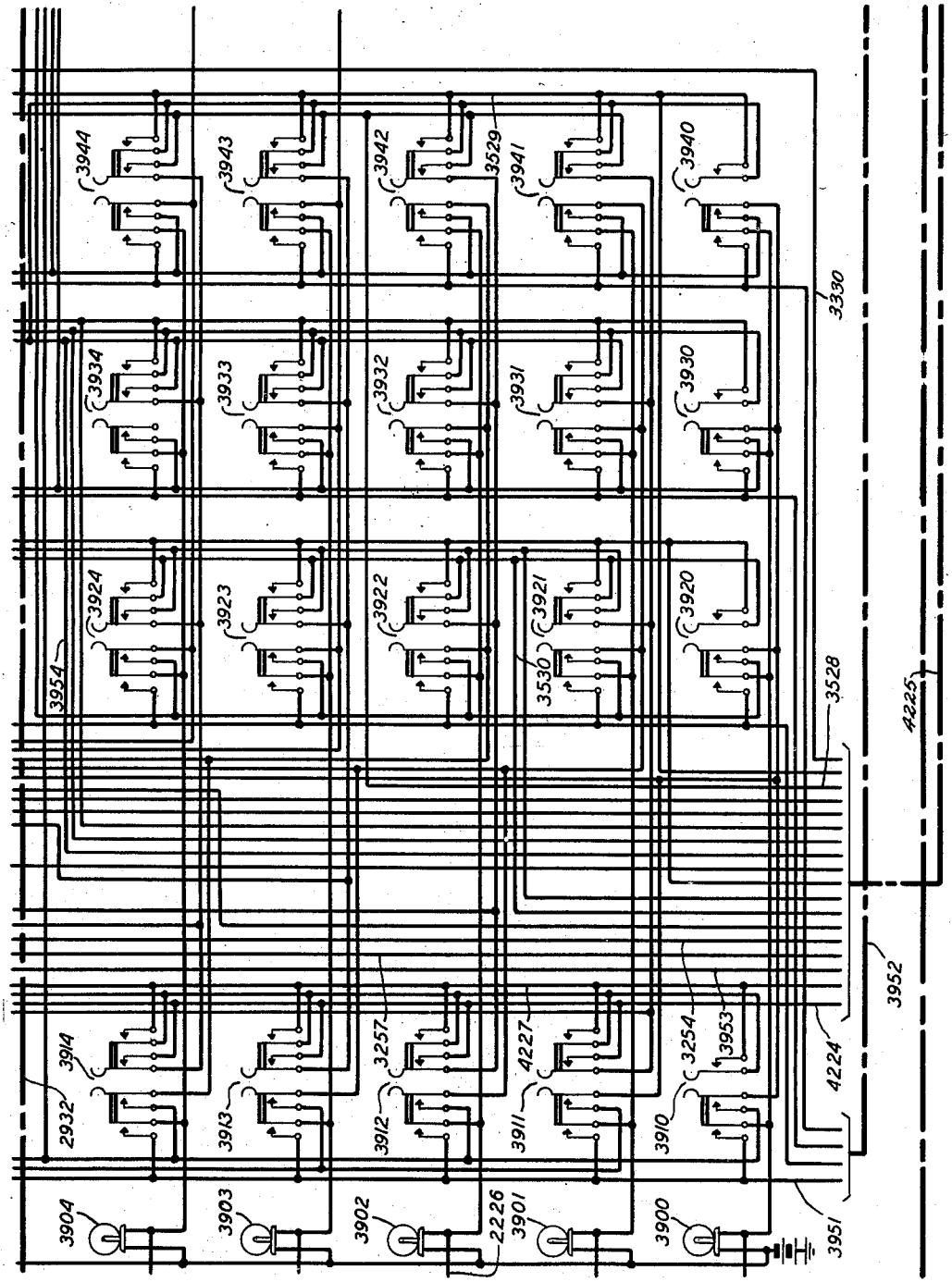
Figure 40:
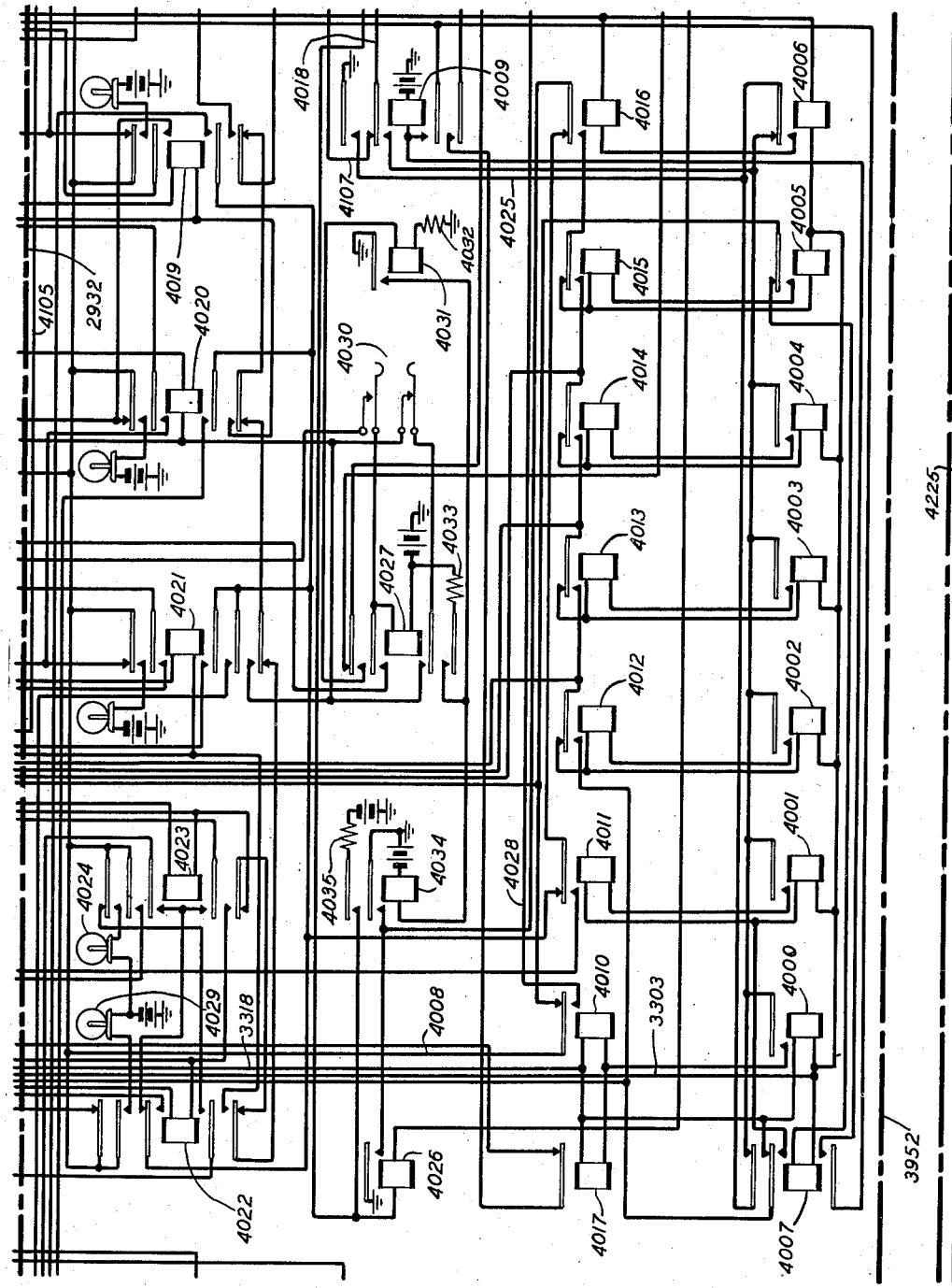
Figure 41:
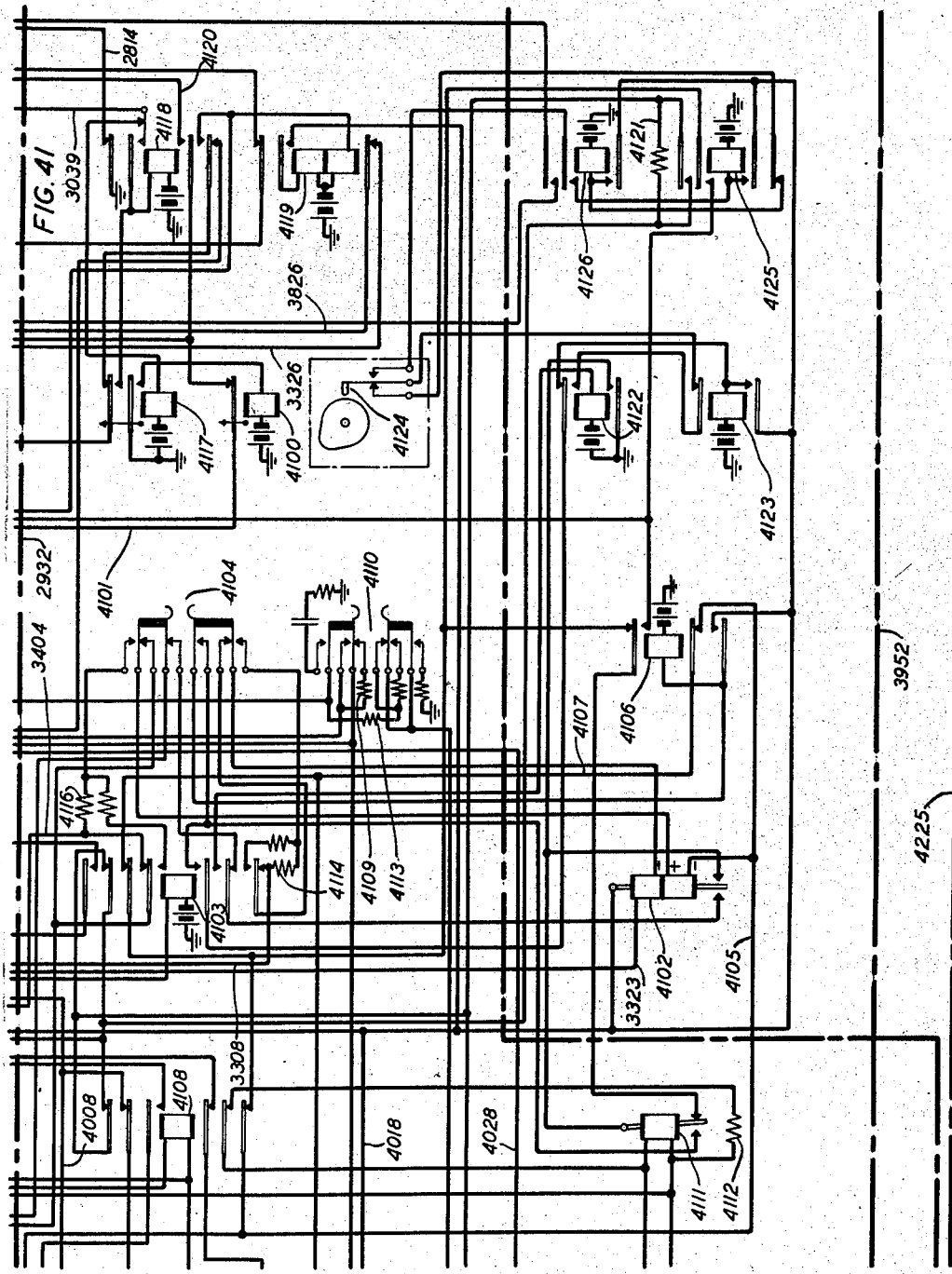
Figure 42:
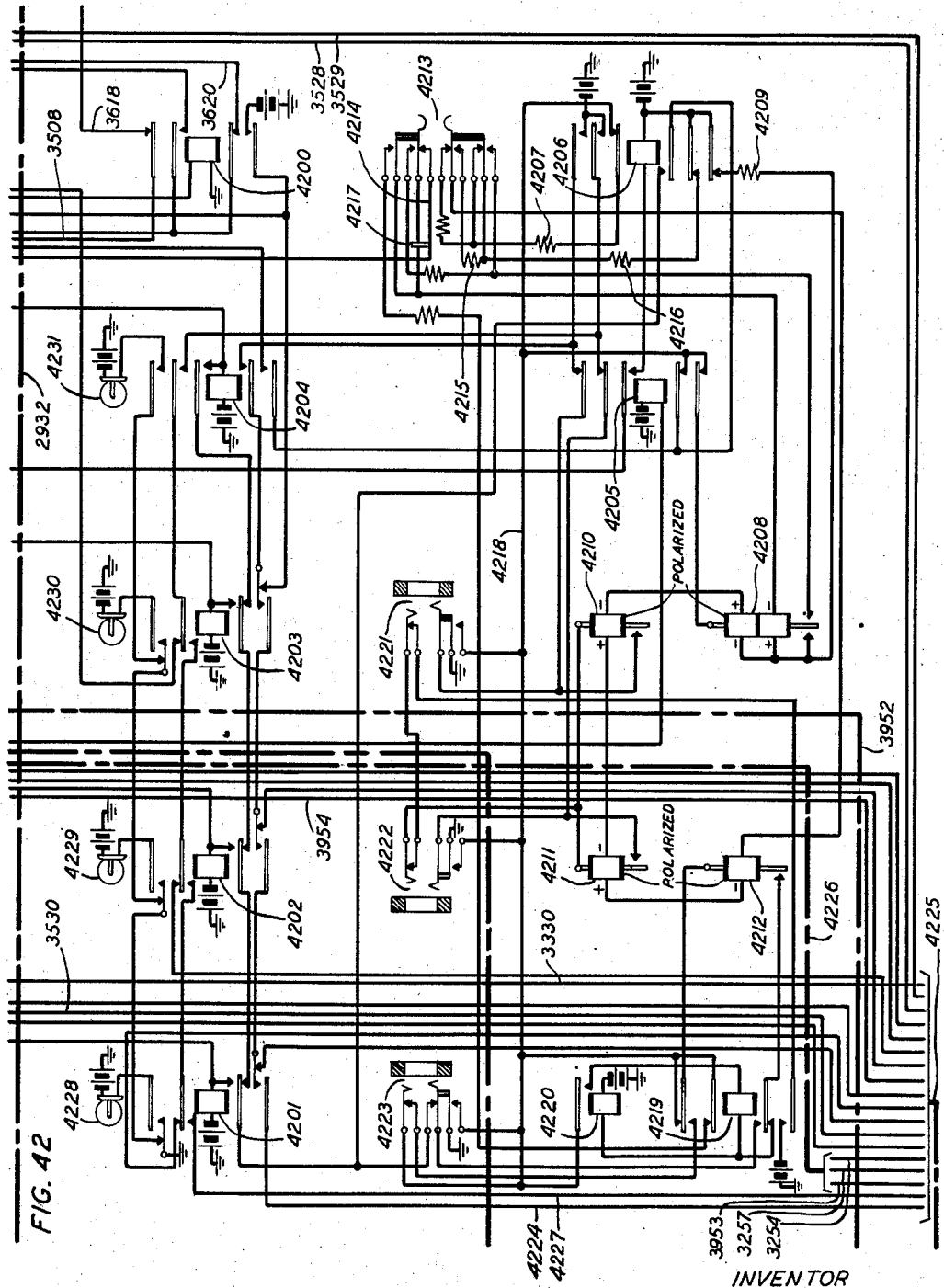
Figure 43:
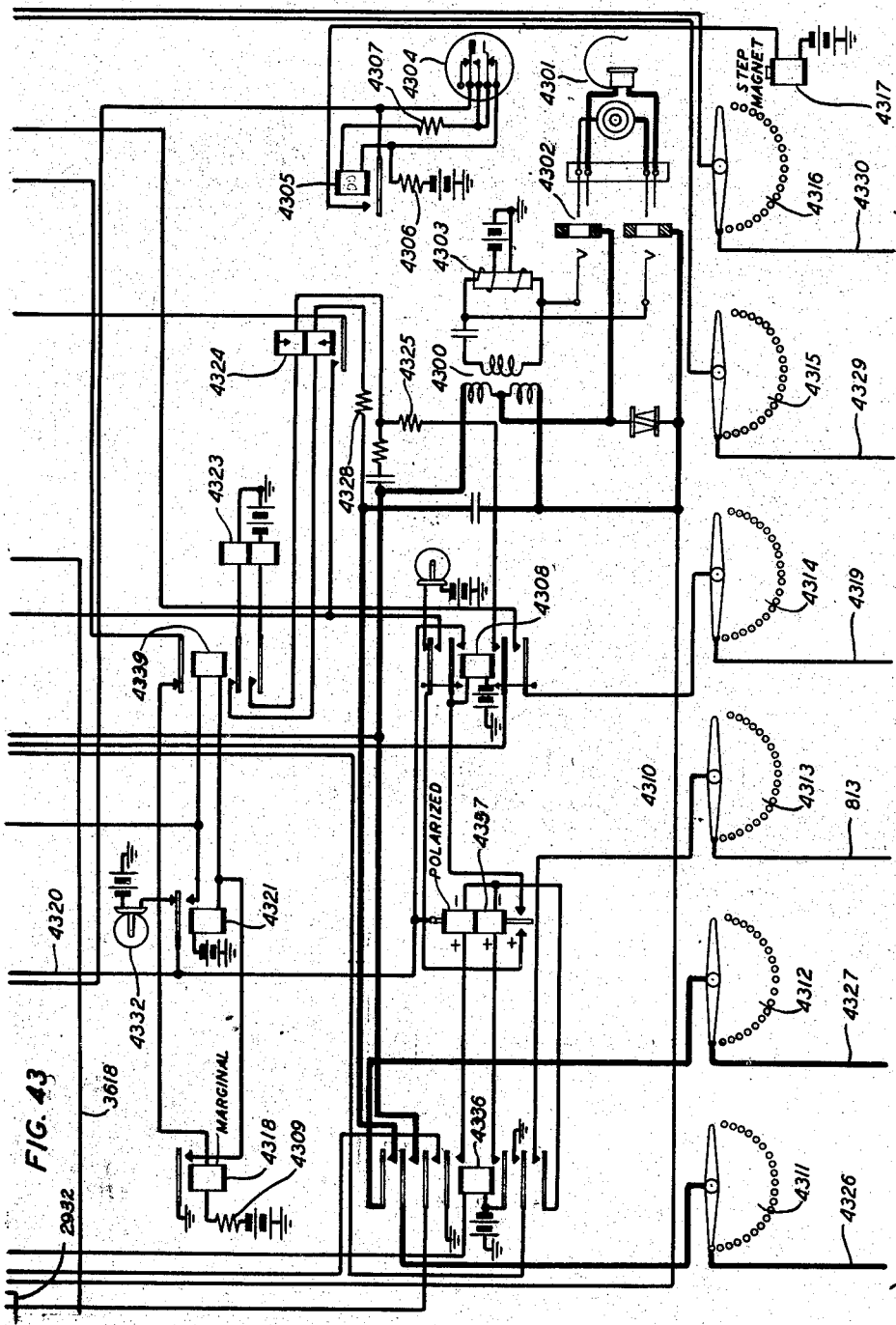

Before starting the test, the numerical keys of Figs. 32 and 39 are operated in accordance with any designation for which it is desired to test the senders. Assume, for example, that keys 3912, 3227, 3239 and 3943 have been operated. This number is transmitted to the sender by means of revertive pulses in terms of incoming and final selections.

When relay 3407 operated it closed a circuit from battery through the winding of relay 4009, lower front contact of relay 4007, normal contact of key 3315, outer upper front contact of relay 3407, conductor 3411, uppermost back contact of relay 3314, middle upper front contact of relay 4023 to grounded conductor 4008. Relay 4009 locks over its operating circuit independent of relay 4007. It also connects ground to conductor 4025 for locking certain of the counting relays. In addition, it closes the dialing circuit which may be traced through the revertive pulse test circuit from conductor 3412, middle left contact of relay 3405, lowermost back contact of relay 3406, resistance 4109, upper normal contact of key 4110, winding of stepping relay 4026, winding of relay 4111, parallelled by resistance 4112 and the middle lower back contact of relay 4108, upper back contact of relay 4027, upper back contact of relay 4108, outer upper front contact of relay 3302, back contact of relay 4017, outer lower contact of relay 4009, lower normal contact of key 4110, resistance 4113, outer upper back contact of relay 3402, inner upper back contact of relay 3406, inner right front contact of relay 3405 to conductor 3413.

Outside the revertive pulse test circuit, the dialing circuit may be traced over conductor 3412, through cable 2716, fourth lower front contact of relay 2009, conductor 2021 through cable 2015, contact of cross-point 2433, conductor 2440 through cable 2436, inner lower front contact of relay 201, upper back contact of relay 206, winding of relay 713 and ground. Conductor 3413 extends through cable 2716, third upper contact of relay 2009, conductor 2022 through cable 2015, contact of cross-point 2433, conductor 2441 through cable 2436, inner upper front contact of relay 201, upper normal contact of relay 213, lower normal contact of relay 214, upper front contact of relay 207 to battery through the winding of relay 302 in parallel with battery through resistance 303 and with battery over the back contact of relay 305 and resistance 304.

With the dialing circuit closed in the test circuit, relay 302 operates, closing a circuit over its front contact, outer right back contact of relay 306, middle upper front contact of relay 301 to the winding of relay 305 and battery. Relay 305 operates and locks under the control of relay 302 and disconnects battery through resistance 304 from the dialing circuit to improve the operation of the test circuit stepping relay. Relay 305 also closes an obvious circuit for relay 306, which locks over its inner left front contact to ground at the lower front contact of relay 301. With relays 305 and 306 operated, ground connected over the inner right back contact of relay 306 and the right back contact of relay 305 to conductor 307 in shunt of the winding of stepping relay 713 is removed, permitting that relay to operate. Therefore, at the start of dial pulsing, relays 302, 713, 305 and 306 of the sender are operated. Relay 306 in operating opens the holding circuit of relay 301 which releases, at the same time releasing select magnet 904.

In the test circuit relay 4111 does not operate, being polarized, but relay 4026 operates, closing a circuit from ground over its contact, back contact of relay 4016, back contact of relay 4011, inner upper back contact of relay 4022, inner upper front contact of relay 4023 to the inner left contact of key 3912, inner upper back contact of relay 3314, upper front contact of relay 4007 to the winding of relay 4001 and battery over conductor 3303. Relay 4001 operates, locking through the winding of relay 4011, front contact of relay 4001, back contact of relay 4006, to ground over conductor 4025. Relay 4011 does not operate, being shunted by the operating circuit of relay 4001 as long as relay 4026 remains operated.

When relay 713 operates, it closes a circuit from ground over the upper front contact of relay 705, front contact of relay 713, lower front contact of relay 705 to the winding of relay 715 and battery. Relay 715 connects ground over its upper front contact to the winding of relay 302 to hold that relay operated and in shunt of the stepping relays of the sender and test circuit. At its lower front contact, relay 715 connects ground over the auxiliary contact of jack 716, conductor 717, left back contact of relay 308 to battery through the winding of relay 311. Relay 311 closes a locking circuit for itself from ground at the outer right front contact of relay 305, left front contact of relay 311, back contact of relay 309, right winding of relay 308, winding of relay 311 and battery, but relay 308 does not operate, being shunted by the operating circuit of relay 311.

Due to the shunting of its winding, relay 713 releases, in turn releasing relay 715 and opening the shunt around relay 308, which now operates.

The release of relay 715 permits relay 713 to reoperate, in turn reoperating relay 715 which recloses the shunt circuit for the second pulse. The pulsing circuit for the second pulse extends over conductor 717, left front contact and winding of relay 308 to battery through the right winding of relay 309. Relay 309 operates and holds relay 308 operated but relay 311 is released. A locking circuit for relay 309 which extends from battery through its left winding and left front contact, and the right front contact of relay 311 to ground at the contacts of relays 305 and 306 blocks the pulsing if relay 311 does not release. When relay 715 releases at the end of the second pulse, relays 308 and 309 release, leaving these relays in their normal condition, ready for additional pulsing.

With relay 308 normal, ground is connected over the middle and inner right front contacts of relay 306 and the inner left front contact of relay 305 in parallel over the outer right armature of relay 308 and its back contact to conductor 312. When relay 308 is operated, this same ground is extended over the inner right armature of relay 308 and its front contact to conductor 313. Relay 308 is operated following odd pulses and normal following even pulses. Ground on conductor 313 during the first pulse completes a circuit over the left back contacts of relays 324 and 322, right back contacts of relays 323 and 325 to the winding of relay 321 and battery. Relay 321 locks over its own inner right contact, normal contacts of relays 322, 323, 324 and 325, conductor 327, to ground over the normal contact of relay 301 and conductor 219.

Ground on conductor 312 from the second pulse operates relay 322 over the front contact of relay 321. Relay 322 locks to the above chain circuit, releasing relay 321. In a similar manner, successive pulses operate relays 323, 324, 325 and 326, relay 325 locking under the control of relay 321 and relay 326 locking to conductor 327 independent of the other relays. Succeeding pulses operate relays 321 to 324 a second time. With relay 326 normal, relays 321 to 325 close circuits for operating select magnets 900 to 904. Relay 325 operated with relay 326 prepares the circuit for select magnet 405, while, with relay 326 operated, relays 321 to 324 prepare circuits for magnets 406 to 409.

Returning to the test circuit, since relay 4026 operated relay 4001, the release of relay 4026, in response to the first revertive pulse, permitted relay 4011 to operate. With relay 4011 operated, the reoperation of relay 4026 closes a circuit as above to the armature of relay 4011 and its front contact, upper back contacts of relays 3316 and 3317, conductor 3318, winding of relay 4000 to battery over conductor 3303. Relay 4000 closes a locking circuit for itself through the windings of relays 4010 and 4017 in parallel, front contact of relay 4000, back contact of relay 4006 to grounded conductor 4025. When the next pulse is received, relays 4010 and 4017 operate in this locking circuit. Relay 4017 opens the dialing circuit, causing stepping relay 4026 of the test circuit to release as well as relays 302 and 713 in the sender, thereby stopping pulsing after two revertive pulses have been transmitted.

Relay 4010 closes a circuit from grounded conductor 4008, front contact of relay 4010, conductor 4028, inner lower back contacts of relays 3406 and 4108, lower back contacts of relays 4019, 4020, 4021 and 4022, outer lower front contact of relay 4023 to the winding of relay 3309 and battery. Relay 3309 closes a locking circuit for itself through the winding of relay 4022, outer lower front contact of relay 3309, upper back contact of relay 4021 to grounded conductor 4008. Relay 4022 does not operate until relay 4010 releases. Relay 3309 closes an obvious circuit for relay 3314. Relay 3314 opens the locking circuit of relay 4009, causing that relay to release and remove ground from conductor 4025, releasing the counting relays 4000, 4001, 4010, 4011 and 4017. Relay 4009 also further opens the dial pulsing circuit.

Relay 4010 in operating opened the operating circuit for relay 3302. With relay 3302 released, the dial pulsing circuit is further opened and ground through condenser 3319 is connected over the upper back contact of relay 3302, lower winding of relay 3304, middle right front contact of relay 3405, right normal contact of key 3305 to battery over conductor 3404 and the inner right front contact of relay 3400. Relay 3304 operates on the charging current of condenser 3319 which will decrease as the condenser becomes charged until the relay finally recloses its contact. Therefore, relay 3304 holds the circuit of relay 3302 open for a measured interval, at the end of which time relay 4010 should have released, reclosing the circuit of relay 3302. The purpose of this timed release period for relay 3302 is to test the ability of the sender to advance to the next selection within that time. This action takes place between each selection. Key 3305 varies the resistances in the circuits of relay 3304 so as to test the sender both for a minimum opening of the dial pulsing circuit and for a maximum length of opening. When the test circuit opened the dial pulsing circuit, relay 322 had been operated during the transmission of the second revertive pulse. The release of relay 302 in turn releases relay 305, and relay 306 also releases if relay 301 has released following the frame registration. With relay 306 released, a circuit is closed from ground at the upper back contact of relay 718, conductor 719, lower normal contact of relay 301, right back contact of relay 326, inner left back contact of relay 306, outer left front contact of relay 322, winding of select magnet 901, winding of relay 970 to battery. Select magnet 901 extends its operating ground to the winding of relay 301 as described for frame registration. Relay 301 locks under the control of relays 218 and 306 and releases relay 322.

When relay 301 previously released, it permitted relay 217 to operate in the locking circuit of relay 208. Relay 301 now connects ground from the conductor 215 over its uppermost front contact, and the front contact of relay 217 to resistance 209 in shunt of the winding of relay 208, causing that relay to release but holding relay 217 operated. With relay 208 released and relay 217 operated, a circuit is closed from battery through the winding of hold magnet 411, back contact of magnet 413, outer upper front contact of magnet 410, conductor 414, lower back contact of relay 208, lower front contact of relay 217, through the windings of relay 218 to battery and grounded conductor 219. Magnet 411 operates, closes cross-point 911, and locks over conductor 415 through cable 416 to ground at the fourth upper front contact of relay 201. This locking ground, as before, operates relay 218. When the pulsing circuit is reestablished and relay 306 operates, relay 301 is released. When relay 301 releases, relay 217 also releases.

When relay 4010 releases, relay 4022 operates in the locking circuit of relay 3309 and releases relays 3311 and 4023. With relays 3314 and 4022 operated, ground from conductor 4008 is connected over the upper back contact of relay 4023, inner lower front contact of relay 4022, outer lower front contact of relay 3314, lower back contact of relay 3320 to conductor 3411 and thence, as previously traced, to the winding of relay 4009 and battery. Relay 4009 locks and recloses the pulsing circuit. Relay 4022 also connects lamp 4029 to conductor 4008 to indicate that incoming group selection is being tested.

Incoming group, final brush, final tens and final units selections are made in the same manner as described for incoming brush selection; relays 3309 and 4022 being operated for incoming group, relays 3320 and 4021 for final brush, relays 3317 and 4020 for final tens and relays 3316 and 4019 for final units registration. Relays 3321 and 3322 are used in connection with incoming group registration. Relay 3321 is operated if an odd thousands key is operated, while relay 3322 is operated if one of the hundreds keys 3325 to 3329 is operated. For final tens or units selections, where more than five pulses are received, relay 4007 releases after relay 4005 has operated to modify the circuit of relay 4000.

When final units selection has been received, with relays 3316 and 4019 operated, relays 4000, 4017 and 4010 operate as before, relay 4017 opening the pulsing circuit. Relay 4010 closes a circuit from grounded conductor 4008, front contact of relay 4010, conductor 4028, inner lower back contacts of relays 3406 and 4108, outer lower front contact of relay 4019 to the winding of relay 3409 and battery. Relay 3409 closes a locking circuit for itself through the winding of relay 4108, upper front contact of relay 3409 to grounded conductor 4008, but relay 4108 does not operate until relay 4010 releases in the manner above described. Relay 4108 releases relays 3316 and 4019. Relay 3409 closes a circuit for lamp 3414 over the upper back contact of relay 3406, outer lower front contact of relay 3409 to ground on conductor 4101. When relay 4009 reoperates, it recloses the pulsing circuit.

In the sender, cross-points 912, 913, 417 and 418 have been operated by hold magnets 413, 419, 420 and 421, respectively. At the end of the final units pulsing, relays 302, 305 and 306 release and reoperate in response to the closure of the pulsing circuit in the test circuit. With hold magnet 421 operated, the reoperation of relay 306 closes a circuit from ground at the outer lower front contact of hold magnet 421, conductor 422, outer left front contact of relay 306 to the winding of relay 213 and battery. Relay 213 locks over its outer upper front contact to ground at the third upper front contact of relay 202. With hold magnet 421 operated, ground is connected over its inner lower front contact to conductor 307 in shunt of the winding of stepping relay 713. When relay 213 operates, the connections of the tip and ring conductors to battery and ground are reversed, the tip conductor extending over the lower alternate contact of relay 213 to ground at the inner lower front contact of relay 207, while the ring conductor is connected over the upper alternate contact of relay 213 to relay 302. The connection of ground to the ring conductor over conductor 307 now closes a circuit for heavily energizing relay 302.

Relay 213 closes an obvious circuit for relay 206 which operates slowly, disconnecting ground from the winding of relay 302 after an interval, thereby transmitting a reverse battery pulse to the test circuit. Relay 206 in operating opens the circuit of relay 207.

In the test circuit this reverse battery pulse operates polarized relay 4111 as well as stepping relay 4026. With key 4104 normal, the test circuit tests the sender for a minimum reverse battery interval, while with the key operated it tests for the maximum allowable interval.

Assuming first that key 4104 is normal, relay 4102 is energized in a direction to close its right contact by a circuit from battery through resistance 3307, second upper front contact of relay 3300, conductor 3308, lower back contact of relay 4103, lower normal contact of key 4104, upper winding of relay 4102, conductor 3323, to ground at the inner upper front contact of relay 3300.

Its lower winding is included in a circuit from battery on conductor 3404, inner upper back contact of relay 4103, outer upper normal contact of key 4104, lower winding of relay 4102, conductor 4105, inner upper back contact of relay 3309, resistance 3310, inner upper front contact of relay 3302, condenser 3319 to ground.

Prior to the operation of relay 4111, the lower winding of relay 4102 is grounded over a circuit which extends in parallel from conductor 4105 over the lower back contact of relay 4106, or over the lower back contact of relay 4106 and the middle upper back contact of relay 4103, to the upper back contact of relay 4106, right contact of relay 4111, right contact of relay 4102 to ground over conductor 4018. The operation of relay 4111 opens this direct ground and permits condenser 3319 to charge to measure a time interval prior to the closure of the left contact of relay 4102. If the reverse battery is removed by the sender circuit before relay 4102 closes its left contact, the release of relay 4111 recloses the direct ground, relay 4102 cannot operate and the test is blocked.

If the reverse battery remains long enough, relay 4102 closes a circuit from ground on conductor 4018, left contact of relay 4102, inner lower back contact of relay 4103, inner upper normal contact of key 4104, lower front contact of relay 3407 to the winding of relay 3406 and battery. Relay 3406 locks over its inner lower front contact to grounded conductor 4018. Relay 3406 also opens the circuit of lamp 3414 and extends the lamp circuit over its outer upper front contact, outer upper back contact of relay 3416 to lamp 3502 and battery.

Assuming, on the other hand, that key 4104 is operated, the circuit through the upper winding of relay 4102 is extended through resistance 4114, while the circuit of the lower winding of relay 4102 is extended through resistance 4116 in order to make relay 4102 more slow-acting. The circuit in shunt of condenser 3319 is the same as before. With key 4104 operated, the closure of the left contact of relay 4111 completes a circuit from grounded conductor 4018, right contact of relay 4102, left contact of relay 4111, inner lower operated contact of key 4104, winding of relay 4106 and battery. Relay 4106 locks over its lower front contact to conductor 4018.

Relay 4111 should reclose its right contact before relay 4102 opens its right contact, in which case the ground as above traced is extended over the right contact of relay 4111, upper front contact of relay 4106 to the winding of relay 3406 and battery, relay 3406 locking as before described.

If the sender does not cut off the reverse battery soon enough, the operation of relay 4102 disconnects ground from the armature of relay 4111 and blocks the test.

Assuming that relay 3406 has been properly operated, the test circuit prepares to test the trunk closure circuit. Relay 3406 disconnects the tip and ring conductors from relays 4026 and 4111 and extends the tip conductor over its middle upper front contact to ground through the winding of relay 3417 and the ring conductor over its outer lower front contact to the lower armature of relay 3418.

In the sender, the release of relay 207 terminates the reverse battery pulse and starts the release of relay 203. The release of relay 203 connects the tip conductor over the outer upper back contact of relay 203, lower front contact of relay 204 to battery through ballast lamp 205 to await trunk closure. It also connects the ring conductor over its inner upper back contact and the middle upper front contact of relay 204 through resistance 221 to battery for the purpose of discharging the interoffice cable from the reverse pulse. Relay 203 also disconnects ground from conductor 2439, thereby opening the operating circuit for relay 3407.

Relay 3417 operates in response to the battery connected to the tip conductor, and, with relay 3407 released, closes a circuit from battery through the winding of relay 3410, upper front contact of relay 3417, to ground at the upper back contact of relay 3407. Relay 3410 locks under the control of relay 3400 in a circuit from battery through its winding, outer right front contact of relay 3400 to ground at the middle lower contact of relay 3410. Relay 3410 also closes a circuit from ground over its inner lower contact, lower back contact of relay 3419, to the upper winding of relay 3418 and battery. Relay 3418 operates and connects ground from the inner lower front contact of relay 3410, lower and upper back contacts of relay 3419, lower front contact of relay 3418 to the ring conductor. Relay 3410 also closes a circuit from ground at its inner lower contact through the lower winding of relay 3418, upper back contact of relay 3419 to the upper winding of relay 3418 and battery, but the lower winding of relay 3418 is shunted over the lower contact of relay 3419.

The ground connected to the ring conductor, being in shunt of the winding of relay 204, causes relay 204 to release. Relay 204, in releasing, disconnects battery through resistance 221 from the ring conductor, and battery through ballast lamp 205 from the tip conductor. It also connects at its inner lower back contact battery through lamp 205 over the lower back contact of relay 203 and the outer lower front contact of relay 201 to conductor 2439 which extends, as previously traced, to conductor 3313. In addition, relay 204 closes a circuit from ground conductor 703, upper back contact of relay 720, outer lower back contact of relay 204, through resistance 721, in parallel with battery through resistance 722 and thence over the outer upper back contact of relay 704, to the winding of relay 723, conductor 724, through cable 2436, contact of cross-point 2433, conductor 2442 through cable 2015, lowermost contact of relay 2009, conductor 2023, inner lower back contact of relay 2601, conductor 2612, through cable 2716, fourth right contact of relay 3400, back contact of relay 4117, lower back contact of relay 4118, outer upper front contact of relay 3410, outer right front contact of relay 3405, resistance 3420, middle upper back contact of relay 3402, upper back contact of relay 4119, to the winding of relay 3416 and battery. Relay 3416 operates in this circuit but relay 723 is so polarized that it does not operate at this time.

The removal of battery from the tip conductor releases relay 3417. The connection of battery to conductor 3313 completes a circuit over the second lower front contact of relay 3300, inner upper front contact of relay 3410 to the winding of relay 3419 and ground. Relay 3419 operates, opening the circuits of relay 3418 and leaving the lower winding connected between ground at the inner lower front contact of relay 3410 and the ring conductor which was extended to the lower front contact of relay 3418, thereby testing for the removal of battery from the ring conductor. If relays 3418 and 3417 release and relay 3419 operates, a locking circuit is closed for relay 3416 from battery through the winding and over the inner lower front contact of relay 3416, back contacts of relays 3417 and 3418 to ground at the upper front contact of relay 3419. This locking ground extends back over conductor 2612 to the winding of relay 723, which, being connected to battery through resistance 722, may now operate. Relay 3416 also opens the circuit of lamp 3502 and extends the lamp circuit over its upper front contact and the lower back contact of relay 3421 to lamp 3503 and battery. In the sender, the operation of relay 723 closes an obvious circuit for relay 720 which locks over its inner upper front contact to grounded conductor 703. Relay 720 summons a marker by connecting battery over the lower normal contact of relay 702, upper normal contact of relay 701, lower back contact of relay 718, inner lower front contact of relay 720, to conductor 725 which extends through cables 726 and 972 to the marker connector, winding of relay 1000 to ground. Relay 1000 closes a circuit for multicontact relay 1001 from battery on conductor 725, outer right back contact of relay 1002, winding of multicontact relay 1001, outer left front contact of relay 1000, outer left back contact of relay 1003 to ground. Relay 1001 connects the sender to the cross-wires of the connector and extends battery from conductor 725 to conductor 1004, left back contact of relay 1005, to the winding of relay 1006 and ground. Relay 1006 operates multicontact relay 1007 completing the connection of the sender to the marker.

When relay 3400 operated, it connected ground over its second left contact, conductor 3422 through cable 3423 to the winding of relay 2800 and battery. With relay 2800 operated a circuit is closed from battery through the winding of relay 2821, middle right contact of relay 2800, to ground over conductor 1913. Relay 2800 connects ground to conductor 2610 through cable 2802, inner left back contacts of relays 2519 to 2515, and 1814 to 1811, inner left front contact of relay 1810, conductor 1832, contact of relay 1701, conductor 1720 through cable 1721, to the marker connector and over a contact of the multicontact relay 1001 individual to the sender under test, and relay 1007 individual to the selected marker to conductor 1008, to battery through the winding of relay 500 in the marker. Relay 500 operates, locks and connects the marker with the test circuit. It also indicates to the marker that it has been seized on a sender test call by disconnecting battery from conductor 501 which prevents the operation of a five-hundred block relay and therefore the selection of a number group.

Relay 500 also indicates to the test circuit that the marker has been seized by connecting ground to conductor 502, which extends through the marker connector, over contacts of relays 1007 and 1001, conductor 1009 through cables 972, 726 and 2436, contact of cross-point 2433, conductor 2443, through cable 2015, inner upper front contact of relay 2009, middle right front contact of relay 2012, conductor 2024, right contact of key 2500, conductor 2533 through cable 2802, to the winding of relay 2803 and battery. Relay 2803 closes an obvious circuit for relay 2804 which operates and locks over its lower front contact and conductor 2828 to ground at the middle left contact of relay 2800.

With relay 500 operated, the test circuit registers 2200, 2210, 2220, 2900, 2910 and check relays 2921, 2922 and 2923 are connected in parallel with the registers of the marker which are not shown. The operated cross-points of the sender, connect direct ground to the conductors necessary for transferring the recorded designation. When relay 2800 operated it grounded conductor 2805 thereby completing a circuit over the back contact of relay 2924, conductor 2926, back contact of relay 2100, conductor 2101 to the winding of relay 2925 and battery. Relay 2925 connects ground to conductors 2927, 2928 and 2929 operating relays 2921, 2922, and 2923 which are connected to conductors 2929, 2928 and 2927, respectively. These conductors extend ground through the marker connector to the closed cross-points and over them to the conductors not employed in transferring the designation.

By way of example, the circuits controlled by the incoming brush cross-point 911 will be traced in detail. At the left contact of cross-point 911, direct ground is connected to conductor 973 through cable 972, through the marker connector to conductor 1010, front contact of relay 500, conductor 503, cable 504, winding of relay 2202 and battery. The inner contacts of cross-point 911 receive ground over conductor 1012, cable 972, through the marker connector to conductor 506, contact of relay 500, conductor 2928, cable 504 and the inner lower contact of relay 2925. The left inner contact extends this ground over conductor 974, cable 972, through the connector to conductor 1014, contact of relay 500, conductor 508, cable 504, winding of relay 2204 and battery. The right inner contact extends this ground over conductor 975, cable 972, through the connector to conductor 1015, contact of relay 500, conductor 509, cable 504, winding of relay 2208 and battery. The circuit of the fourth relay of register 2200 is under the control of the incoming group cross-point 912 and may be traced from battery through the winding of relay 2201, conductor 510, cable 504, contact of relay 500, conductor 1016, through the marker connector to conductor 976, cable 972, left contact of cross-point 912, conductor 1013, cable 972, conductor 507, contact of relay 500, conductor 2929, cable 504 to ground at the upper contact of relay 2925. Therefore, the four relays 2202, 2204, 2208 and 2201 of the thousands register are operated. In a similar manner, all of the relays of the hundreds register 2210, tens register 2220, units register 2900 and frame register 2910 are operated. Relays 2921, 2922 and 2923 are also operated. In addition, relay 2930 is operated over conductor 2931, cable 504, contact of relay 500, conductor 511, through the marker connector, conductor 1017, cable 972, conductor 1011, cable 972, through the marker connector, conductor 505, contact of relay 500, conductor 2927, cable 504 to ground at the outer lower contact of relay 2925.

With all of these relays operated, a chain circuit is closed from battery through the winding of relay 2924, front contacts of relays 2923, 2922, 2921, 2930, 2920, 2915, 2914, 2912, 2911, 2901, 2902, 2904, 2905, 2225, 2224, 2222, 2221, 2211, 2212, 2214, 2215, 2201, 2208, 2204, 2202, back contact of relay 2806, conductor 2807, cable 504, contact of relay 500, conductor 512, front contact of relay 1006, to ground over a contact of multi-contact relay 1001 in the marker connector.

Relay 2924 operates if this chain circuit is complete locking over conductor 2807. The operation of relay 2924 opens the circuit of relay 2925, which releases, removing ground from conductors 2927, 2928 and 2929. The removal of this ground permits the register relays operated thereover to release, as well as relays 2921, 2922, 2923 and 2930, provided no false grounds or cross-connections exist in the wiring between the sender and the marker or between the sender and the test circuit.

Similar operations take place in the marker and must be successfully completed there to completely remove ground from conductors 2927, 2928 and 2929 and to permit the release of the above-mentioned relays.

When this takes place, a circuit is closed from grounded conductor 2805, upper front contact of relay 2924, back contacts of relays 2923, 2922 and 2921 to the winding of relay 2808 and battery. Relay 2808 operates slowly, to allow the release of all register relays which should release, and then closes a circuit for relays 2809, 2100 and 2102 in parallel. These relays close individual locking circuits for the register relays, thereby locking in the information transmitted from the sender to the marker. From the circuit above traced and an inspection of the drawings, it will be apparent that the following register relays are operated and locked: 2202, 2212, 2215, 2224, 2225, 2901, 2902 and 2914.

The operation of relays 2809, 2100 and 2102 closes a circuit from battery through the winding of relay 2103, left back contacts of relays 2104, 2105, 2106, 2810, 2811, 2812, 2813, front contacts of relays 2102, 2100, 2809, and 2804, conductor 2814 through cable 3423 to ground at the outer upper back contact of relay 4118. Relay 2103 is also slow to operate to allow all register locking circuits to close before releasing the sender.

Figure 10:
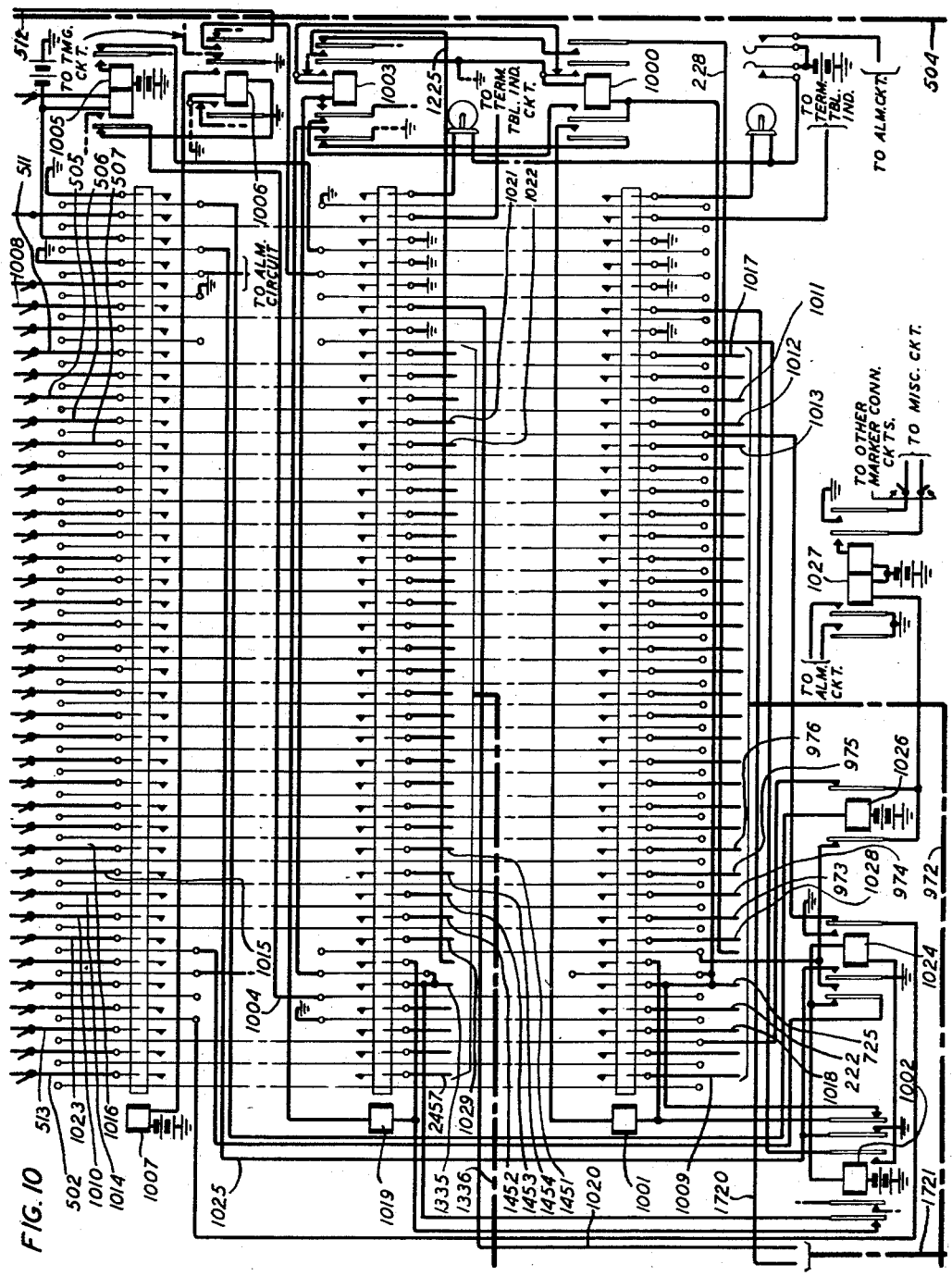
Fig. 10 shows a marker connector.
Figure 11:
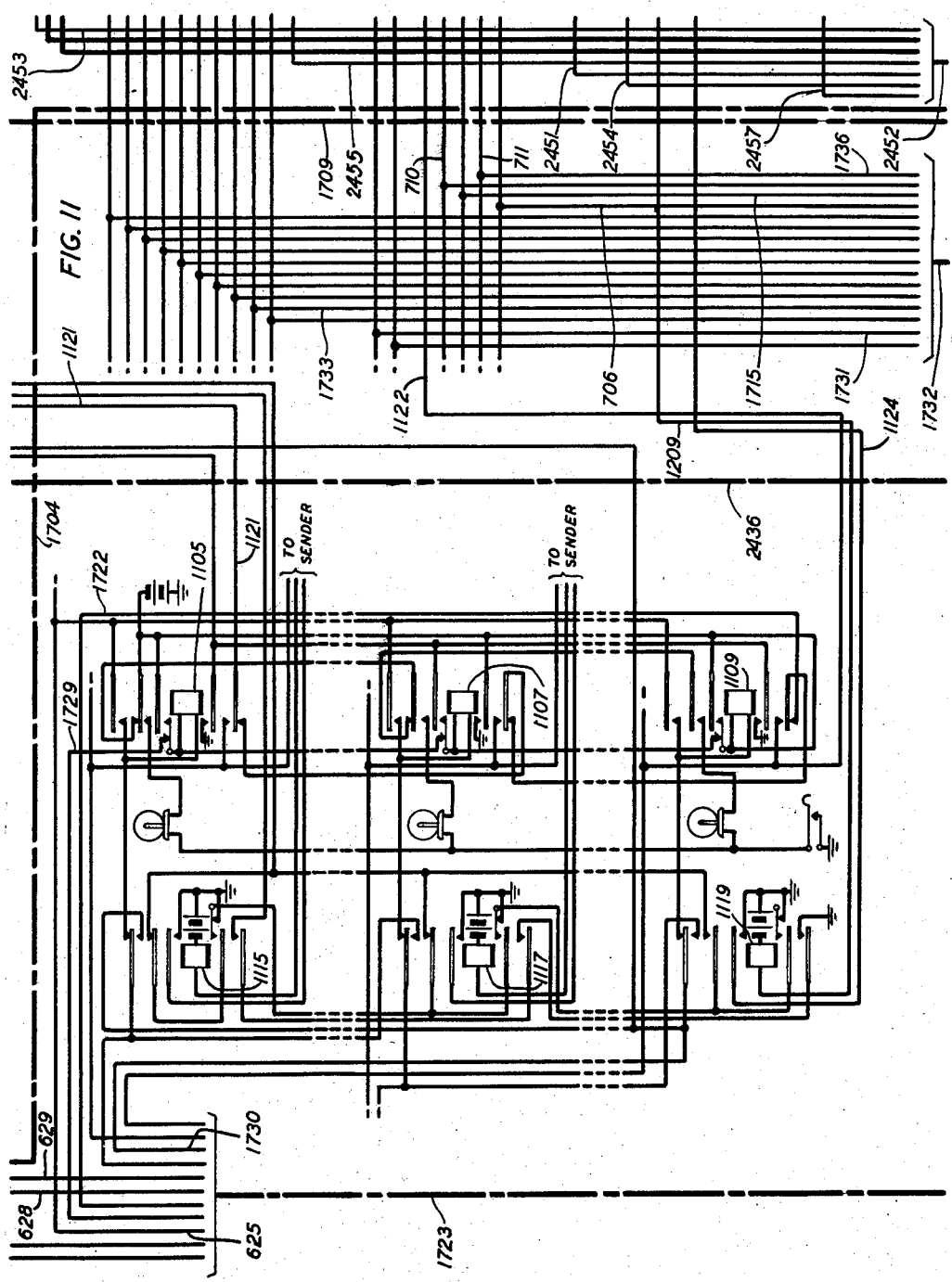

Relay 2103 closes a circuit from ground at the inner left front contact of relay 2800, conductor 2815, front contact of relay 2103, conductor 2107 through cable 504, contact of relay 500, conductor 513, through the marker connector to conductor 1018, through cables 972 and 726, back contact of relay 727, winding of relay 702 and battery. Relay 702 operates and locks over its lower front contact to grounded conductor 703. With relay 702 operated, battery is disconnected from conductor 725, thereby releasing the marker connector of Fig. 10 and the marker itself. Relay 500 is also deenergized, disconnecting the marker from the sender test circuit. With relay 500 released, the locking circuit of relay 2924 is opened and that relay releases, preparing the test circuit for checking the registrations received from the sender with those which were used in setting the sender.

Relay 2924 in releasing closes a circuit from grounded conductor 2805, back contact of relay 2924, conductor 2926, lower front contact of relay 2100, winding of relay 2104 to battery.

At the time that relays 2921 and 2911 were operated in closing the chain circuit, they completed a circuit from grounded conductor 2814, outer right contact of relay 2800, outer lower front contact of relay 2911, inner lower front contact of relay 2921, normal contact and winding of relay 2816, resistance 2817 to battery. Relay 2816 operates and locks over its lower alternate contact and the contact of relay 2800 to grounded conductor 2814. At this alternate contact, it also closes a circuit from battery through resistance 2819 and the winding of relay 2818 to ground, as above traced, but relay 2818 does not operate being shunted by the operating ground for relay 2816. Relay 2816 in operating connects ground over its upper front contact, conductor 2820, cable 3423, inner upper front contact of relay 3406, upper winding of relay 3421 and battery. Relay 3421 locks in a circuit from battery through its lower winding and inner lower front contact, to grounded conductor 4018. With relay 3421 operated, the lamp circuit is disconnected from lamp 3503 and extended over the outer lower front contact of relay 3421, conductor 3424, cable 3423, lower back contact of relay 2806, left back contact of relay 2108 to lamp 2119 and battery.

With relay 2104 operated, as above described, the registration of the thousands digit on register 2200 is checked against the setting of the thousand keys of the revertive pulsing circuit. It will be remembered that thousands key 3912 was operated. Relay 2014 transfers the ground used for operating relay 2103 to conductor 2109, which, with relay 2202 correctly operated, extends over the back contact of relay 2208, upper back contact of relay 2201, outer upper back contact of relay 2204, outer upper front contact of relay 2202, conductor 2226 through cable 2932, to lamp 3902 and battery and over the outer left contact of key 3912, conductor 3951 through cable 3952, inner right contact of relay 2821, right back contact of relay 2105 to the winding of relay 2108 and battery. Relay 2108 locks over its outer right contact to ground at the 8th upper contact of relay 2100, opens the circuit of lamp 2119 and extends its locking ground over the left back contact of relay 2110 to lamp 2111 and battery. A branch of this circuit extends to the winding of relay 2105 which operates to transfer the checking circuit to the hundreds register 2210.

In a similar manner the remaining digits are checked and relays 2110, 2106, 2112, 2810 and 2823 are operated and the corresponding lamps lighted. If the setting of a register is such that a lead is grounded, which does not correspond to the operated key in the corresponding row, no circuit will be provided for the check relay and the test circuit will block. The lamp, of Fig. 21 or 28 will indicate the digit being checked and the lamp of Fig. 32 or 39 will indicate the setting of the register.

Figure 31:
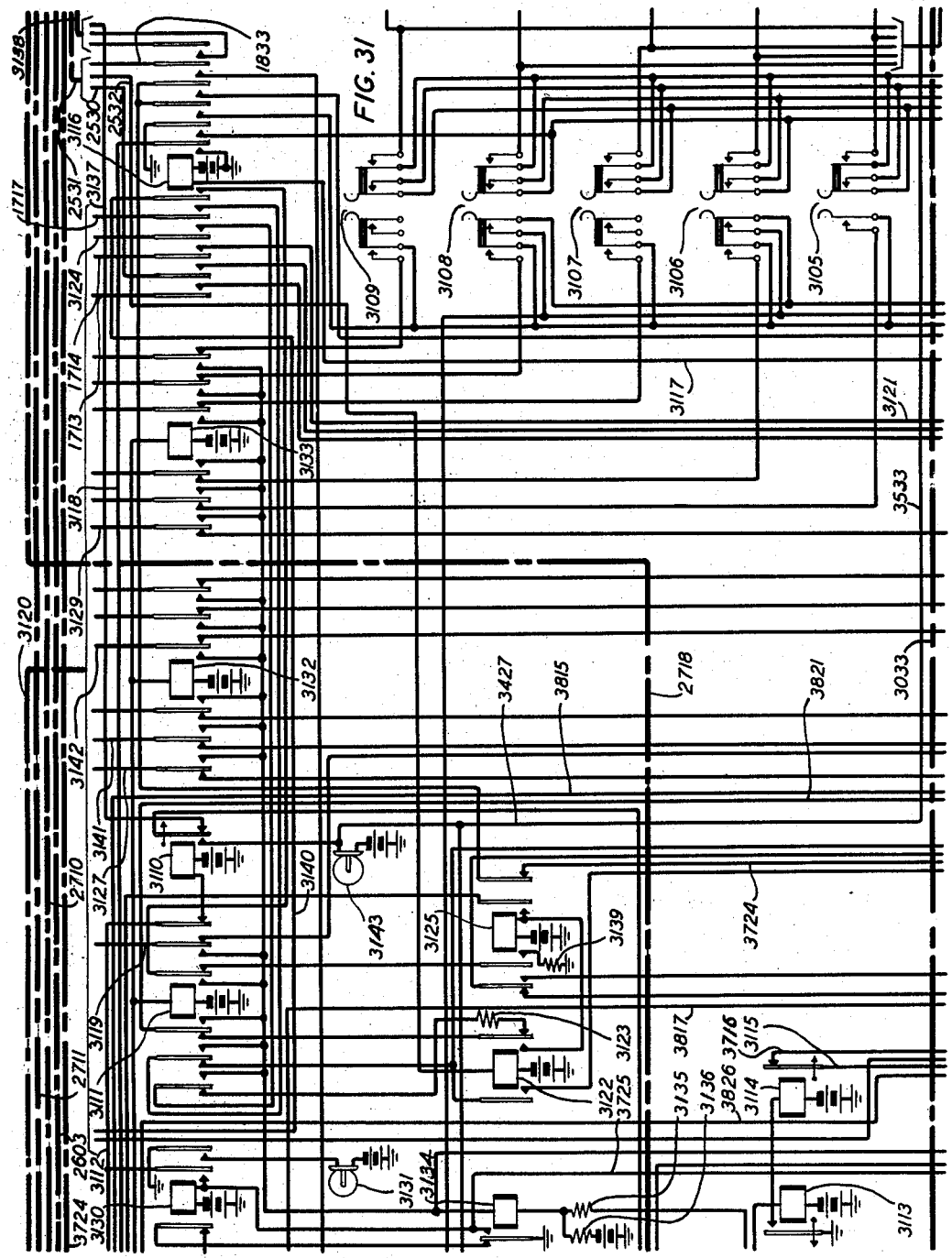
Figure 38:
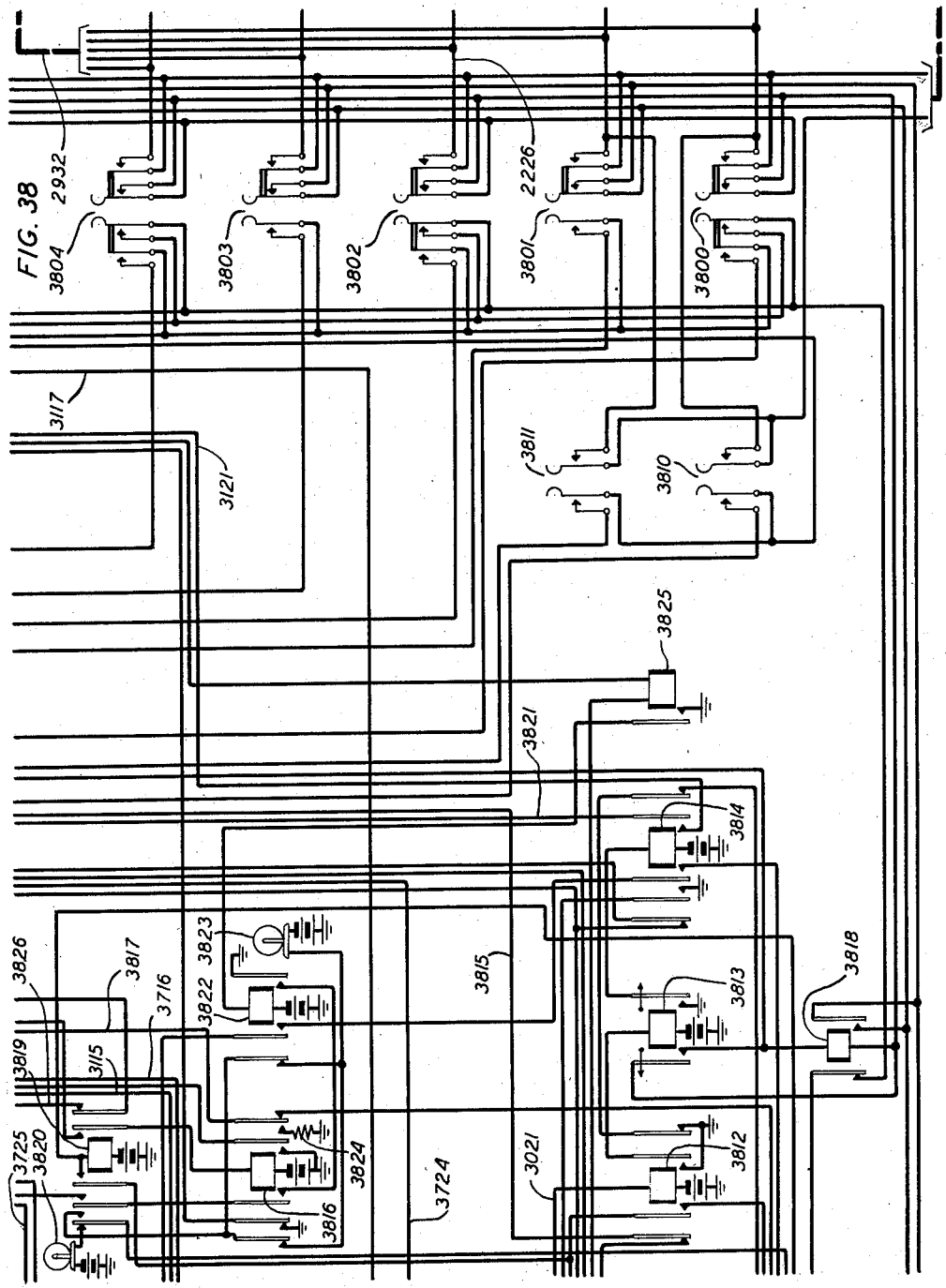

At the end of the check of the numerical registration relay 2811 is operated and the units digit of the frame registration is checked against the setting of the frame keys of Figs. 31 and 38, operating relay 2824 which in turn operates relay 2812. The operation or non-operation of the tens frame relay 2920 is then checked against keys 3810 and 3811, operating relays 2825 and 2813.

The operation or non-operation of the reorder relay 2930 is then checked against key 2933. With a full mechanical sender the key is never operated and therefore the circuit in the present case extends from ground, as previously traced to the left armature of relay 2813, front contact of that relay, back contact of relay 2930, normal contact of key 2933, outer left contact of relay 2821, right front contact of relay 2813 to the winding of relay 2826 and battery. Relay 2826 locks to ground over its outer right contact and the sixth upper contact of relay 2100, and extends its locking ground over conductor 2827 through cable 3423, upper front contact of relay 3421, conductor 3826, through cable 2716, upper back contact of relay 1906, conductor 1921, right normal contact of key 2713, inner left normal contact of key 2712, winding of register 2611 to battery to advance the test circuit to the next sender.

In the sender, the operation of release relay 702 in addition to releasing the marker, locks to off-normal ground on conductor 703, and disconnects that ground from the locking circuit of relay 201. Relay 201 does not release immediately, being held by a circuit which extends over conductor 222 through cables 725 and 972 to ground at a contact of multicontact relay 1001 of the marker connector.

When the marker connector releases, relay 201 releases, followed by relays 202 and 208, if operated. The release of relays 201 and 202 permits all of the remaining relays to release and restore the sender to normal. It also removes ground from conductor 2435 over which the magnets of the sender link are normally held.

In the test circuit, the operation of register 2611 closes a circuit from ground over its contact, over the outer left normal contact of key 1907, to the winding of relay 1914 and battery. Relay 1914 closes an obvious circuit for relay 1908. Relay 1908 in operating opens the circuits of relays 2012 and 2009, while relay 1914 opens the locking circuit of relay 2605. Relay 2012 in releasing disconnects ground from conductor 2019, thereby releasing relay 3400 and the revertive pulse test circuit. Relay 3400 in turn disconnects ground from conductor 3422, releasing relay 2800 and the register check circuit.

The release of relay 2800 disconnects ground from conductor 3826, releasing register 2611 and relays 1914 and 1908. With relays 1908, 1914 and 2605 released, ground is connected over the inner front contacts of relay 2600, normal contacts of relay 2605, inner upper back contact of relay 1914, lower back contact of relay 1908, lower front contact of relay 2004, to resistance 2001 and battery, in shunt of the winding of relay 2000, thereby releasing that relay.

With relay 2000 released, relay 2005 also releases. At its upper back contact, relay 2000 connects ground from conductor 1916 to conductor 2025 which is connected over the back contacts of the even-numbered hold magnets 2418, etc., outer lower front contact of relay 2410 to the windings of hold magnets 2401 and 2411. The operation of these hold magnets causes the crosspoints corresponding to the operated select magnet, in this case select magnet 2420 and therefore cross-point 2444, to close, connecting the leads of the second sender to the test circuit. Magnet 2401 also connects ground to conductor 2445 which extends through cable 2438 to the winding of relay 1811, which operates and lights lamp 1821.

Magnets 2401 and 2411 extend their operating ground over their inner lower front contacts, conductor 2446, normal contact of relay 2006, outer upper front contact of relay 2004, lower winding of relay 2605 and battery. Relay 2605 operates, locking and performing the functions previously described. In this case, however, with relay 2000 released, the operation of relay 2605 permits relay 2004 to release.

With relay 2004 released, ground from conductor 1917 is connected over the inner upper normal contact of relay 2004 and the normal contact of relay 2006 to conductor 2446 to lock the hold magnets 2401 and 2411. By releasing, relay 2004 disconnects ground from the locking circuit of hold magnets 2400 and 2410 opening cross-point 2433 and releasing relay 1810.

The test of the second sender proceeds in the same manner as the test of the first sender except that relay 2010 is operated in place of relay 2009 and at its completion register 2611 is operated, operating relays 1914 and 1908. These relays restore the circuit to normal, at which time relay 2000 is reoperated to operate the next pair of hold magnets. The advance from one hold magnet to the next is accomplished in the manner described above.

Test of "B" sender

Figure 12:
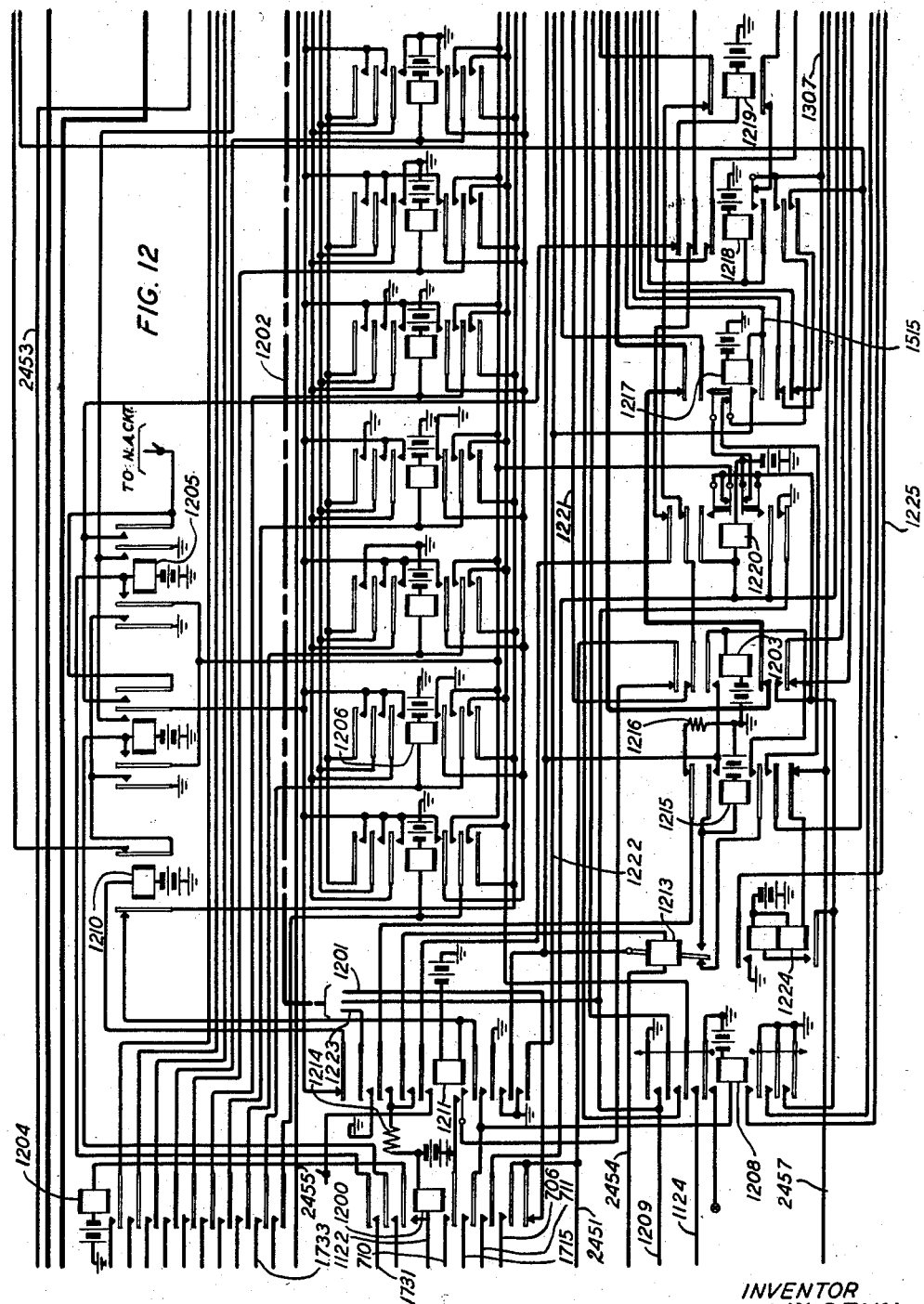
Figs. 12, 13, 14 and 15 show a "B" operator's sender.
Figure 13:
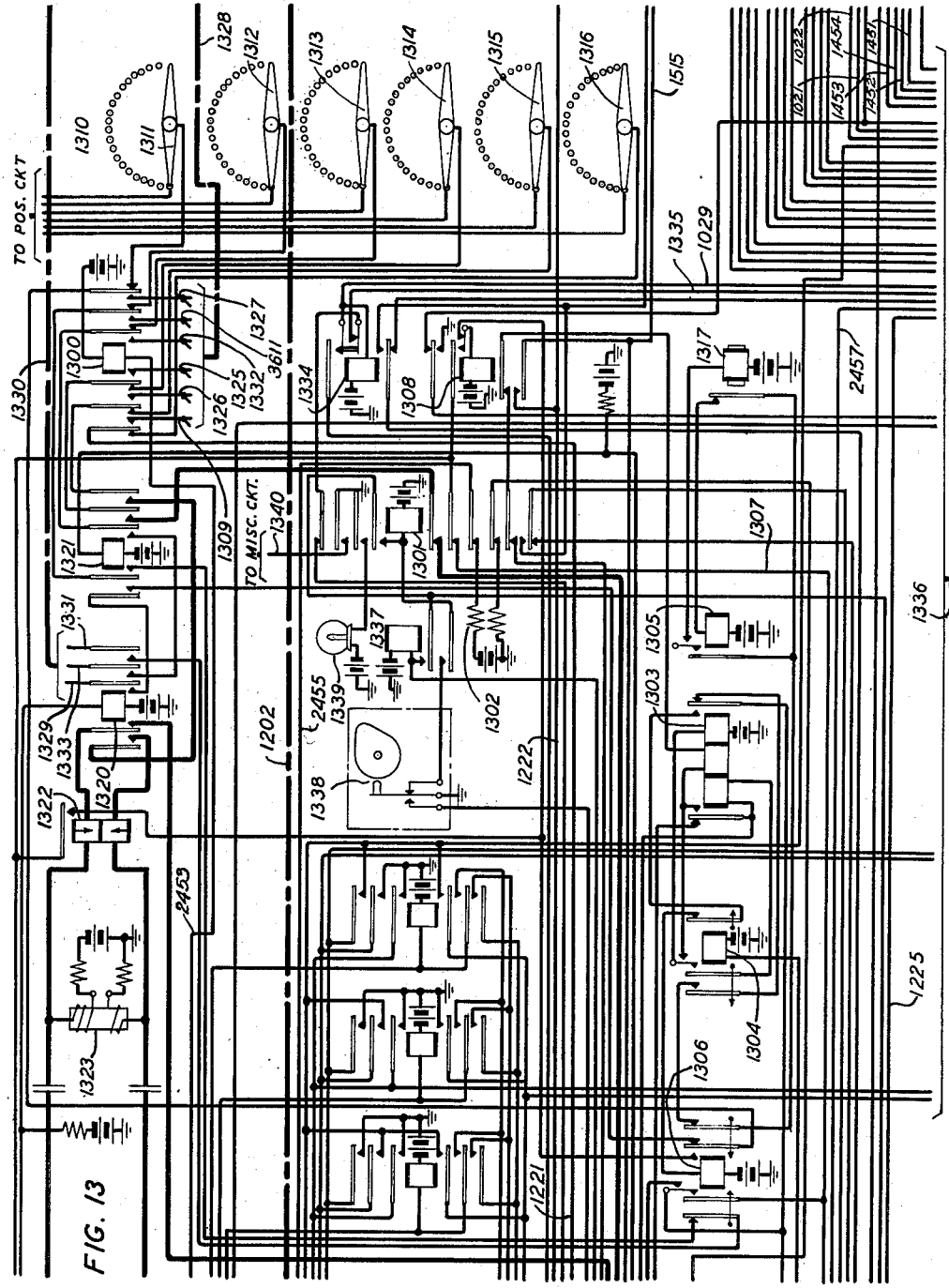
Figure 14:
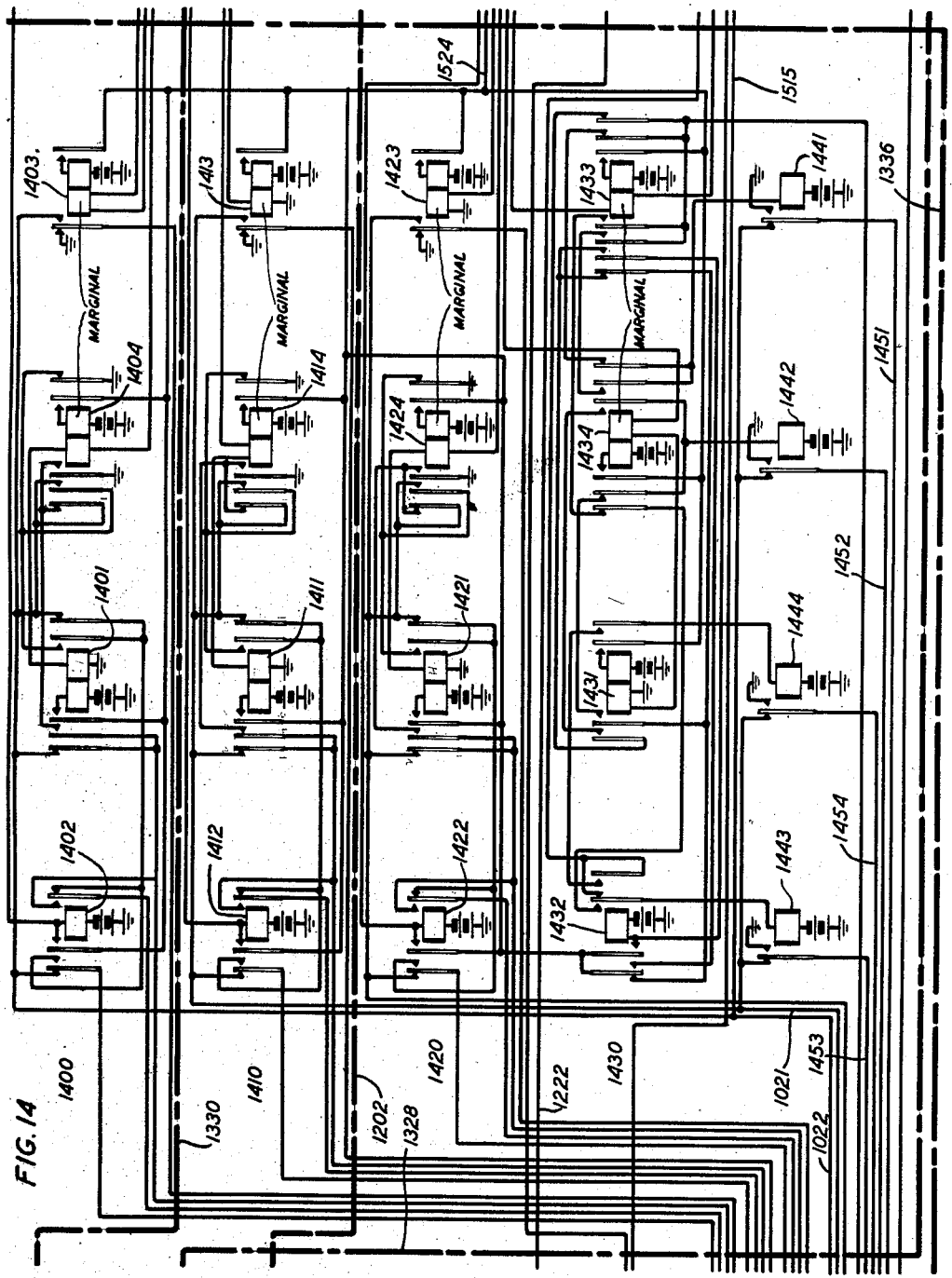
Figure 15:
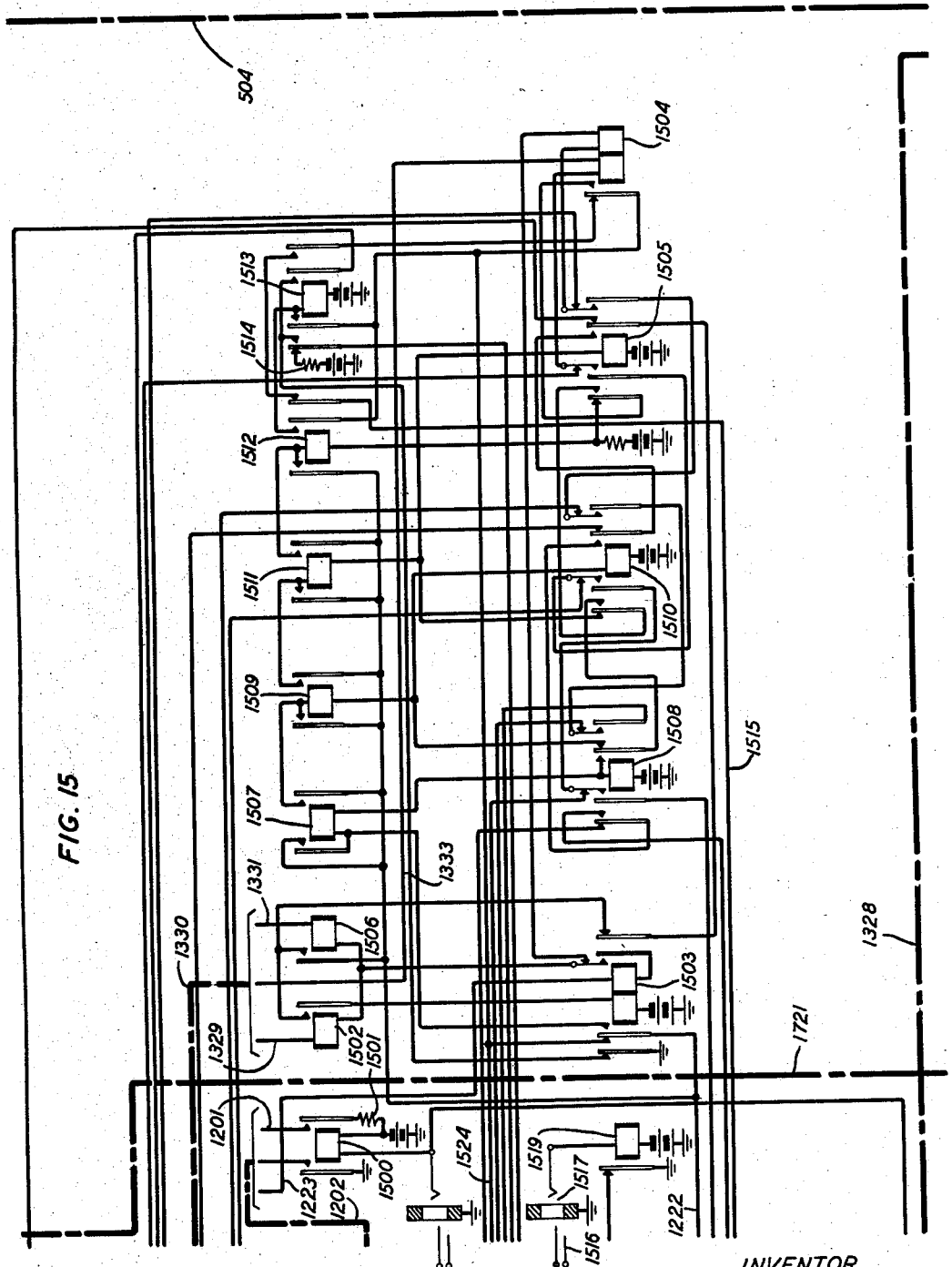
Figure 16:
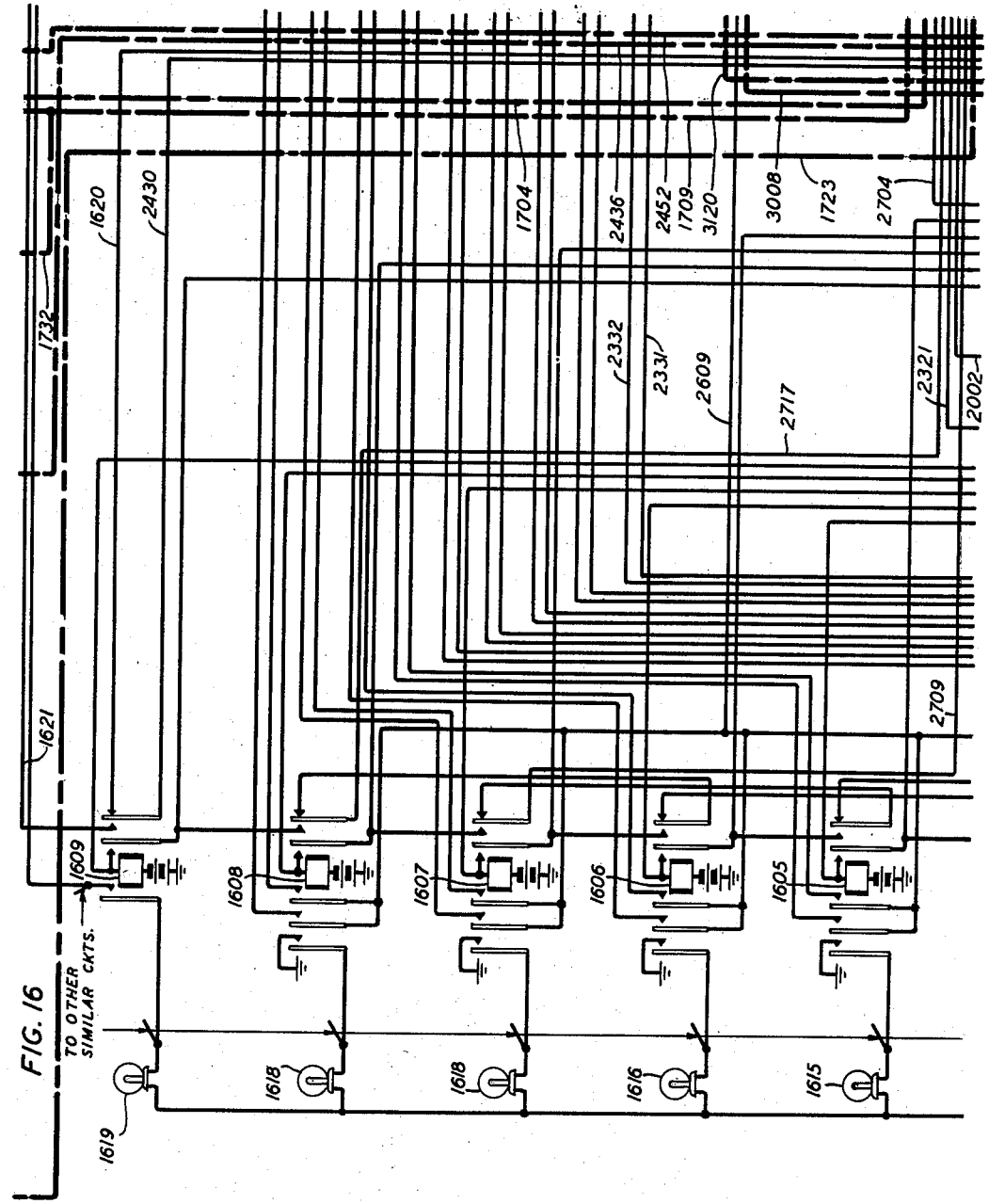
Figure 17:
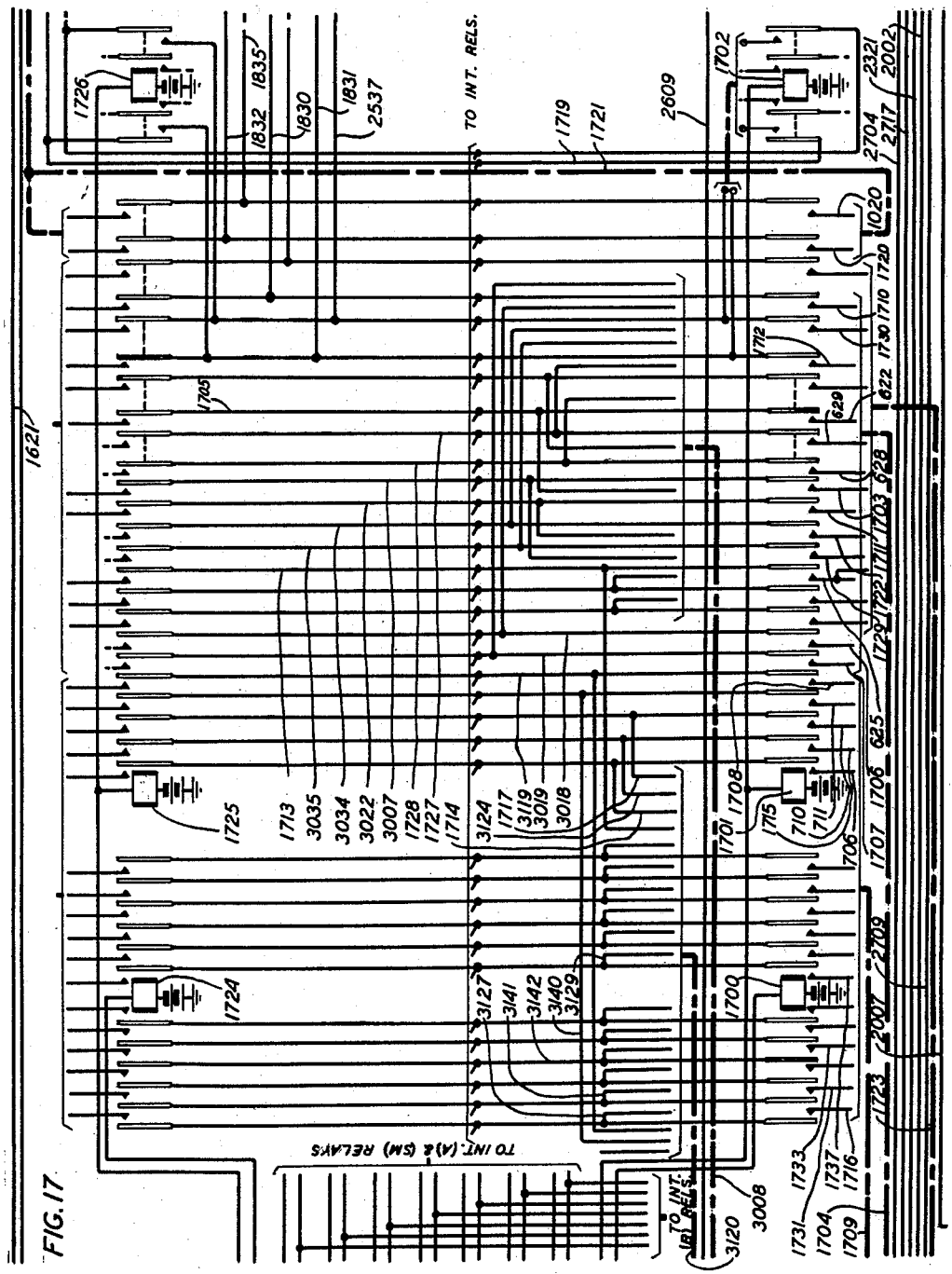
Figure 18:
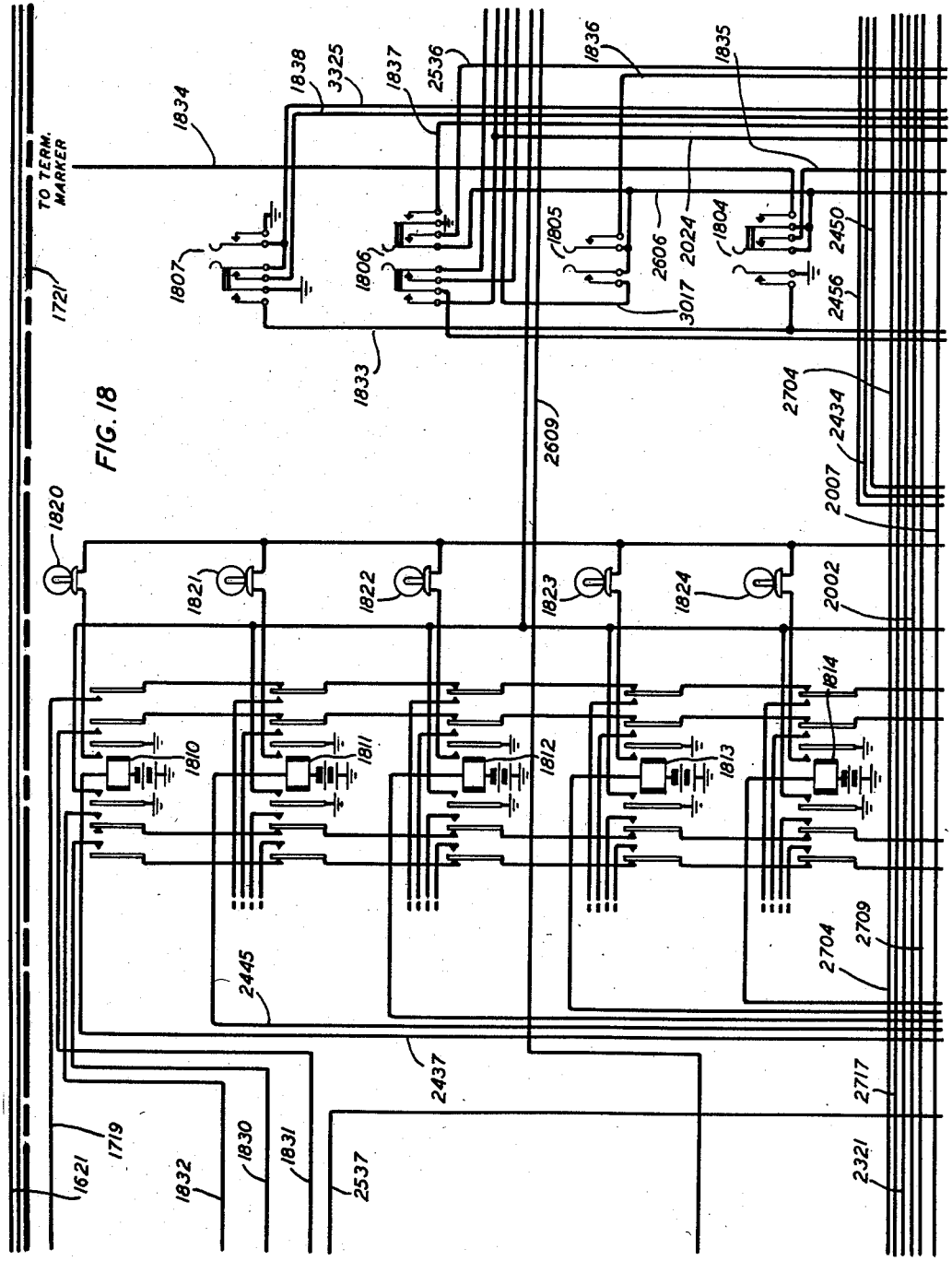
Figure 19:
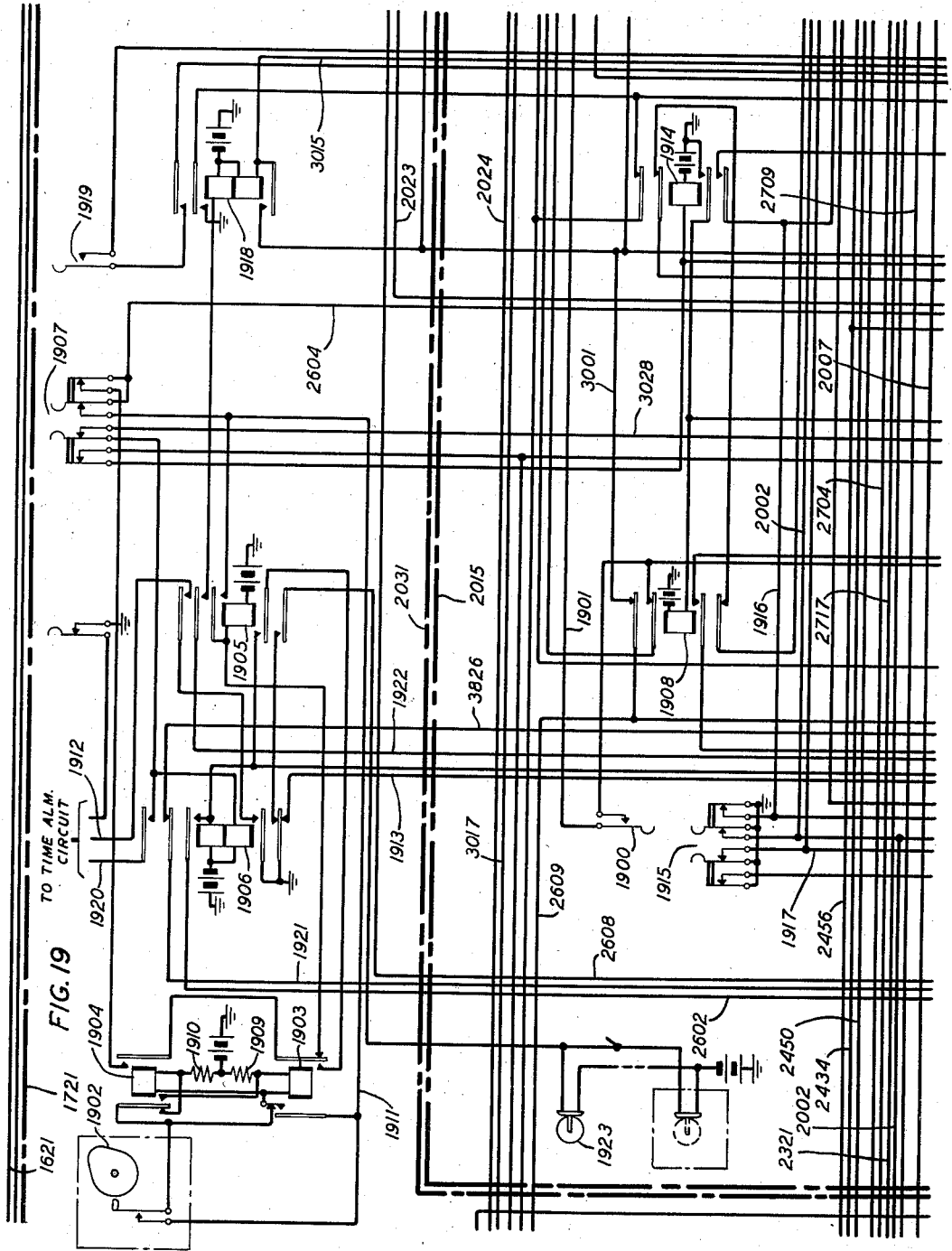
Figure 20:
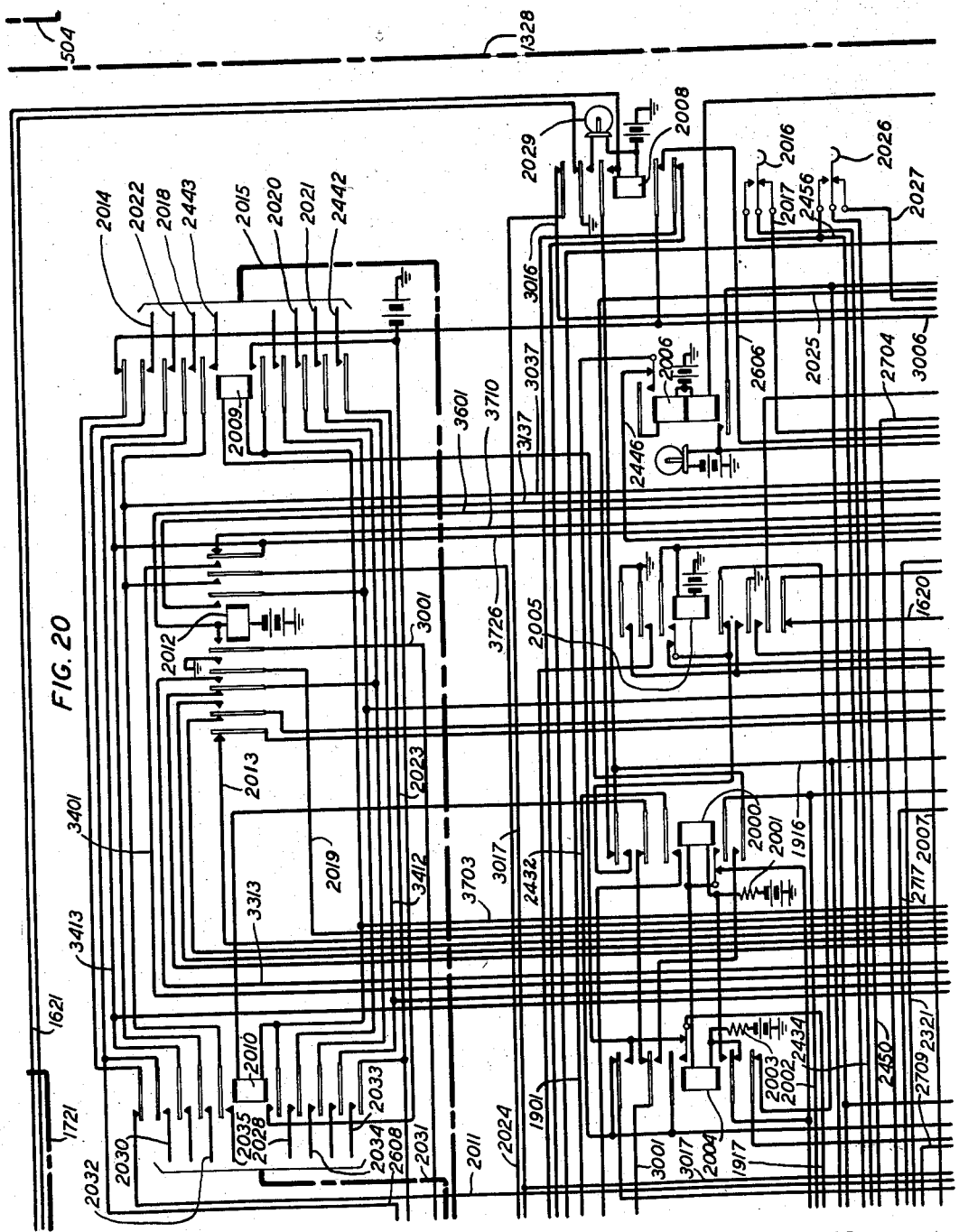
Figure 21:
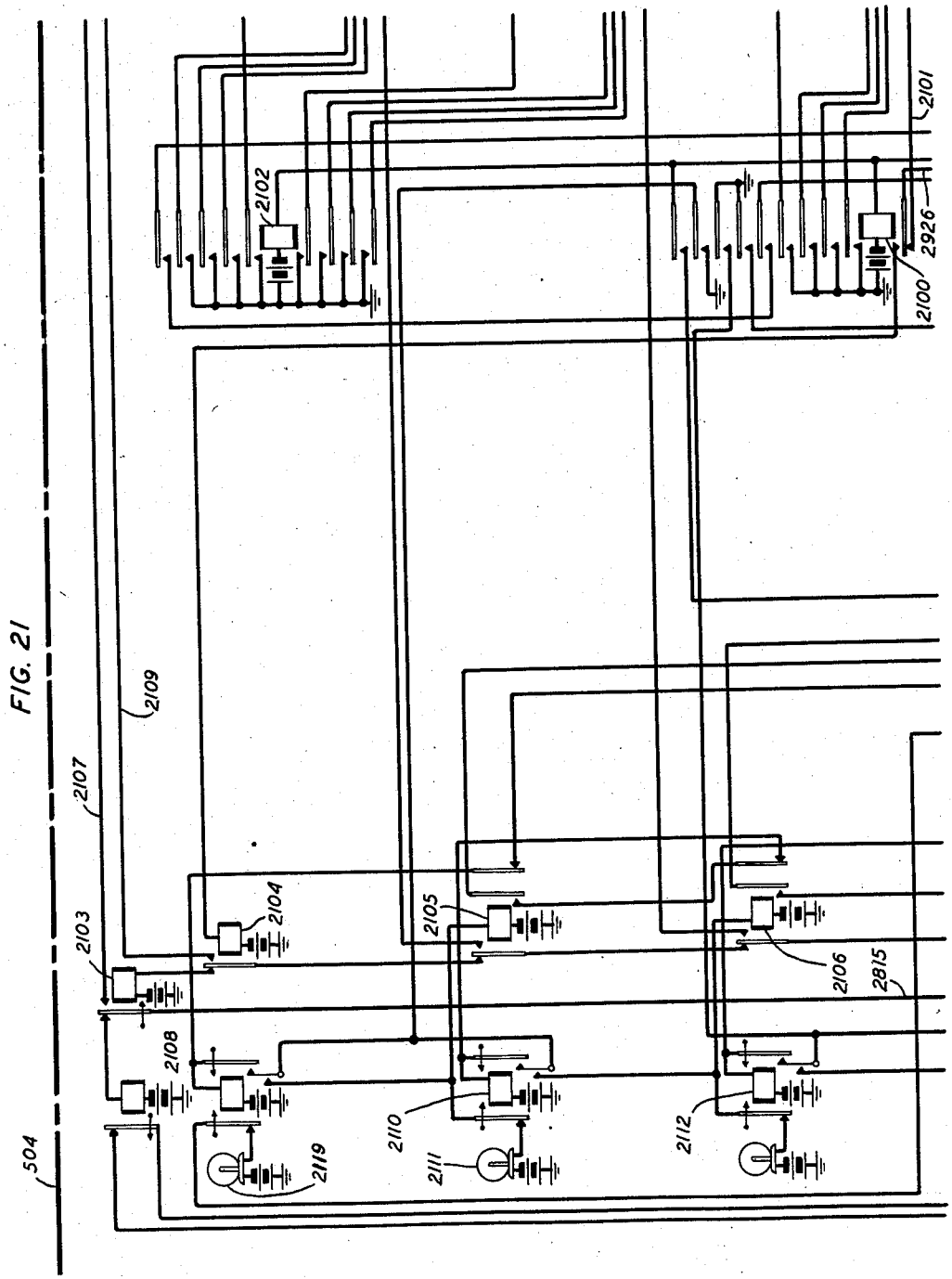
Figure 22:
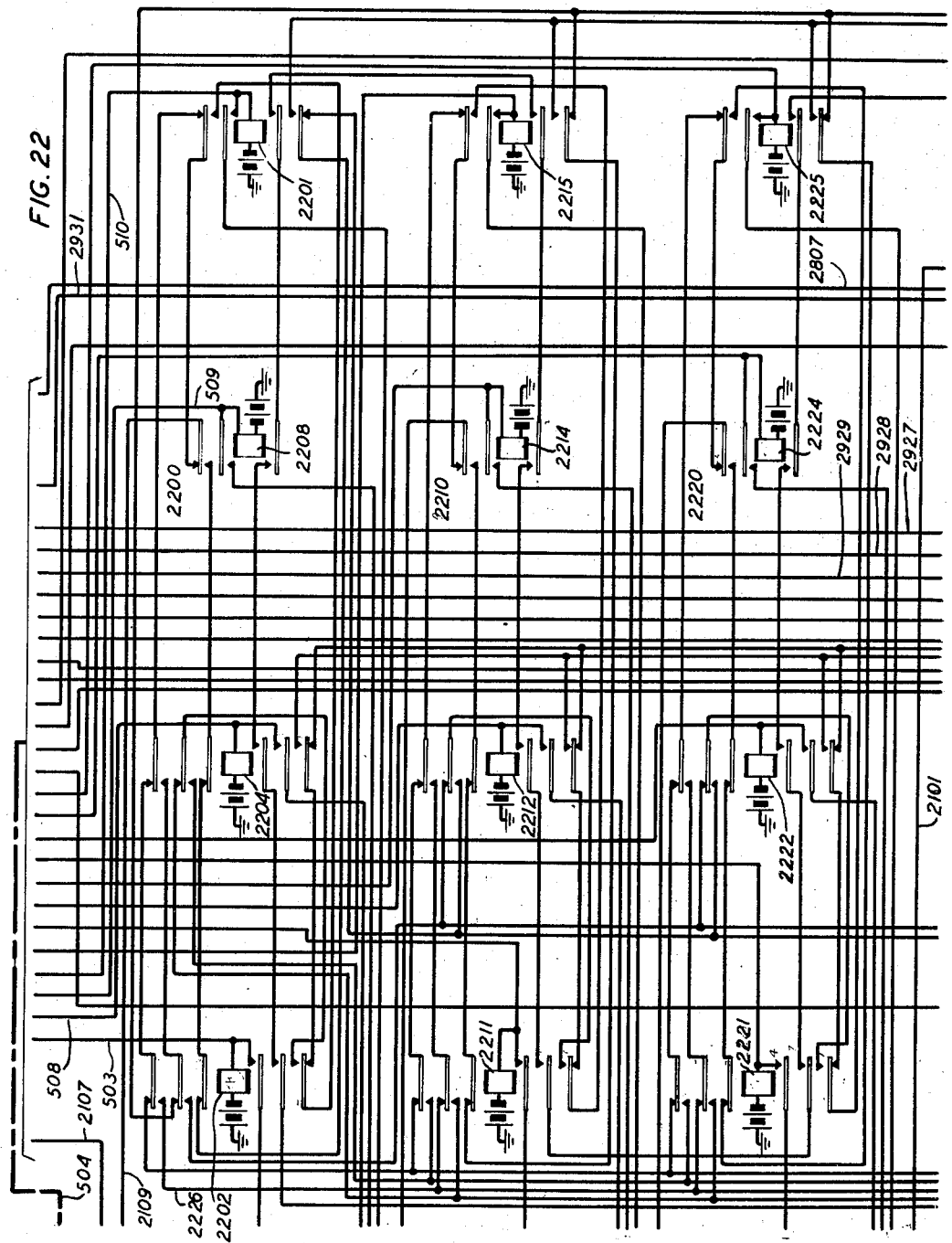
Figure 23:
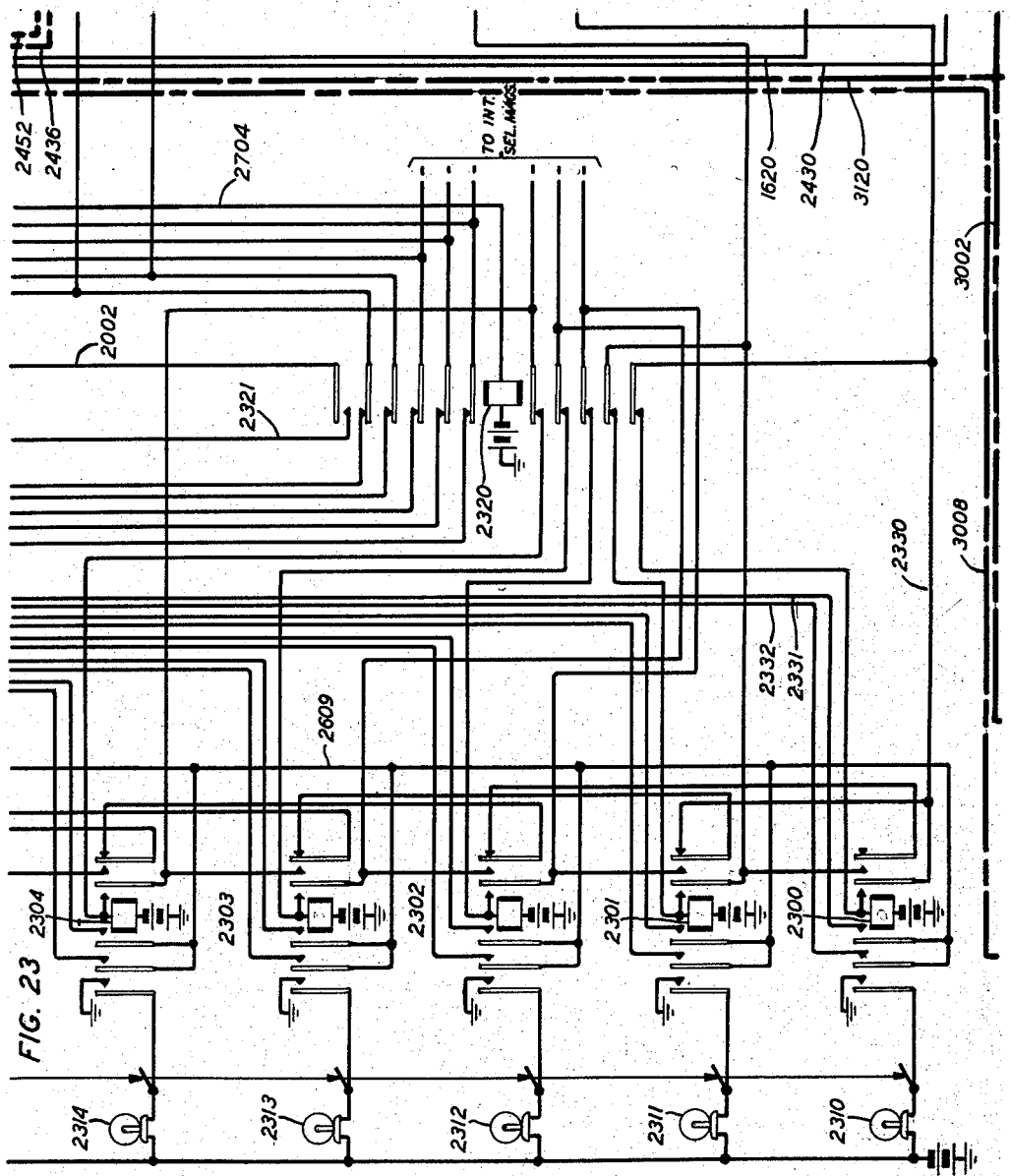

The cross-point 2449 closed when hold magnets 2409 and 2419 are operated, is shown connected to the B-type sender of Figs. 12, 13 and 14. The operation of hold magnet 2409 operates relay 2519.

The connector circuit functions as in the case of a full mechanical sender, causing, as previously described, relay 3700 to be operated, in turn operating relay 3701. Relay 3700 prepares the connection from relay 3707 to conductor 3710 for busy test purposes. Since the sender selected is a "B" sender, a circuit is completed, as soon as the cross-point is closed, from battery through resistance 2607, conductor 2608, outer upper front contact of relay 2010, conductor 2030 and the outer left contact of cross-point 2449 which is connected over conductor 2450, normal contact of key 2026, conductor 2027, through cable 2718, through the winding of relay 3005 to ground.

As before, the connector circuit operates relay 3702, which functions as before. If the sender group circuit is idle, relay 3704 operates in a circuit from battery at the innermost right contact of relay 3702, winding of relay 3704, outer right back contact of relay 3705, conductor 3706, third upper front contact of relay 3005, conductor 3034, through cable 3008, contact of relay 1701, conductor 1722 through cable 1723, lower back contacts of the sender test relays 1109, 1107, 1105, etc., conductor 1121 to ground at the back contact of relay 620. With relay 3704 operated, the connection between relay 3707 and conductor 3710 is completed, conductor 3710 extending through cable 2710, back contact of relay 2012, second upper front contact of relay 2010, conductor 2032, through cable 2031, contact of cross-point 2449, conductor 2451, through cable 2452 to test for make-busy battery which might be applied over the lower back contact of relay 1200, conductor 1201, through cable 1202, right contact of relay 1500 and resistance 1501.

Assuming that the sender is not made busy, relay 3707 does not operate and relay 3700 releases, its circuit having been opened by relay 3704. With relay 3700 released, conductor 3710 is connected to the winding of relay 3711 and battery to test whether the sender is busy in service, in which case conductor 3710 is grounded by the connection of ground to conductor 2451.

Assuming that the sender is idle, relay 3711 does not operate. The release of relay 3700 opened the circuit of relay 3701 and when relay 3701 releases, relay 3010 is operated to start further tests. If the group of B senders is busy, the sender busy relays including relays 1115, 1117 and 1119 are all operated and a circuit is closed from ground over the outer lower front contacts of relays 1119, 1117, 1115, etc., to the winding of relay 627 and battery. Relay 627 connects battery over its upper front contacts to conductors 628, 629, etc., which extend through cable 1723, over contacts of relay 1701, conductors 1727 and 1728 through cable 3008, right back contact of relay 3030, uppermost armature of relay 3005 to the winding of relay 3009 and ground, the operation of relay 3009 holding open the circuit of relay 3010. However, if the subgroup is idle, relay 3009 does not operate, but relay 3010 does, in turn operating relays 3000 and 3030. Relay 3030 connects battery to conductors 1727, 1728, etc., to mark the group busy to the sender links. Relay 3714 and 3715 are operated under the control of relays 1115 to 1119 as they were previously operated under the control of relays 610 to 614. With relays 3714 and 3715 operated, relay 3713 operates, in turn operating relays 3116 and 3003. With relay 3003 operated the circuit of relay 3720 extends as previously traced to the third left contact of relay 3003 from which it extends over the fourth upper front contact of relay 3005, conductor 3035 through cable 3008, contact of relay 1701, conductor 1729 through cable 1723, normal contacts of relays 1105 to 1109 and battery. Relays 3704 and 3720 extend ground to the sender preference lead, over a circuit which may be traced from ground through resistance 3721, as previously traced to conductor 3723, middle right front contact of relay 2519, contact of relay 1701, conductor 1730 through cable 1723, back contact of relay 1119, winding of relay 1109, conductor 2537, to battery. Relay 1109 locks in a circuit from battery over its inner upper front contact, winding and outer upper front contact, conductor 625 through cable 1723, contact of relay 1701, conductor 1713 and thence as previously traced to ground at the inner left back contact of relay 3816. Relay 1109 opens the circuits of relays 3714 and 3715. Relay 3717 then operates over a contact of relay 1109 and prepares the frame indication, while relay 1109 closes a circuit from ground at the back contact of relay 620, conductor 1121, outer lower back contacts of relays 1105, 1107, etc., outer lower front contact of relay 1109, conductor 1122, winding of relay 1200 and battery. Relay 1200 extends its operating ground to the winding of relay 1204, which cuts through the frame registration leads.

Relay 1109 opens the chain circuits over which relays 3720 and 3704 were operated and these relays release. Relay 3717 operated connects ground as previously traced to the third and fourth contacts of relay 3116 and the frame keys.

Assuming that keys 3811 and 3801 are operated, the ground extends over the left contact of key 3811, second left back contact of relay 3132, conductor 3141 through cable 3120, contact of relay 1700, conductor 1731 through cables 1709 and 1732, outer upper front contact of relay 1200, winding of relay 1205 and battery and over the left contact of key 3801, inner right back contact of relay 3132, conductor 3142 through cable 3120, contact of relay 1700, conductor 1733, through cables 1709 and 1732, lower front contact of relay 1204, winding of relay 1206 and battery. Relays 1205 and 1206 operate in these circuits, and prepare locking circuits for themselves.

As in the case of the full mechanical sender, the release of relays 3720 and 3704 connects relay 3812 in place of the ground previously connected to the winding of relay 1109, and thence over the locking circuit of relay 1109 to ground. Relay 3812 operates, in turn operating relays 3813 and 3814, and 3705. Relay 3705 closes a circuit which extends as previously traced from ground at the outer left front contact of relay 3814 to conductor 2032 and thence over the contact of cross-point 2449, conductor 2451 through cable 2452, outer lower front contact of relay 1200, conductor 706 through cable 1732, contact of relay 1701, and then as previously traced from conductor 1714 to conductor 3124, contact of relay 1701, conductor 1715 through cables 1709 and 1732, second lower front contact of relay 1200 to the winding of relay 1208 and battery. Relay 1208 operates, closing a circuit from ground over its outer upper contact, conductor 1209, winding of relay 1119 and battery. Relay 1119 operates and connects ground over its inner upper front contact, conductor 1124, second upper front contact of relay 1208, lower front contact of relay 1206, left back contact of relay 1210, winding of relay 1211 and battery. Relay 1211 extends its operating ground over its second lower contact and the upper back contact of relay 1203 to conductor 2451 and over its inner lower front contact and the inner lower front contact of relay 1200 to conductor 710. It also, at its middle lower contact, closes a holding circuit for relay 1208.

The ground connected to conductor 710 extends through cables 1732 and 1709 and over the contact of relay 1701 to conductor 1717, operating relay 3819 to prepare for checking the advance of the preference lead, which takes place, as previously described, relay 1119 advancing it to relays 1117 and 1107 as relay 610 advanced it to relays 614 and 604.

The test for cross-connections at the contacts of relays 1200 and 1204 takes place in the same manner as the test of the contacts of relays 700 and 704. If these tests are completed satisfactorily, ground connected to conductor 3137 operates relay 2012, which opens the locking circuit of relay 3702 permitting the sender group test circuit to restore to normal.

Relay 2012 also grounds conductor 2019, which, with relay 3005 operated is connected over conductor 3036, through cable 3033 to the winding of relay 3504 and battery. Relay 3504 prepares the key pulsing test circuit for operation.

Relay 3504 closes a circuit from battery through the winding of relay 3505, inner lower front contact of relay 3504, to grounded conductor 1913 through cable 3507. Relay 3504 also grounds conductors 3508 to 3512 and connects the individual leads from the sender to the test equipment. Ground at the upper normal contact of key 3600, extends over conductor 3601, through cable 3507, inner right contact of relay 2012, second lower front contact of relay 2010, conductor 2026 through cable 2031, contact of cross-point 2449, conductor 2453 through cable 2452, winding of relay 1300 to battery. Relay 1300 transfers the six conductors, which in service are connected to the position circuit over switch 1310, to the key pulsing test circuit.

With relay 3504 operated, a circuit is closed from battery through the winding of relay 3513, uppermost contact of relay 3504, conductor 3401 through cable 3507, outer right front contact of relay 2012, second upper front contact of relay 2010, conductor 2032, through cable 2015, contact of cross-point 2449, conductor 2451, back contact of relay 1203, second lower front contact of relay 1211, left back contact of relay 1210, lower front contact of relay 1206, second upper front contact of relay 1208, conductor 1124 to ground at the inner upper front contact of relay 1119. If the circuit is properly closed, relay 3513 operates, locking in a circuit from battery through its winding, upper back contact of relay 3514, inner lower front contact of relay 3513, back contact of relay 3515 to grounded conductor 3511.

With relay 3513 operated, a circuit is closed from battery through the winding of relay 3516, resistance 3517, lower back contact of relay 3518, upper back contact of relay 3519, outer lower front contact of relay 3513, conductor 2612, through cable 3507, inner lower back contact of relay 2601, conductor 2023, outer lower front contact of relay 2010, conductor 2033 through cable 2031, contact of cross-point 2449, conductor 2454, through cable 2452, winding of polarized relay 1213, second upper front contact of relay 1211, resistance 1214 and battery. Resistance 1214 is also connected over the third upper front contact of relay 1211 and the upper back contact of relay 1215 to ground through resistance 1216. Therefore, the potential attached to the winding of relay 1213 is approximately one-half the normal office voltage. This potential is sufficient to operate relay 3516 but is in the wrong direction to operate relay 1213.

Relay 3516 locks over its lower front contact, to conductor 3512.

When relay 3504 grounded conductor 3509, it completed a lamp lighting circuit over the back contact of relay 3516 to lamp 3502 and battery. When now relay 3516 operates, it opens the circuit of lamp 3502 and extends the circuit over its outer upper front contact and the upper back contact of relay 3520 to lamp 3500 and battery. The locking ground of relay 3516 reverses the direction of current flow through relay 1213 which operates and closes a circuit from ground at the fourth lower front contact of relay 1211, right contact of relay 1213, winding of relay 1215 and battery. Relay 1215 operates, locks to the fourth lower front contact of relay 1211 and disconnects ground from the winding of relay 1213 leaving that relay operated to ground in the test circuit.

In addition, at its inner upper front contact, relay 3516 connects relay 3520 to conductor 3313 which extends through cable 3507, third left front contact of relay 2012, third lower contact of relay 2010, conductor 2034, contact of cross-point 2449, conductor 2455 through cable 2452, third lower back contact of relay 1301 to battery through resistance 1302.

Relay 3520 operates in this circuit, transferring the lamp circuit from lamp 3500, over the back contacts of relays 3621 and 3602 to lamp 3603 and battery. If relays 3516 and 3520 fail to operate the test will block.

The operation of the frame tens relay 1205 as previously described closes a circuit from ground at its outer left contact, right back contact of relay 1210, second lower back contact of relay 1301, conductor 1307, lower back contact of relay 1217, left back contact of relay 1303, inner upper contact of relay 1218 to the winding of relay 1304 and battery. Relay 1304 prepares the sender to hunt for an idle operator's position. To do so, it closes a circuit from battery through the winding of relay 1305, back contact of stepping magnet 1317, which controls switch 1310, outer right back contact of relay 1306, outer left front contact of relay 1304, right back contact of relay 1303, lower back contact of relay 1219, lower normal contact of relay 1218 and thence to ground over conductor 1307. Relay 1305 connects magnet 1317 to the same ground and the relay and magnet cooperate to advance switch 1310 if necessary to find an idle position. To identify the idle position when found, relay 1304 also prepares circuits for relay 1303, one of which extends from battery through the right winding of relay 1303, middle left contact of relay 1304, left winding of relay 1303, lower back contact of relay 1217, to ground over conductor 1307. This circuit places relay 1303 in condition to operate quickly when the idle position is found. The other circuit extends from ground through the left winding of relay 1303 as traced, and thence over the inner left contact of relay 1304, middle winding of relay 1303, lower back contact of relay 1308, fifth lower back contact of relay 1301, upper contact of relay 1219, inner upper back contacts of relays 1220 and 1203, to conductor 1221 which normally extends over the outer left back contact of relay 1300 to brush 1316 of the position finder and when that finder rests at an idle position, finds battery at that position.

Since the sender is engaged with a test call and relay 1300 is operated, conductor 1221 is connected over the outer left front contact of relay 1300 to conductor 1309, through cable 1328, outer lower back contact of relay 3602 to battery, through resistance 3604. Relay 1303 therefore operates immediately, opening the circuits of relays 1304 and 1305, preventing the movement of switch 1300. Relay 1303 locks in a circuit from battery on conductor 1309, through the middle winding of relay 1303 as above traced, left front contact of relay 1303, lower back contact of relay 1217 to ground over conductor 1307.

When relay 1304 releases after an interval, due to its slow-release character, a circuit is closed from grounded conductor 1307, lower normal contact of relay 1218, lower contact of relay 1219, right front contact of relay 1303, back contact of relay 1304 to the winding of relay 1306 and battery. Relay 1306 locks over the back contact of relay 1304, right front contact of relay 1303, outer left front contact of relay 1306 to ground over conductor 1307. Relay 1306 at its inner left contact also extends ground from conductor 1307 to the winding of relay 1218 which also locks to conductor 1307.

With relay 1218 operated, a circuit is closed from battery through the winding of relay 1320, outer lower front contact of relay 1215, inner upper back contact of relay 1217, middle lower front contact of relay 1218 to grounded conductor 1307. A circuit is also closed from battery through the winding of relay 1321, inner lower back contact of relay 1217, outer lower front contact of relay 1218, and thence over the outer lower front contact of relay 1215, to ground as traced for relay 1320.

With relays 1320 and 1321 operated, the conductor 1325 is extended over the inner left front contact of relay 1300, middle right contact of relay 1321, inner lower contact of relay 1301, outer upper back contact of relay 1217, inner lower back contact of relay 1203, inner left front contact of relay 1320 to battery through the upper windings of relay 1322 and coil 1323. Conductor 1326 is extended over the middle left front contact of relay 1300, outer right front contact of relay 1321, outer left front contact of relay 1320 to ground through the lower windings of relay 1322 and coil 1323. Relay 1322 is differentially wound and does not operate with current flowing through both windings. Conductors 1325 and 1326 extend through cable 1328 to the test circuit.

Relay 1306 in operating also closes a circuit from battery through the winding and normal contact of relay 1308, right front contact of relay 1306, outer right front contact of relay 1300, conductor 1327 through cable 1328, inner upper back contact of relay 3621, outer upper back contact of relay 3602, upper winding of relay 3605, resistance 3606 to ground. Relay 1308 should not operate, since this circuit imposes a non-operate test on it. If relay 1308 operates falsely, it blocks the test by transmitting a reorder signal to the marker. With relay 3605 operated, conductors 1325 and 1326 are connected together through the winding of relay 3607 and the upper contact of relay 3605.

Relay 3607 operates, closing a circuit from ground over its outer upper contact, normal contact of key 3608, winding of relay 3609 and battery. Relay 3609 locks over its outer upper contact to ground at the outer upper contact of relay 3607. At its lower contact, relay 3607 connects lamp 3610 to the lamp circuit, causing the lamp to light.

At this time conductor 3611 is connected in the test circuit over the outer lower back contact of relay 3621 and the inner upper back contact of relay 3602 to the winding of relay 3612 and battery. In the sender, conductor 3611 extends over the middle right front contact of relay 1300, inner left contact of relay 1321 to the left back contact of relay 1306, but since relay 1306 is operated, the circuit should be open at that point. If a false ground should be connected to this conductor, relay 3612 operates blocking the test by preventing the operation of relay 3602.

Assuming that no such false ground exists, the operation of relay 3609 closes a circuit from battery through the winding of relay 3602, back contact of relay 3612, upper front contacts of relay 3609 to ground at the outer upper contact of relay 3607. Relay 3602 locks over its inner upper front contact to grounded conductor 3511, extinguishes lamp 3603 and extends the lamp circuit over the upper back contact of relay 3619 to lamp 3622. With relays 3609 and 3602 operated, battery is connected over the lower front contact of relay 3609, middle upper contact of relay 3615, resistance 3613, middle upper front contact of relay 3602, outer lower back contact of relay 3621, to conductor 3611. Battery is also connected over the lower front contact of relay 3609, inner upper contact of relay 3615, resistance 3614, outer upper front contact of relay 3602, inner upper back contact of relay 3621, to conductor 1327. In addition, relay 3602 disconnects battery from conductor 1309 permitting relay 1303 of the sender to release. Relay 1303 in turn releases relay 1306.

With relay 1306 released, conductor 1327 is extended over the outer right front contact of relay 1300, inner right back contact of relay 1306, outer left contact of relay 1321, inner right contact of relay 1320, conductor 1329 through cable 1330, winding of relay 1502, normal contact of relay 1503, right winding of relay 1504, right normal contact of relay 1505, left winding of relay 1404, right winding of relay 1401 to ground. Conductor 3611 is also extended over the middle right contact of relay 1300, inner left contact of relay 1321, left back contact of relay 1306, outer right contact of relay 1320, conductor 1331 through cable 1330, winding of relay 1506, and thence to ground as traced for conductor 1327. Relays 1502, 1506, 1504 and 1401 operate in these circuits, closing a circuit from battery through the left winding of relay 1503, front contacts of relays 1502 and 1506, conductor 1222 to ground at the lowermost contact of relay 1211. Relay 1503 operates and closes a holding circuit for itself from ground at the outer upper front contact of relay 1211, conductor 1223 through cable 1202, right winding and right alternate contact of relay 1503, through the windings of relays 1502 and 1506 in parallel to battery, as above traced. The operation of relay 1503 opens that part of the circuit extending through relays 1504, 1404 and 1401 and these relays release.

Relay 1503 operates the transfer relays to prepare for registration. At its left front contact, relay 1503 connects ground on conductor 1222 to battery through the windings of relays 1507 and 1508 in series. Relay 1507 at its left contact locks relays 1507 and 1508 to conductor 1222 and at its right contact extends ground from that conductor to battery through the windings of relays 1509 and 1510. Similarly relay 1509 locks and operates relays 1511 and 1505. Relay 1511 in turn operates relay 1512 which also locks to conductor 1222.

With relays 1508, 1510 and 1505 operated, conductor 1332 is extended over the inner right front contact of relay 1300, inner right contact of relay 1321, middle right contact of relay 1320, conductor 1333 through cable 1330, left winding of relay 1504, left alternate contacts of relays 1505, 1510 and 1508, left winding of relay 1433, left back contact of relay 1513 to battery through resistance 1514.

The connection of battery to conductor 1332 completes a circuit in the test circuit over the middle lower back contact of relay 3621, winding of relay 3616, back contact of relay 3617, conductor 3618, upper back contact of relay 4200 to ground over conductor 3508. Relay 3616 operates, locks to conductor 3508 and closes a circuit from battery through the windings of relays 4201 and 3521, conductor 3522, lower front contact of relay 3616, inner lower back contact of relay 3621 to ground over conductor 3601. Relay 4201 lights lamp 4228, while relay 3521 closes a holding circuit for itself and relay 4201 to conductor 3511 and connects that conductor to the windings of relays 3523 and 4202 and battery. Relay 3523 locks itself and relay 4202, and operates relays 3524 and 4203. Relay 3524 closes a locking circuit for itself and relay 4203, and operates relays 3525 and 4204 which are also locked to conductor 3511. The operation of relays 4201 to 4204 prepares paths for controlling the key pulsing.

The operation of relay 3521 also extends conductor 3511; over the outer upper front contact of relay 3616, winding of relay 3617, to battery at the lower front contact of relay 3609. Relay 3617 locks over conductor 3618, opens the operating circuit of relay 3616 and closes a circuit from battery through the winding of relay 3615, upper front contact of relay 3617, conductor 3620, lower back contact of relay 4200, to grounded conductor 3509. With relay 3615 operated, battery is disconnected from conductors 1327 and 3611, thereby releasing relays 1502, 1506 and 1503 in the sender.

The release of relay 1503 connects ground on conductor 1222 over the inner left back contact of relay 1503, conductor 1524, right front contact of relay 1512 to the winding of relay 1513 and battery. Relay 1513 locks over its inner left contact to grounded conductor 1524. At its outer left contact relay 1513 disconnects battery from conductor 1332 and connects that conductor to ground at the outer left back contact of relay 1503. At its inner right contact, relay 1513 connects ground from the outer left back contact of relay 1503 to the left winding of relay 1403.

The removal of battery from conductor 1332 releases relay 3616 thereby closing a circuit from grounded conductor 3601, inner lower back contact of relay 3621, back contact of relay 3616, outer lower front contact of relay 3617, winding of relay 3619 and battery. Relay 3619 connects conductors 1327, 3611 and 1332, through to the key-set of Figs. 32 and 39. Relay 3619 also extinguishes lamp 3622 and extends the lamp circuit over the lower back contact of relay 3526 to lamp 3527. In addition, relay 3619 connects ground over the outer upper back contact of relay 3518, front contact of relay 3505, inner lower front contact of relay 3619, outer lower front contact of relay 4204, to the lower back contacts of relay 4205, thence over the inner contact and the upper back contact of relay 4206 to resistance 4207 and over the inner and outer contacts to the armature of relay 4208 to start pulsing.

Relay 4208 is a condenser timed polarized relay, the two windings connected together and through resistance 4209 to battery over the lower back contact of relay 4206. The opposite end of the upper winding is connected in series with the windings of relays 4210, 4211 and 4212, inner lower normal contact of key 4213, resistance 4214, outer lower normal contact of key 4213, resistance 4216, inner lower back contact of relay 4206 to battery. The lower winding of relay 4208 is connected through condenser 4217 over the upper normal contact of key 4213 to ground at the outer upper back contact of relay 3518. Condenser 4217 is therefore normally charged. When ground is connected, as above described, to resistance 4207 it is in shunt of battery through resistance 4216 and completes an operating circuit for relays 4208, 4210, 4211 and 4212. These relays operate simultaneously. Relay 4208, in closing its left contact, connects ground in shunt of its windings causing it to release. However, this ground also supplies a discharge circuit for condenser 4217 and current in this circuit holds relay 4208 operated for a definite length of time after which relay 4208 opens its left contact. When this contact opens, the operating circuit and the charging circuit for condenser 4217 becomes effective, but the charging of condenser 4217 delays the closure of the right contact of relay 4208 so that the right and left closures of the relay are approximately the same.

Relay 4212 at the first closure of its contact completes a circuit from ground on conductor 4218, outer upper back contact of relay 4219, contact of relay 4212, lower back contact of relay 4219 to the winding of relay 4220 and battery. Relay 4220 operates and at its front contact closes a locking circuit for itself through the winding of relay 4219 to grounded conductor 4218. Relay 4219 does not operate until relay 4212 releases, at which time relay 4219 at its outer lower front contact connects battery over the normal contacts of jacks 4221 and 4222 to the armatures of relays 4211 and 4210, and at its upper front contact connects ground from conductor 4218 over the upper normal contact of jack 4223 to the armature of relay 4212. The purpose of relays 4219 and 4220 is to absorb the first pulse of the relay interrupter so that the first pulse supplied to the sender register relays will be of full duration.

Assuming that the same numerical keys are operated as before, at the first effective operation of relay 4210, a circuit is closed from battery over the contact of relay 4210, outer upper back contact of relay 4205, outer lower front contacts of relays 4204, 4203, 4202 and 4201, conductor 4224 through cable 4225, inner right contact of thousands key 3912, high resistance 3251 and low resistances 3252 and 3253, conductor 3254 through cables 4225 and 4226, second upper front contact of relay 3619, outer upper front contact of relay 3602, inner upper back contact of relay 3621, conductor 1327 through cable 1328, thence to conductor 1329 as previously traced, through cable 1330, winding of relay 1502, normal contact of relay 1503, right winding of relay 1504, right alternate contacts of relays 1505, 1510 and 1508, right winding of relay 1434, left winding of relay 1431 and ground. Relay 1431 operates and locks in a circuit from battery through its right winding and inner right contact, conductor 1524, inner left back contact of relay 1503, to ground over conductor 1222. Relay 1434 being marginal does not operate. Relays 1502 and 1504 also operate.

The operation of relay 4211 connects battery over its contact, inner upper back contact of relay 4205, inner upper front contacts of relays 4204, 4203, 4202 and 4201, conductor 4227, through cable 4225, outer right contact of key 3912, low resistances 3255 and 3256, conductor 3257 through cables 4225 and 4226, outer lower front contact of relay 3619, middle lower back contact of relay 3621, conductor 1332 through cable 1328 and thence as previously traced to conductor 1333, left winding of relay 1504, left alternate contacts of relays 1505, 1510 and 1508, left winding of relay 1433, outer left front contact of relay 1513, to ground at the left back contact of relay 1503. Due to the inclusion of low resistance in this circuit, marginal relay 1433 operates locking in a circuit from battery through its right winding and right front contact to ground over conductor 1524. Relay 1504 also operates in this circuit.

With relays 1431 and 1433 operated, a circuit is closed for auxiliary relay 1442 from battery through the winding of relay 1442, inner left back contact of relay 1434, inner left front contact of relay 1431, left back contact of relay 1432, to ground over conductor 1524.

The operation of relay 1502 is ineffective, but the operation of relay 1504 closes a circuit from ground on conductor 1524, front contact of relay 1504, outer left front contacts of relays 1505 and 1510, and the inner right front contact of relay 1508 to the winding of relay 1508 and battery. This ground shunts the winding of relay 1507 causing that relay to release but holds relay 1508 operated throughout the pulse.

When the pulse ends relay 1504 releases, and since relay 1507 has released to open its locking circuit, relay 1508 also releases, transferring the registration circuit to the hundreds register 1420.

In the test circuit, relay 4212 closes a circuit from ground over conductor 4218, tip contact of jack 4223, upper front contact of relay 4219, contact of relay 4212, outer lower front contact of relay 4219, ring contact of jack 4223, inner lower front contact and winding of relay 4201 to battery, thereby holding relay 4201 operated but shunting the winding of relay 3521, causing that relay to release. When the pulse ends and relay 4212 releases, relay 4201 also releases, closing a circuit for lighting lamp 4229 and transferring the pulsing circuits to the hundreds keys.

The second closure of the pulsing relay contacts transfers the hundreds designation to the sender. Since key 3227 is operated, battery through a high resistance is connected to conductor 1327, operating relays 1502, 1421 and 1504. Relay 1421 locks and relay 1504 releases relays 1510 and 1511, to transfer the registering circuits to the tens register. In the test circuit relay 4212 releases relays 3523 and 4202, extinguishing lamp 4229 and lighting lamp 4230.

The third closure of the pulsing relay contacts transfers the tens designation. With key 3239 operated, battery through a high resistance is connected to conductor 3611 and battery through a high resistance is connected to conductor 1332. Therefore, in the sender, relays 1506, 1504 and 1411 are operated, relay 1411 locking. Relay 1506 closes a circuit from ground on conductor 1222, contact of relay 1506, outer right back contact of relay 1503, inner right front contact of relay 1505, inner right back contact of relay 1510, winding of relay 1412 and battery. Relay 1412 locks to conductor 1524. Relay 1504 releases relays 1505 and 1511. In the test circuit, relay 4212 releases relays 3524 and 4203, extinguishing lamp 4230 and lighting lamp 4231.

When relay 4210 closes its contact, with relay 4203 released, battery is connected over the upper back contact of relay 4205, inner lower front contact of relay 4204, outer lower back contact of relay 4203, upper normal contact of relay 3526, winding of relay 4200 and ground. The circuit controlled by relay 4211 is open at a contact of relay 3526. Therefore, no registration takes place.

Relay 4200 locks over the normal contact of relay 3526 to battery at its lower front contact and disconnects ground from conductors 3618 and 3620, thereby releasing relays 3617, 3615 and 3619. With relays 3619 and 3615 released, a circuit is closed from battery through the winding of relay 3526, outer upper contact of relay 3615, lower back contact of relay 3619, upper front contact of relay 4200 to grounded conductor 3508. Relay 3526 operates and locks over its inner upper front contact to grounded conductor 3509. In addition, it transfers the lamp circuit from lamp 3527 to lamp 3503 and opens the circuit of relay 4200 which now releases.

With relay 3615 released, battery from the lower front contact of relay 3609 is extended over the middle upper contact of relay 3615, resistance 3613, middle upper front contact of relay 3602, outer lower back contact of relay 3621 to conductor 3611 and over the inner upper contact of relay 3615, resistance 3614, outer upper front contact of relay 3602, inner upper back contact of relay 3621 to conductor 1327, thereby simulating the action of the reset key by the operator. Conductors 3611 and 1327 extend as previously traced to the windings of relays 1506 and 1502 respectively, and the joint operation of these relays closes a circuit from battery, through the winding of relay 1503, front contacts of relays 1502 and 1506 to grounded conductor 1222. Relay 1503 operates, locking as before, through the windings of relays 1502 and 1506 until battery is removed at the distant end. Relay 1503 disconnects ground from the locking circuits of the register relays, restoring the registers to normal, and connects ground to the windings of relays 1507 and 1508 to reset the transfer relays. When the transfer relays are all operated, battery through resistance 1514 is again connected to conductor 1333, reoperating relay 3616, which in turn reoperates relays 3617 and 3615. The operation of relay 3615 disconnects battery from conductors 3611 and 1327, releasing relays 1502, 1506 and 1503 to place the sender in readiness for registration and disconnecting battery from conductor 1333.

The operation of relay 3616 reoperates the transfer relays 4201, 3521, etc., of the test circuit. When battery is removed from conductor 1333, relay 3616 releases, reoperating relay 3619. The test circuit is now in the same condition as it was at the previous start of registration, except that relay 3526 is operated.

Registration takes place as previously described until relays 4210, 4211 and 4212 operate for the units digit. In this case relay 4210 connects battery over the outer upper back contact of relay 4205, inner lower front contact of relay 4204, lower normal contact of relay 4203, middle lower front contact of relay 3526, conductor 3528 through cable 4225, inner right contact of relay 3943, through low resistance to conductor 3953 and thence to conductor 3611. Relay 4211 connects battery over the inner upper back contact of relay 4205, middle upper front contact of relay 4204, inner upper back contact of relay 4203, inner lower front contact of relay 3526, conductor 3529 through cable 4225, outer right contact of key 3943, conductor 3954 through cable 4225, second upper front contact of relay 3513, conductor 3530 through cable 4225, through low resistance to conductor 3257 and thence to conductor 1332, thereby operating relays 1502, 1504, 1404, 1403 and 1401. Relay 1506 operates relay 1402. Relays 1401, 1402, 1403 and 1404 lock to conductor 1524. Relay 1504 connects ground in shunt of the winding of relay 1512 which releases. Relay 4212 releases relays 4204 and 3525, relay 4204 disconnecting ground from relay 4208 and bringing the pulsing to an end.

When relay 1504 releases at the end of the pulse, a circuit is closed from ground on conductor 1524, back contact of relay 1504, outer right contact of relay 1513, right back contact of relay 1512, conductor 1515, to the winding of relay 1217 and battery. Relay 1217 operates, locking over its inner lower front contact to conductor 1222.

Relay 1217 opens the circuits of relays 1320 and 1321 and these relays release. Normally, the release of these relays releases the position circuit. In this case, the opening of the conductors 1325 and 1326 releases relay 3607, extinguishing lamp 3610 and releasing relay 3609, which in turn releases relays 3617, 3615 and 3619.

Relay 1217 also closes a circuit from battery over the lower normal contact of relay 1220, upper front contact of relay 1217, upper back contact of relay 1301, upper normal contact of relay 1334, conductor 1335 through cable 1336, to the winding of relay 1003 of the marker connector, normal contact of relay 1000 to ground. Relay 1003 operates multicontact relay 1019, connecting the B sender to the connector and then operates the marker multicontact relay to complete the connection between the marker and the sender. With the marker connector operated, the circuit of relay 500 is closed, extending over the contact of relay 1019, conductor 1020, through cable 1721, contact of relay 1701, conductor 1835, middle left contact of relay 2519, conductor 2610 to ground at the upper front contact of relay 2601. Relay 500 connects the selected marker with the test circuit.

The registration in the sender is checked in substantially the same manner as for the terminating sender. Since the thousands auxiliary relay 1442 is operated, ground is connected directly to conductor 1452, and thence through cable 1336, the marker connector, contact of relay 500, conductor 503, through cable 504 to the winding of relay 2202 and battery. Ground connected from the test circuit to conductor 2928 is extended over the contact of relay 500, conductor 506, contact of relays 1007 and 1019 in the marker connector, conductor 1021, through cable 1336, back contacts of relays 1443 and 1444, conductors 1453 and 1454 through cable 1336, the marker connector and contacts of relay 500 to conductors 508 and 509, and cable 504 to the windings of relays 2204 and 2208, respectively, to battery. Ground on conductor 2929 is extended over the contact of relay 500, conductor 507, contacts of relays 1007 and 1019, conductor 1022, through cable 1336, back contact of relay 1441, conductor 1451 through cable 1336, the marker connector and contact of relay 500 to conductor 510, through cable 504 to the winding of relay 2201 and battery.

Similar circuits are closed over contacts of the hundreds, tens and units register relays and over the back contact of relay 1308 to complete the chain circuit as previously described.

The further operation of the register check circuit is the same as described for the terminating sender.

When this test is completed register 2611 is operated, which initiates the same set of operations above described, relay 2000 operating. With hold magnet 2419 and relay 2000 operated, a circuit is closed from grounded conductor 1916, outer upper front contact of relay 2000, lower normal contact of relay 2005, outer lower back contact of relay 2004, lower back contact of relay 2700, conductor 2701, outer lower front contact of magnet 2419, conductor 2447, lower winding of relay 2006 and battery. Relay 2006 locks in a circuit from battery through its upper winding and upper alternate contact, upper normal contact of relay 2004 to grounded conductor 1917. At its upper contact relay 2006 opens the locking circuit for hold magnets 2409 and 2419 causing them to release and open the corresponding cross-point.

With magnet 2419 released, the circuit traced from ground to conductor 2701 extends over the back contact of magnet 2419, back contacts of similar odd-numbered hold magnets, back contact of magnet 2411, conductor 2430, back contact of relay 1609, conductor 1620, outer lower back contact of relay 2005 to the winding of relay 2702 and battery. As before, relay 2702 operates relay 2703 which in turn operates relay 2320. With relays 2320 and 2702 operated, ground is connected as previously traced to the outer lower front contact of relay 2702, middle upper front contact of relay 2707, to resistance 2706 and battery, in shunt of the winding of relay 2703 which releases.

With relay 2705 released, ground from conductor 1916 is extended over the upper back contact of relay 2705, conductor 2711, back contacts of relays 1608, 1606, 2304 and 2302, outer right front contact of relay 2300, to the winding of select magnet 2421 and battery. Magnet 2421 extends its operating ground over conductor 2448, lower front contact of relay 2707, inner lower contact of relay 2702 to the winding of relay 2005 and battery. Relay 2005 performs the functions previously described, releasing relays 2702 and 2703. With relay 2702 released, relay 2707 also releases and at its upper normal contact connects grounded conductor 1916 to conductor 2448 to lock select magnet 2421 and relay 2301, at the same time disconnecting conductor 1916 from conductor 2431 to release select magnet 2420, and relay 2300.

The release of relay 2703 releases relay 2320 and connects ground over its upper back contact and the outer lower front contact of relay 2005 to conductor 2007 to operate hold magnets 2400 and 2410. These hold magnets cause the first cross-points corresponding to the select magnet 2421 to close. The remaining select magnets are similarly operated advancing the test from level to level.

The cross-points of the tenth level, which are not shown, as well as all other vacant cross-points, have their left contacts connected as shown for the last two cross-points of the ninth level. Therefore, when the first vacant cross-point 2460 is closed, and relay 2009 operates, a circuit is closed from battery through resistance 2607, conductor 2608, contact of relay 2009, conductor 2014 through cable 2015, contact of cross-point 2460, conductor 2456 to the winding of relay 2613 and ground. Relay 2613 closes a circuit for relay 1914. Relay 1914 operates relay 1908 and releases relay 2605. Relay 2605 rleases relay 2009 which in turn releases relay 2613. The release of relay 2613 releases relays 1908 and 1914. The operation and release of relays 1908 and 1914 cause relays 2004 and 2000 to function to operate the next pair of hold magnets and release the previous pair, advancing to the next cross-point as previouly described. Advance to the tenth level is the same as described hereinbefore.

When hold magnets 2409 and 2419 have been operated and the tenth cross-point closed, the operation of relay 2613 brings about the operation of relay 2000 which in turn operates relay 2006, and releases the hold magnets. With the hold magnets released and relay 1609 operated, relay 2000 closes a circuit from grounded conductor 1916, outer upper front contact of relay 2000, inner lower back contact of relay 2005, lower back contact of relay 2004, lower back contact of relay 2700, conductor 2701, back contacts of hold magnets 2419, 2411 and corresponding odd-numbered hold magnets, conductor 2430, outer right front contact of relay 1609, conductor 1621, winding of relay 2008 and battery. Relay 2008 locks to grounded conductor 1916, lights lamp 2029, opens the locking circuit of relay 2600 and opens the circuit for starting the operation of the group test circuit.

The lighting of lamp 2029 indicates the completion of the test and the test circuit may be restored by releasing start key 1900 to release relay 2600 and the relays held by that relay, and operating key 1915 to disconnect ground from conductors 1916, 1917 and 2002 and the relays locked thereto.

*Special tests*

The foregoing description covers the operation when test class key 2500 is operated, which key causes the sender to be tested for a regular call. In describing the tests carried out with other class keys operated, only the operations which differ from those previously described will be set forth in detail.

*Special call test*

With key 2501 operated, the test is essentially the same as with key 2500 operated. However, with key 2501 operated, as soon as relay 2800 is operated to prepare the revertive test circuit for operation, a circuit is closed from ground at the middle left contact of relay 2800, conductor 2828 through cable 2802, inner right contact of key 2501, conductor 2435 through cable 2802, winding of relay 2804 and battery. Relay 2804 locks to ground on conductor 2828. Likewise with key 2501 operated, a circuit is closed from ground at the inner upper back contact of relay 2601, conductor 2614, outer right contact of key 2501, conductor 2535 through cable 3002, inner right front contact of relay 3003, outer right front contact of relay 3000, conductor 3037 through cable 2718, inner upper front contact of relay 2009, conductor 2443 through cable 2015, contact of cross-point 2433, conductor 1009 through cable 2436, third lower front contact of relay 201, outer upper back contact of relay 213 to the winding of relay 714 and battery. This circuit is cut off when the group circuit is released but relay 714 locks to off-normal ground on conductor 712 and connects ground over its lower front contact, conductor 728 through cables 726 and 972, to the marker connector where it causes the selection of a marker capable of handling special calls. A branch of conductor 1009 is extended to a contact of relay 500 where it is grounded when relay 500 operates.

With cross-point 2449 closed, the circuit extends from conductor 3037, inner upper front contact of relay 2010, conductor 2035 over cross-point 2449, conductor 2457, through cable 2452, lower back contact of relay 1215, lower winding of relay 1224 to battery. Relay 1224 locks to ground at the outermost lower contact of relay 1208, and connects ground over conductor 1225 through cable 1336 to the marker connector to summon a special marker. A branch of conductor 2457 is also extended to a contact of relay 500.

*Telltale test*

The tests applied with key 2502 operated are applicable only to the full selector senders and "pass B senders" key 2026 is operated. Therefore, when a cross-point is closed leading to a B sender, battery is connected through resistance 2607, conductor 2608, over the outer upper front contact of relay 2010, conductor 2030 through cable 2031, contact of cross-point 2449, for example, conductor 2450, alternate contact of key 2026, conductor 2456 to the winding of relay 2613 and ground. Relay 2613 functions to advance the test circuit past the B senders in the same manner as it passes it by unequipped crosspoints.

With key 2502 operated, when relay 3004 operates, it completes a circuit from grounded conductor 2606, over the inner right contact of key 2502, conductor 2536, through cable 3002, fifth lower front contact of relay 3004, conductor 3038, through cable 3033, winding of relay 3408 and battery. Relay 3408 operated closes a circuit from battery through the winding of relay 3426, lower back contact of relay 3416, to ground at the inner upper front contact of relay 3408. Relay 3408 closes at its outer lower contact a shunt around the winding of relay 4026. With relay 3408 operated, the test proceeds in the regular manner until the fundamental circuit is closed for the first selection, that is incoming brush selection. Due to the fact that the winding of relay 4026 is short-circuited, the pulsing circuit of the sender continues to function until it has recorded ten pulses, that is, until relays 321 to 326 have been operated, relay 326 locking under the control of relay 306 and relays 321 to 324 have operated a second time. With relay 326 operated, the eleventh pulse, which grounds conductor 313 closes a circuit over the inner left front contacts of relays 324 and 326 to battery through the winding of relay 718.

Relay 718 locks to grounded conductor 219, and connects ground to conductor 307, which is normally grounded by the units hold magnet 421. At its inner upper front contact, relay 718 connects ground to conductor 422 which is extended over the inner right front contact of relay 306 to the winding of relay 213 and battery. Relay 213 locks to ground over its outer upper front contact and the third upper front contact of relay 202, operates relay 206, and performs the same functions as previously described, except that, with relay 718 operated the circuit for summoning a marker is opened and no marker is called in.

Relays 206 and 213 as before, connect reverse battery to the tip and ring conductors, and release relay 207, which on its release terminates the reverse battery pulse and releases relays 203 and 204. In the test circuit, the reverse battery operates relay 4111 which causes the operation of relay 3406 as previously described. Relay 3406 lights lamp 3502, and causes the operations previously described, finally operating relay 3416, which connects ground to conductor 724.

With relays 203 and 204 released, battery is connected to conductor 2439, and ground through resistance 721 and the winding of relay 723 is connected in parallel with battery through resistance 722 to conductor 724.

The ground connected to conductor 724 from the test circuit operates relays 723 and 720 in the sender and relay 720 at its outer upper front contact connects relay 702 over the outer upper front contact of relay 718, and the lower back contact of relay 223 to ground over conductor 703, thereby completing the release of the sender.

In the test circuit, the operation of relay 3416 releases relay 3426 which closes a circuit from ground at the inner upper front contact of relay 3408, outer lower front contact of relay 3416, inner lower back contact of relay 3402, right back contact of relay 3426 to conductor 3826 thereby causing the advance of the test circuit to the next sender.

*Trouble release by link*

With key 2503 operated, the test circuit tests the ability of the link circuit to release the sender in case of trouble, which is indicated by the failure of the sender to connect ground to conductor 710 within a specified time.

With key 2503 operated, a circuit is closed from ground on conductor 2606, contact of key 2503, conductor 2532, through cable 2531, winding of relay 3122 and battery. With relay 3122 operated, the connection between conductors 1714 and 3124 through resistance 3123 is opened and conductor 1714 is connected to the winding of relay 3125 and battery. Therefore, when ground is connected to conductor 1714 as previously described for testing the continuity of the circuit through the sender and link, relay 3125 operates, locks under the control of relay 3003, disconnects ground from the frame keys, and transfers the circuit closed by the release of relay 3814 from the winding of relay 3816 to conductor 3826. In addition relay 3125 connects ground through resistance 3139, inner right back contact of relay 3111, inner left contact of relay 3116 to conductor 3140. This conductor extends when testing a terminating sender over a contact of relay 1701, conductor 711, through cable 1709, outer lower front contact of relay 700 to the winding of relay 702. Relay 702 grounds conductor 210 operating relay 610 which opens the circuit of relay 3814 thereby grounding conductor 3826 to advance the test to the next sender.

In testing the "B" sender the circuit to conductor 3140 extends over a contact of relay 1701, conductor 711 through cables 1709 and 1732, third lower front contact of relay 1200, winding of relay 1220 and battery. Relay 1220 grounds conductor 1209, operating relay 1119 and opening the circuit of relay 3814 to cause the advance of the test circuit to the next sender.

*Trouble release by the marker*

This test which is applicable during the testing of all senders, is made with key 1804 operated. Key 1804 connects ground from conductor 2606 to conductor 1834 leading to the marker to simulate the action of the trouble indicator and to conductor 1835, which extends through cable 2802 to the winding of relay 2806 and battery. With relay 2806 operated, the chain circuit, over which relay 2924 should operate to indicate the operation of all of the register relays, is opened. Therefore the register check cannot proceed. However, with relays 2921 and 2911 operated the circuit of relay 2816 is closed and that relay operates, locking and closing a circuit through the winding of relay 2818 which does not become effective until relay 2921 or 2911 releases.

Since relay 2924 does not operate, ground is not removed from conductors 2927, 2928 and 2929, the marker cannot proceed with its function and the marker timing circuit grounds conductor 1023, completing a circuit over the left back contact of relay 1024, winding of relay 1002 and battery. Relay 1002 operates and locks through the winding of relay 1024, inner right front contact of relay 1002, contact of relay 1001 to ground. The operation of the marker relay 1007 caused the preparation of a circuit (not shown) for relay 1005, but with relay 1002 normal, the ground at the inner right back contact of relay 1002 is connected over conductor 1025 in shunt of the battery supply for relay 1005 and that relay cannot operate. When, now, relay 1002 operates in response to a trouble release signal, the shunt is removed from relay 1005 and that relay operates and locks. Relay 1005 opens the circuit of relay 1006 which in turn releases relay 1007 and disconnects the marker from the sender, opening the operating circuit of relay 1002. Relay 1024 then operates in the locking circuit of relay 1002 and reconnects ground to conductor 1025. Relay 1005 being locked, the start battery which has been maintained by the sender is extended to the relay corresponding to relay 1005 of the next marker and another attempt is made to establish a connection.

The disconnection of the first marker releases relays 2921 and 2911, thereby permitting relay 2818 to operate. When the second marker has been seized, relays 2921 and 2911 are reoperated, connecting ground as previously traced to the upper front contact of relay 2818, resistance 2817 and battery in shunt of the winding of relay 2816, which releases.

When the second marker times out, the ground supplied by the marker is extended over the outer left front contact of relay 1024 over the back contact of relay 1026 to the winding of relay 1027 to sound an alarm. It is also extended over a contact of relay 1001 to conductor 1028, cables 972 and 726, lower winding of relay 701 and battery. Relay 701 locks in a circuit from battery through its upper winding and upper front contact to grounded conductor 703. Relay 701 disconnects the start battery from the marker connector, opens the locking circuit of relay 201 and releases the sender. Ground is connected to conductor 222 over a contact of relay 1001 to prevent the release of relay 201 before the marker connector has released.

In the case of a B sender the trouble release ground extends over a contact of relay 1019, conductor 1029 through cable 1336, winding of relay 1334 and battery. Relay 1334 also locks and disconnects battery from the marker connector. In addition it operates relay 1220 to bring about the release of the sender.

In the test circuit, the operation of relay 2816 connects ground over conductor 2820 and when testing a terminating sender through cable 3423, inner upper front contact of relay 3406 to the upper winding of relay 3421 and battery, relay 3421 locking to grounded conductor 4018. When relays 2816 and 2818 both release, ground is connected over the upper back contact of relay 2816, upper front contact of relay 2806, lower normal contact of relay 2818, conductor 2827, through cable 3423, upper front contact of relay 3421 to conductor 3826 to advance the test circuit to the next sender. In testing a B sender, conductor 2820 extends through cable 2829, third upper front contact of relay 3504, upper winding of relay 3531 and battery. Relay 3531 locks to conductor 3511. Conductor 2827 extends through cable 2829, inner upper front contact of relay 3531, inner upper front contact of relay 3619, outer upper front contact of relay 3526, inner upper front contact of relay 3520, inner lower back contact of relay 3514 to conductor 3826 to advance the test circuit to the next sender.

*Trunk disconnect*

There is a feature in both sender circuits which functions to restore the circuit to normal in case a premature disconnect signal is received from the trunk circuit. When this feature is to be tested, key 1805 is operated, connecting ground from conductor 2606 over its left contact, conductor 3017, upper back contact of relay 2008, conductor 3016 through cable 2710 to the winding of relay 3030 and battery, holding the sender group busy throughout the test. Therefore, this test should be made only during times of light traffic and should be supervised. Ground is also extended over the right contact of key 1805, conductor 1836, through cable 3002, third lower front contact of relay 3004 when testing terminating senders, conductor 3039 through cable 3033, normal contact of relay 4118, winding of relay 4117 and battery. Relay 4117 operates in this circuit in turn operating relay 4100. When relay 3400 operates, conductor 2612 is extended over the fourth right contact of relay 3400, and the outer upper front contact of relay 4117 to the winding of relay 4118 and battery instead of to relay 3416.

The test circuit functions in a normal manner up to the time where the sender functions to apply ground through resistance 721 to the winding of relay 723 in shunt of battery through resistance 722. Since the circuit of relay 723 extends to conductor 2612, as previously traced, relay 4118 operates but relay 723 does not. Relay 4118 locks over its upper alternate contact to conductor 3039, and this ground extends back over the operating circuit of relay 4118 to operate relay 723. Relay 723 operates relay 720 which locks and summons a marker.

Relay 4118 opens the circuit of relay 4117 which releases after an interval, disconnecting relay 4118 from conductor 2612 and extending that conductor over the back contact of relay 4117 and the outer lower front contact of relay 4118 to the lower winding of relay 4119. This releases relay 723 which closes a circuit from ground over its left contact, outer lower front contact of relay 720 to the winding of relay 727 and battery. Relay 727 operates after an interval and closes a circuit for operating release relay 702 which causes the complete release of the sender. In releasing, the sender disconnects ground from conductor 2435. In the test circuit, the operation of relay 4100 opened the locking circuit of relay 3300, leaving that relay dependent on its operating circuit which extends to conductor 2435. When relay 4117 is released it opens the circuit of relay 4100 which also releases slowly. If, therefore, the sender removes ground promptly from conductor 2435 relay 3300 releases. If not, the release of relay 4100 recloses the locking circuit and prevents the release of relay 3300.

Assuming that relay 3300 is released, ground is connected from conductor 4101, back contact of relay 4100, inner lower front contact of relay 4118, conductor 4120, lower back contact of relay 3300, conductor 3326, lower back contact of relay 4119, to conductor 3826, advancing the test circuit to the next sender. If the sender fails to remove ground from conductor 2612, relay 4119 operates and locks, blocking the test.

When testing "B" senders the above traced circuit extends from conductor 1836 over the third lower contact of relay 3005, conductor 3040 through cable 3033, normal contact of relay 3518, winding of relay 3519 and battery. Relay 3519 in turn operates relay 3515. When relay 3513 operates, conductor 2612 is extended over the outer lower front contact of relay 3513, outer upper front contact of relay 3519 to the winding of relay 3518 and battery. In the sender, ground through resistance 1216 is connected as previously traced through the winding of relay 1213 to conductor 2454 and through to conductor 2612. Relay 3518 operates and locks over conductor 3040. This locking ground extends back to the winding of relay 1213 causing that relay to operate and in turn operate relay 1215, which locks under the control of relay 1211.

Relay 3518 opens the circuit of relay 3519 and that relay releases in turn releasing relay 3515. When relay 3519 releases it transfers conductor 2612 from ground over the locking circuit of relay 3518 to battery through the winding of relay 3532 thereby releasing relay 1213 which closes a circuit from ground at the fourth lower contact of relay 1211, left contact of relay 1213, inner lower front contact of relay 1215 to the winding of relay 1203 and battery. Relay 1203 also locks under the control of relay 1211 and closes a circuit from battery through the winding of relay 1220, lower back contact of relay 1301, lower front contact of relay 1203 to ground at the outer lower contact of relay 1208. Relay 1220 locks to ground and brings about the release of the sender in the usual manner.

Relay 3515 in operating opens the locking circuit of relay 3513 leaving it dependent on the ground supplied to conductor 2451 by the sender. If the sender releases promptly relay 3513 releases and, when relay 3515 closes its back contact completes a circuit from grounded conductor 3511, back contact of relay 3515, inner lower front contact of relay 3518, back contact of relay 3532, inner lower back contact of relay 3513 to conductor 3826, causing the test circuit to advance to the next sender.

If the sender fails to release, the release of relay 3515 recloses the locking circuit of relay 3513 and the test is blocked. Likewise, if the sender fails to remove ground from conductor 2612, relay 3532 operates and locks to conductor 3040 blocking the test.

*Time-out test*

This test is performed with key 1806 operated and is directed to the feature of the sender, whereby when a plug is inserted in the hold jack, the sender will not release in case of trouble but will time out and sound an alarm. The test circuit progresses from sender to sender under manual control, and each type of sender is tested separately. Therefore, in testing terminating senders, in addition to test class key 1806, "pass B senders" key 2026 is operated and key 1907. Likewise a plug 730 is inserted in jack 731 of the sender under test.

Key 1806 at its outer right contact closes a circuit from ground over conductor 1837 through cable 3415, third right contact of relay 3400, winding of relay 3402 and battery, which circuit becomes effective when the revertive pulse circuit is started by the operation of relay 3400. At its inner right contact key 1806 connects ground from conductor 2606, over conductor 2536, through cable 3002, fifth lower contact of relay 3004, conductor 3038 through cable 3033 to the winding of relay 3408 and battery, relay 3408 operating relay 3426 over the back contact of relay 3416. At its inner left contact, key 1806 prepares a circuit from ground at the front contact of meter 2611 or 2615 to the winding of relay 1914 in substitution for that normally extending over the outer left contact of key 1907 which is now open.

The connections with the sender and the group circuit test proceed as usual. When relay 3400 operates, relay 3402 is operated and lamp 3414 is lighted in a circuit from battery through lamp 3414, outer upper back contact of relay 3406, outer upper front contact of relay 3408, lower back contact of relay 3409 to ground over conductor 4101. With relay 3408 operated, a short circuit is closed around the winding of relay 4026, as previously described, while the operation of relay 3402 opens the tip of the pulsing circuit at the uppermost contact of that relay and connects ground through relay 4111 to the pulsing ring conductor 3412.

In the sender, relay 302 cannot operate. Relay 202 in operating connected ground over its middle lower front contact and conductor 228 to timing interrupter 224 which on closing its left contact operates relay 225. Relay 225 locks through its left winding and contact to conductor 228. When next interrupter 224 closes its right contact it extends ground over the right contact of relay 225 to the winding of relay 223 which also operates and locks to conductor 228. In operating, relay 223 lights lamp 226 and grounds conductor 227 to start a further timing operation. At the next closure of its left contact interrupter 224 extends ground over the outer lower front contact of relay 223 to the upper winding of relay 701 and battery. Relay 701 locks to conductor 703.

Normally the operation of relay 701 releases the sender, but with plug 730 in jack 731, a circuit is closed from battery through the lower winding of relay 201, jack 731, plug 730, upper front contact of relay 701 to conductor 703. Conductor 703 is grounded by relay 202 which is locked under the control of relay 201.

Relay 223 in operating also closes a circuit for relay 718 which locks to conductor 219, and closes a circuit from ground over the inner upper front contact of relay 718, conductor 422, inner lower front contact of relay 223 to the winding of relay 213 and battery. Relay 213 makes reverse battery closure as previously described.

In the test circuit, this closure operates relay 4111 which causes the operation of relay 3406 to extinguish lamp 3414. When relay 701 operates it disconnects ground from conductor 2435, thereby releasing relay 3300 which closes a circuit from ground at its upper back contact, conductor 3327, inner lower front contact of relay 3402, conductor 3427 through cable 3033 to lamp 3143 and battery. The test then progresses but cannot advance to the next sender since relay 3402 opens the circuit for that purpose.

The interval during which lamp 3414 is lighted should be between 28 and 58 seconds and is timed manually. The additional time measured is from 5 to 12 seconds, the end of which is indicated by the sounding of the alarm.

When this occurs, key 3727 is operated closing a circuit from grounded conductor 2606, to the winding of relay 3029 and battery. Relay 3029 locks and closes a circuit from ground on conductor 2606, outer left front contact of relay 3029, to conductor 3017 and thence as previously traced to the winding of relay 3030 and battery. Relay 3030 makes the sender group busy so that when the sender is subsequently released with the test circuit attached, no service call will be interfered with.

Plug 730 is now removed from jack 731, permitting relay 201 to release and complete the release of the sender, thereby silencing the alarm and extinguishing lamp 226. Key 3428 is then operated connecting ground over the outer lower front contact of relay 3402 and the right back contact of relay 3426 to conductor 3826 to advance the test circuit to the next sender. The advance of the circuit releases group busy relay 3030.

This test when made on "B" senders is very similar, key 2016 being operated to pass by terminating senders, and a plug 1516 being inserted in jack 1517 to operate relay 1519 and disconnect ground from the circuits of relay 1220. With relay 3504 operated, key 1806 operates relay 3514. Relay 3514 at its inner upper contact connects ground to the winding of relay 4205 which prevents sending key pulses to the sender. The selection of the sender and the group test proceed as before. As soon as relay 1208 operates it connects relay 1337 over its third upper contact to the left contact of interrupter 1338. When the interrupter contact closes, relay 1137 operates and locks to ground at the inner lower front contact of relay 1208. When now, interrupter 1338 closes its right contact, it operates relay 1301 over the contact of relay 1337. Relay 1301 locks in parallel with relay 1337, lights lamp 1339 and grounds an alarm circuit over conductor 1340.

Relay 1301 disconnects battery through resistance 1302 from conductor 2455, thereby releasing relay 3520 which closes a circuit from battery through lamp 3500, upper back contact of relay 3520, outer upper front contact of relay 3516 to grounded conductor 3509. The time from the lighting of lamp 4228, which occurs when the test circuit is ready for key pulsing, to the lighting of lamp 3500 is then the time-out period of the sender and, measured with a stop watch should be between 28 and 58 seconds.

Normally, relay 1301 operates relay 1220 to release the sender, but with relay 1519 operated this circuit is open. Therefore relay 1301 remains operated and 5 to 10 seconds later an audible alarm is sounded.

Key 3727 is operated as for the terminating sender test, plug 1516 is withdrawn from jack 1517 permitting relay 1220 to operate and release the sender, extinguishing lamp 1339 and silencing the alarm. The release of the sender removes ground from conductor 2451, releasing relay 3513, which closes a circuit from ground at the inner lower front contact of relay 3514, outer lower back contact of relay 3513, conductor 3533 to lamp 3143 and battery. Key 3428 is then operated to advance the test circuit to the next sender as above described.

*Non-operate test of pulsing relay*

This test is made to insure the proper operation of the sender when functioning with an incoming selector test circuit, to make a non-operate test of the pulsing relay of the sender and to insure that, after the final units digit has been recorded, the sender will not time-out and send reverse battery in less than 1 to 2.5 seconds.

This test applies only to terminating senders, therefore key 2026 is operated. Key 1807 is operated, connecting ground over its right contact to conductor 3325, thereby grounding condenser 3324 in parallel with condenser 3319 to change the operating time of relay 4102. It also connects ground over its inner left contact to conductor 1838, third left contact of relay 3400, winding of relay 4103 and battery.

The test circuit and sender function in a normal manner up to the completion of final units selection. When relays 4017 and 4010 have operated at the completion of that selection, relays 4108 and 3409 have operated as usual and relay 4009 has reoperated, the fundamental circuit is closed for receiving reverse battery. However, with relay 4103 operated that circuit extends, as previously traced from the tip conductor to the outer upper front contact of relay 3302 and thence, with relays 4108 and 4103 both operated, through resistance 4121, upper back contact of relay 4027, to the windings of relays 4111 and 4026 and back to the ring conductor.

Resistance 4121 is of such value that relay 302 should not operate. The operation of relay 4009 in reclosing the fundamental circuit disconnects ground from the lower winding of relay 4102, permitting relay 4102 to operate under the control of its upper winding as soon as the charging current for condensers 3324 and 3319 is sufficiently reduced.

If relay 302 should operate, it would close the reverse battery circuit before relay 4102 opens its right contact and relay 4111, operating in response to the reverse battery, would close a circuit from grounded conductor 4018, right contact of relay 4102, left contact of relay 4111, inner lower front contact of relay 4103, back contact of relay 4122, winding of relay 4123 and battery. Relay 4123 locks to conductor 4018 and blocks the advance of the test.

If, however, relay 302 does not operate, relay 4102 in closing its left contact completes a circuit from grounded conductor 4018, left contact of relay 4102, middle lower front contact of relay 4103, winding of relay 4122 and battery. When hold magnet 421 operates after the registration of the units digit, it grounds conductor 422, which extends to interrupter 229. When interrupter 229 closes its left contact it operates relay 230 which locks to conductor 422. When interrupter 229 closes its right contact it extends ground over the lower contact of relay 230, outer lower back contact of relay 213 to battery through the winding of relay 214 which also locks to conductor 422. With relay 214 operated, relay 213 is operated to transmit the reverse battery pulse to the test circuit.

Relay 4111 operates in response to this reverse battery and if relay 4102 has operated, closes a circuit from ground over the lower front contact of relay 4122, left contact of relay 4111, inner lower front contact of relay 4103, upper front contact of relay 4122, back contact of relay 4123 to interrupter 4124.

Interrupter 4124 measures a delay, during which the sender may advance and open the reverse battery closure if there is trouble in the sender which would cause it to do so.

When interrupter 4124 closes its left contact, it connects ground over the lower back contact of relay 4125, winding of relay 4126 and battery. Relay 4126 operates and locks to grounded conductor 4018. When interrupter 4124 closes its right contact, it connects ground over the inner upper front contact of relay 4126 to the winding of relay 4125 and battery. Relay 4125 also locks to conductor 4018 and closes a shunt around resistance 4121, thereby permitting relay 302 to operate and terminate the reverse battery closure. If the closure is terminated by trouble, the release of relay 4111 disconnects ground from interrupter 4124 and prevents the operation of relay 4125.

If the operation of relay 302 terminates the reverse battery closure, the release of relay 4111 with relay 4125 operated completes a circuit from ground at the lower front contact of relay 4122, right contact of relay 4111, upper back contact of relay 4106 inner upper front contact of relay 4125, winding of relay 3406 and battery.

With relay 3406 operated the test circuit and sender will continue to function in a normal manner as has been described.

Step-by-step registration

The test number may be transmitted to the sender either as above described or one digit at a time. In the latter case when testing terminating senders key 3315 is operated, opening the normal operating circuit of relay 4009. When ready to transmit a digit, key 3428 is operated and released, closing a circuit from ground over key 3428, outer lower back contact of relay 3402, third lower front contact of relay 3300 back contact of relay 3328 to the winding of relay 3329 and battery. Relay 3329 locks through the winding of relay 3328, contact of relay 3329, left contact of key 3315, outer upper front contact of relay 3407, conductor 3411 and thence to ground over contacts of the transfer relays. For example, for the first selection, relays 3311 and 4023 are operated, and the locking circuit of relays 3328 and 3329 extends from conductor 3411 over the outer upper back contact of relay 3314, middle upper front contact of relay 4023 to grounded conductor 4008. Similar circuits are closed for other selections. Relay 3328 operates when key 3428 is released. Relay 4009 now operates over the lower front contact of relay 4007, front contact of relay 3328 to grounded conductor 4008. After the transmission of the digit or selection, the next transfer relays operate, opening the circuit of relays 3329 and 3328 and in turn the circuit of relay 4009. Key 3428 is then operated to transmit the next digit.

In testing B senders, key 3315 is also operated to prepare the key pulsing test circuit for step-by-step operation. At its right contact key 3315 connects ground to conductor 3330 which extends through cable 4225, inner upper front contact of relay 3513 to the winding of relay 4205 and battery. Relay 4205 opens the circuits of the condenser timed relay 4208 and opens the circuits closed by relays 4210 and 4211. Key 3428 connects ground over the outer lower back contact of relay 3402, outer lower back contact of relay 3514, upper front contact of relay 4205, winding of relay 4206 to battery. Relay 4206 closes the circuits ordinarily closed by the pulsing relays, thereby transmitting pulses to the sender and operating the transfer relays.

Key 4110 is used to vary the resistance and capacity in the fundamental circuit, while key 3305 varies the resistance in series with the winding of relay 3304 to vary the interval between selections.

In connection with the trunk disconnect test, applied by key 1805, key 4030 may be operated to make an automatic current flow operating test of relays 302 and 713 of the terminating sender. Incoming selections are made as above described. When relay 3320 operates for advancing to final brush selection, however, relay 4027 operates in a circuit from battery, winding of relay 4027, upper contact of key 4030, inner upper front contact of relay 3320, lower back contact of relay 3316 to grounded conductor 4008. Relay 4027 locks over its inner upper front contact and the lower back contact of relay 3316 to conductor 4008. With relay 4027 operated, the tip conductor is disconnected at the upper back contact of relay 4027 from relays 4111 and 4026 and is extended over the outer upper front contact of relay 4027 to the winding of relay 4031, and resistance 4032 to ground. Relay 4027 connects battery through resistance 4033 to the winding of relay 4034 and battery to prevent its accidental operation. Relay 4031 operating over the tip conductor, connects ground in shunt of resistance 4033, operating relay 4034 which connects battery through resistance 4035 to the ring conductor. Relay 4034 connects ground to the armature of relay 4016 in place of that usually furnished by relay 4026.

In the sender, relay 302 should operate in series with relay 4031 and relay 713 in series with resistance 4035. When relay 715 grounds the tip conductor, relay 4031 releases, in turn releasing relay 4034 to open the ring conductor and release relay 713. Relay 713 releases relay 715 permitting relays 4031, 4034 and 713 to reoperate, operating the counting relays of sender and test circuit.

Final tens selection is made in the same manner, but when relay 3316 operates to prepare for final units selection relay 4027 is released and the remainder of the test is made in the normal manner.

Test of B position features

Figure 9:
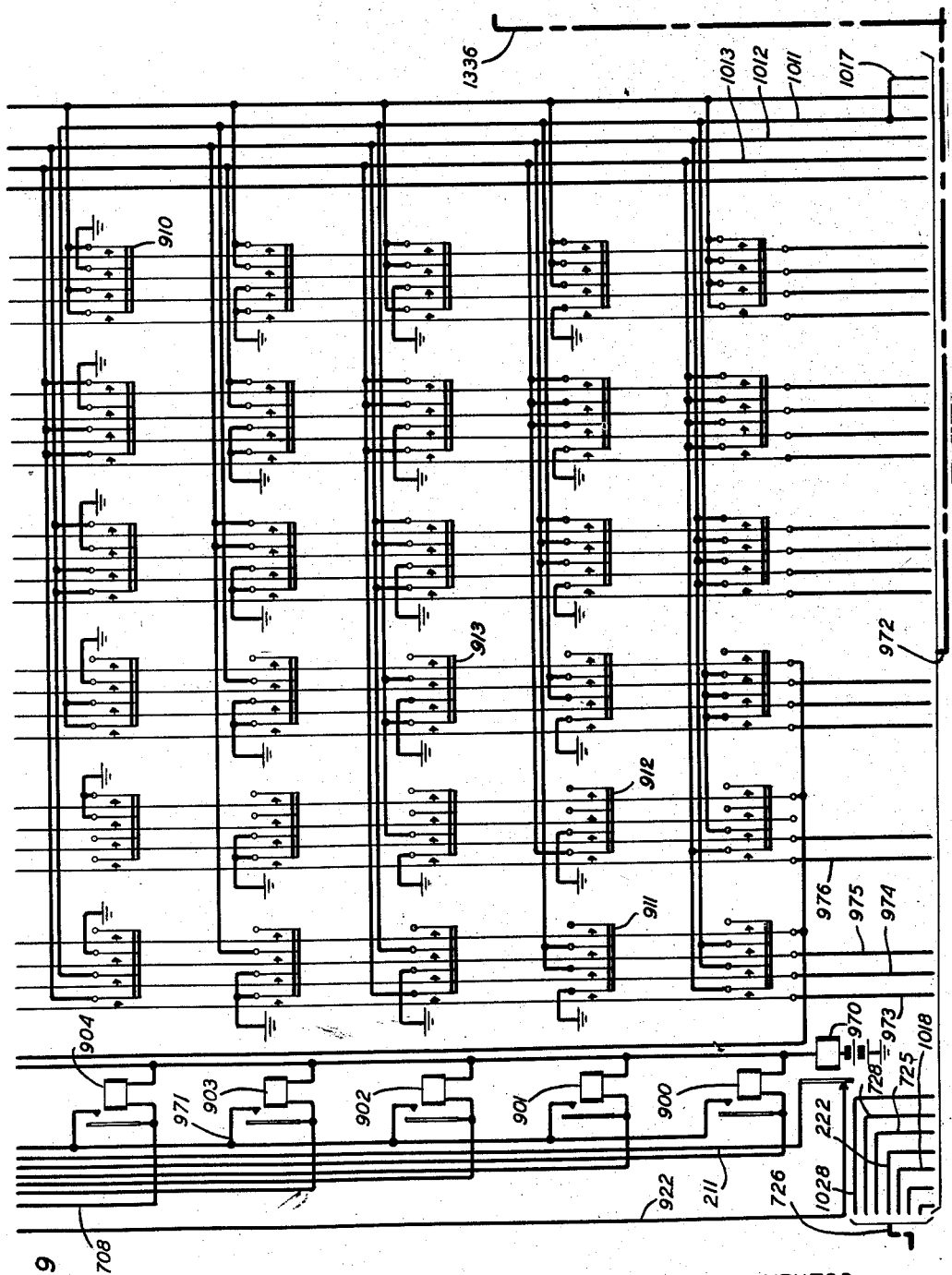

If it is desired to test the transmission of order tone through the sender, key 3600 is operated. With this key operated, ground is removed from conductor 3601 and therefore relay 1300 is not operated and the sender proceeds to select an idle operator's position in the usual manner, for example, the circuit of Fig. 9.

Key 3600 also closes a circuit from battery through the winding of relay 3621, inner lower operated contact of key 3600, conductor 3623 through cable 3534, to ground at the third upper front contact of relay 2600. When relays 3520 and 3516 have operated, lamp 3535 is lighted over the lower back contact of relay 3531, outer upper front contacts of relays 3621, 3520 and 3516 to ground over conductor 3509. With key 3600 operated, the tip conductor 3413 is extended over the second upper front contact of relay 3504, outer lower contact of key 3600 to the upper left winding of repeat coil 4300, while ring conductor 3412 is extended over the inner upper front contact of relay 3504, inner upper operated contact of key 3600, to the lower left winding of coil 4300. The test telephone headset 4301 is connected to the right winding of coil 4300 over jack 4302 and receives talking battery through coil 4303.

When relays 1320 and 1321 in the sender operate, battery and ground through coil 1323 are connected over brushes 1314 and 1315 to the winding of relay 800 which operates and extends the ring conductor over the outer left back contact of relay 801 to the left winding of tone coil 802, the tip conductor already extending thereto through condenser 803 and over the outer right back contact of relay 801.

When the operator occupied this position the insertion of the plug of headset 804 in jack 805 operated relay 806. Therefore, when relay 800 operates it closes a circuit from ground through the winding of relay 807, left contact of relay 800, to battery at the inner left contact of relay 806. Relay 807 closes the primary circuit of tone coil 802 connecting tone to the tip and ring conductors. It also operates relay 809 which opens the tone circuit and operates relay 810. Relay 810 recloses the tone circuit and operates relay 811, which reopens the tone circuit and operates relay 801 which locks and connects the talking conductors through to the operator's headset.

The test man listens to the tones as transmitted through the sender and can request the "B" operator to operate keys or perform any function which she normally does on a regular service call.

When making these tests, key 2016 is operated to cause the test circuit to pass by all terminating senders.

Position circuit test

Position circuits may also be tested with this equipment and when it is desired to do so, two test men cooperate, one at the "B" position and one at the test frame. The "B" position circuits are tested by the test circuit in connection with a sender circuit. For this reason a sender is selected and given a routine test with the repeat key 2712 operated. After the sender has been tested, key 3608 is operated. When next, relay 3607 operates, a circuit is closed from battery through the winding of relay 3621, back contact of relay 3609, operated contact of key 3608, outer upper contact of relay 3607 to ground. With relay 3621 operated, the key pulsing conductors are connected toward brushes of the position finder 4310. The position finder is operated to connect with the desired position by operating key 3624 which connects ground to dial 4304. When the dial is moved off-normal ground is connected through resistance 4307, winding of relay 4305, resistance 4306 and battery but the relay is shunted by the interrupter contact of the dial. As the dial returns to normal this shunt is opened a number of times and relay 4305 is operated a corresponding number of times. Each operation of relay 4305 connects ground from key 3624 to stepping magnet 4317 to advance the switch 4310 to the desired position circuit.

When this position has been reached, key 3624 is opened and key 3625 closed. Key 3625 connects ground from conductor 3623, over the lower normal contact of key 3600, contacts of key 3625, winding of relay 4336 and battery. Relay 4336 connects ground over its middle lower contact and the upper normal contact of key 3626 to conductor 4320, lighting lamp 4332 over the back contact of relay 4321. It also connects ground over its inner upper front contact to the upper winding of relay 4337 and battery over its inner lower front contact to the lower winding of relay 4337. In addition relay 4336 connects the two windings of relay 4337 to brush 4313 and connects coil 4300 to brushes 4311 and 4312.

Figure 8:
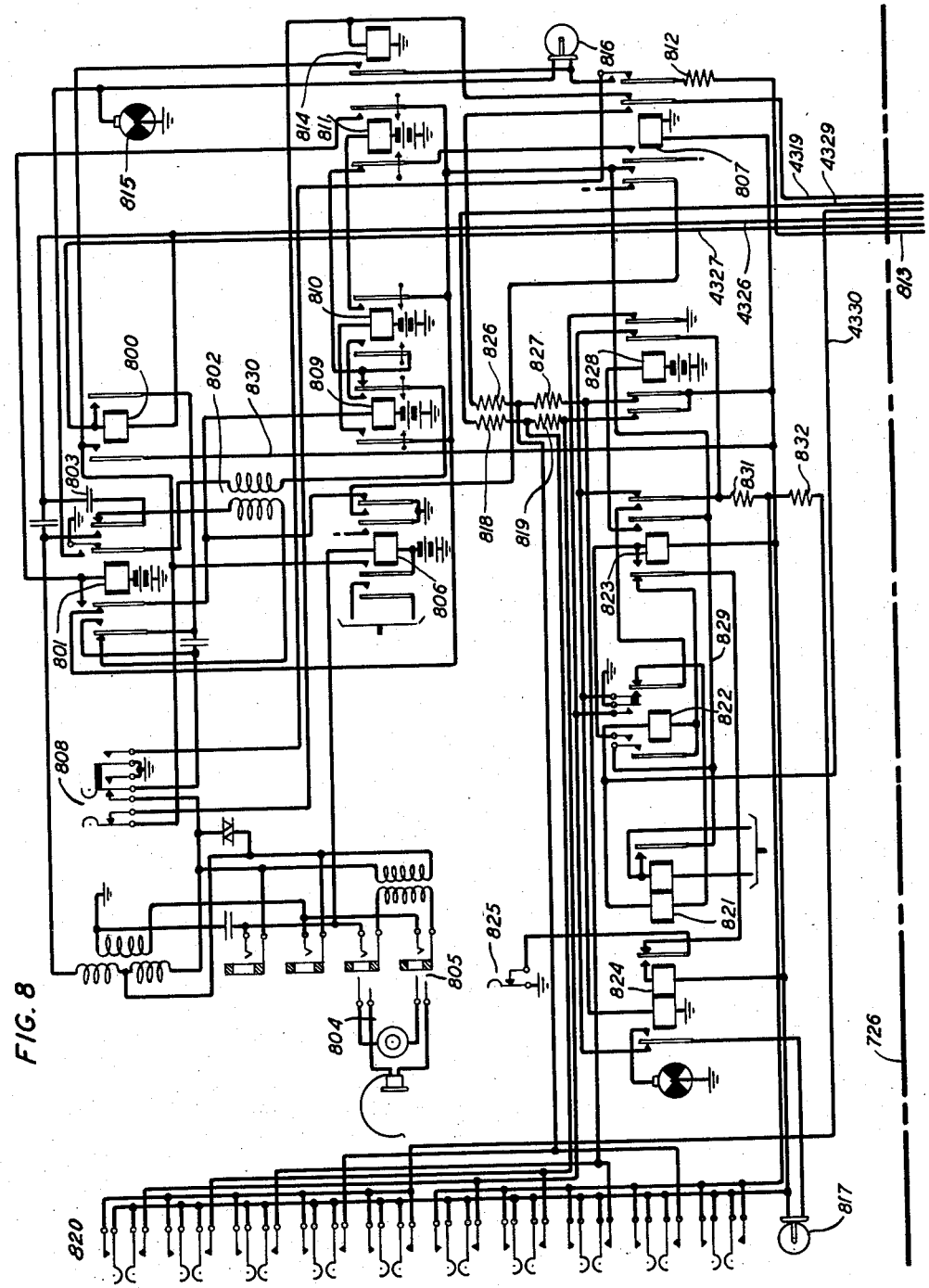
Fig. 8 shows a "B" operator's position circuit.

The test man at the B position inserts a headset in the telephone jacks of the selected position. Assuming that this is the position of Fig. 8, the insertion of headset 804 in jack 805 operates relay 806 as before. With relay 806 operated battery is connected over the inner left front contact of relay 806, left contact of key 808, right normal contact of relay 807, resistance 812, to conductor 813 which is connected to the terminal of brush 4313 and the junction between the windings of relay 4307. If the battery connection is satisfactory, relay 4307 operates and closes a circuit from ground at the middle lower contact of relay 4306, upper normal contact of key 3626, conductor 4320, right contact of relay 4337, winding of relay 4308 and battery. Relay 4308 locks to conductor 4320 and connects battery through resistance 4309, winding of relay 4318, back contact of relay 4339, lower back contact of relay 3627, outer lower contact of relay 4308, brush 4314, conductor 4319, inner right back contact of relay 807, winding of relay 814 to ground. Relay 814 operates, closing a circuit from ground through interrupter 815, lamp 816, contact of relay 814, to battery at the inner left contact of relay 806.

The man at the "B" position, observing the flashing lamp, operates key 808, which connects ground in shunt of the winding of relay 814. Relay 4318 which is marginal and did not operate in series with relay 814, now operates and closes an obvious circuit for relay 4321, which extinguishes lamp 4322 and closes a locking circuit through the winding of relay 4339, front contact of relay 4321 to ground over conductor 4320. When key 808 is released, relay 4319, operates. It connects battery through the lower winding of coil 4323, outer lower front contact of relay 4339, upper winding of differentially wound relay 4324, resistance 4325, inner lower front contact of relay 4308, lower normal contact of key 3626, third upper contact of relay 4306, brush 4311, conductor 4326, winding of relay 800, conductor 4327, brush 4312, outer upper contact of relay 4336, resistance 4328, lower winding of relay 4324, inner lower contact of relay 4339 to ground through the upper winding of coil 4323. Relay 800 in the position circuit operates, closing a circuit for lighting lamp 817 and initiates the transmission of the order tones as previously described, after which the talking circuit is established between the "B" position and the test circuit. When relay 807 operates, battery is disconnected from conductor 813 releasing relay 4337.

When lamp 817 lights, the test man again depresses key 808, which at its inner right contact connects ground over the outer left front contact of relay 801, right contact of relay 800 to conductor 4327 directly and through the winding of relay 800 to conductor 4326. With the current flow through relay 4324 thus unbalanced, that relay operates and closes a circuit from battery through the winding of relay 3627, front contact of relay 4324, outer upper front contact of relay 4308, left contact of relay 4337 to grounded conductor 4320. Relay 3627 operates, locks to conductor 4320 and extinguishes lamp 3628. With relay 3627 operated the pulsing conductors are extended to the position circuit. Conductor 3611 extends over the outer lower front contact of relay 3621, middle upper front contact of relay 3627, brush 4315, conductor 4329, through resistances 818 and 819 outer left back contact of relay 828 to battery over conductor 830 and the contacts of relays 800 and 806. Conductor 1332 extends over the middle lower front contact of relay 3621, inner lower front contact of relay 3627, brush 4316, conductor 4330, winding of relay 822, left back contact of relay 823, right back contact of relay 824 to ground at key 825. Conductor 1327 extends over the inner upper front contact of relay 3621, outer lower front contact of relay 3627, outer lower contact of relay 4308, brush 4314, conductor 4319, inner right front contact of relay 807, through resistances 826 and 827, inner left back contact of relay 828 to battery over conductor 830.

Relays 1502 and 1506 operate in turn operating relay 1503 as before which locks to conductors 3611 and 1327 and causes the operation of the transfer relays 1507 to 1512 and 1505. When the transfer relays have operated battery is connected to conductor 1333, operating relay 822 in the position circuit. Relay 822 locks over its outer left contact, conductor 829, outer left front contact of relay 807 to ground at the outer right contact of relay 806. Relay 822 also extends ground from conductor 829 over its inner left contact to the winding of relay 823 and battery over conductor 830. Relay 823 locks over its left front contact and the right back contact of relay 824 to ground on key 825. It also closes a circuit from battery through the winding of relay 828 to ground over conductor 829. Relay 828 disconnects battery from conductors 4319 and 4329, thereby releasing relays 1502, 1506 and 1503 in the sender. The release of relay 1503 operates relay 1513 which disconnects battery from conductor 1333, thereby releasing relay 822. Relays 1503 and 1513 connect ground to the circuits extending over conductor 1333. With relay 822 released lamp 817 is extinguished to indicate that the sender is ready. The release of relay 822 also extends conductor 1333, which is connected to conductor 4330, through the left winding of relay 821, right back contact of relay 822, outer right front contact of relay 823 through resistances 831 and 832 to the keyset 820. With relay 828 operated, the circuits above traced over conductors 4319 and 4329 also extend to the keyset 820.

The test man at the position can then proceed to set up on keyset 820 any number that the man at the test frame has set up on the test circuit keys of Figs. 32 and 39. At any time before the units digit is sent, the position reset key 825 may be operated, disconnecting ground from the locking circuit of relay 823 causing that relay and relay 828 to release and wipe out the registration in the sender. When the key is released the sender and position again prepare themselves for registration.

When the last digit has been recorded by the sender, the sender functions and opens the circuit of relay 3607, which releases. The test circuit and sender circuit then function to advance to normal after a check has been made of the registration. To release the position circuit, key 3626 is operated. This opens the circuit of relay 800, which releases, in turn, releasing relay 807 and other relays of the position circuit. Relay 807 again connects battery to conductor 813. Key 3626 also disconnects ground from conductor 4320, releasing relays 4321, 4339, 3627 and 4308. With these relays released and battery again connected to conductor 813, relay 4337 reoperates and the test circuit and position circuit continue to function as previously described when key 3626 is released.

Key 3629 of the test circuit may be operated to eliminate the operation of key 808 of the position circuit. When relay 4337 operates with key 3629 operated, relays 4321, 4339 and 3627 operate and the test circuit functions without operating key 808.

Repeat test

If it is desired to make a number of tests of the same sender, key 2712 is operated. With this key operated, the ground connected to conductor 3826 at the end of a test, extends over the back contact of relay 1906, conductor 1921, right normal contact of key 2713, left alternate contact of key 2712 to the winding of meter 2616 which records the number of repeated single tests which are made. Meter 2616 connects ground to conductor 2617, thereby grounding interrupter 2715. When interrupter 2715 closes its left contact it operates relay 2714 and when it closes its right contact it operates relay 2719 over the contact of relay 2714. Relays 2714 and 2719 both lock to conductor 2617.

Relay 2714 connects ground from conductor 2606 over the lower contact of relay 2714, upper left alternate contact of key 2712 to conductor 3031, which operates relay 3029 which in turn operates relay 3030 to cause the group of senders to be made busy. Relay 2719 which operates one second after relay 2714, connects ground over its upper contact, lower inner right alternate contact of key 2712 to the winding of relay 1908 and battery, operating that relay without operating relay 1914. Relay 1908 at its outer upper contact opens the locking circuit of relay 2012, causing that relay to release and restore the control circuits to normal, thereby removing ground from conductor 3826 and releasing meter 2616. With meter 2616 released, relays 2714, 2719 and 1908 release. Relay 2719 is made slow to release to hold relay 1908 operated until all of the relays under the control of the back contacts of relay 1908 release, before opening the circuit of relay 1908. With relay 1908 released a new test is started upon the same sender.

Repeat twice test

In order to test the same sender twice before advancing to the next sender, key 2713 is operated. With key 2713 operated, when conductor 3826 is grounded, the circuit extends over the upper back contact of relay 1906, conductor 1921, right alternate contact of key 2713, lower back contact of relay 2618, winding of relay 2720 and battery. Relay 2720 at its outer upper contact connects ground over the upper back contact of relay 2618 to conductor 2617 and thereby to interrupter 2715. As above described the interrupter operates relays 2714, 2719 and 1908. Relay 1908 restores the test circuit as usual, causing the removal of ground from conductor 3826.

Relay 2720 in operating closed a circuit from battery through its winding and the lower winding of relay 2618, lower front contact of relay 2720, outer upper back contact of relay 2601 to ground at the outer lower front contact of relay 2605. When ground is removed from conductor 3826, relay 2618 operates. Relays 2714, 2719 and 1908 release and cause a new test to be started on the same sender. Relay 2720 connects ground over its inner upper contact, conductor 2721, through cable 2710, which would lock relay 3711 and block the test if the sender were slow in releasing.

At the conclusion of the second test, ground on conductor 3826 is extended as before to conductor 1921, right alternate contact of key 2713, upper front contact and winding of relay 2618 to battery and over the lower front contact of relay 2618, lower inner left normal contact of key 2712, winding of meter 2611 and battery. Meter 2611 operates relays 1914 and 1908 which release relay 2605. Relay 2605 opens the locking circuit of relay 2720 through the winding of relay 2618 and relay 2720 releases, but relay 2618 is held in the subsequently traced locking circuit. When ground is removed from conductor 3826, relay 2618 also releases as well as meter 2611 and relays 1908 and 1914 causing the advance to another sender.

Automatic pass busy feature

If it is desired merely to test those senders which are idle, key 1919 may be operated. With this key operated the test circuit waits for a measured length of time and then advances to the next sender.

When relay 2600 operates, it closes ground over conductor 2609, outer upper contact of relay 1908, conductor 3001 through cable 3002, left back contact of relay 3000, conductor 2602 through cable 2603, outer lower back contact of relay 2601, conductor 2604, inner right contact of key 1907, conductor 1911 to interrupter 1902. Interrupter 1902 operates relay 1903 which locks and closes a circuit for relay 1904 to conductor 1911. When the interrupter opens, relay 1904 operates. At the next interrupter closure relay 1903 is shunted and released, closing a circuit from ground on conductor 2604, outer right contact of key 1907, front contact of relay 1904, back contact of relay 1903, winding of relay 1905 and battery. Relay 1905 locks to conductor 1911 and closes a circuit from battery through the upper winding of relay 1918, middle upper contact of relay 1905, conductor 1922 through cable 2603, right front contact of relay 3701 which is held operated if the sender is busy, outer left front contact of relay 3704, conductor 3006 through cable 2710, inner lower contact of relay 2008 to grounded conductor 2606. Relay 1918 locks in a circuit from battery through its lower winding and lower front contact, outer upper contact of relay 1908 to grounded conductor 2609. With key 1919 operated, relay 1918 closes a circuit from ground at the outer lower front contact of relay 2605, outer upper back contact of relay 2601, lower back contact of relay 2720, outer upper contact of relay 1918, key 1919, outer left normal contact of key 2712 to the winding of pass busy meter 2615. Meter 2615 connects ground to relay 1914 which advances the test circuit to the next sender in the usual manner.

If key 1919 is not operated, the next operation of relays 1903 and 1904, operates relay 1906 which lights lamp 1923 and grounds conductor 1912 to sound an alarm. Relay 1918 and meter 2615 may also be operated under the control of the sender group test circuit.

Particular circuit selection

In order to pick a particular sender for test, key 2619 is first operated to select the proper level. With key 2619 operated a circuit is closed from ground over the inner lower contact of the key, through the winding of relay 2620 and battery. Relay 2620 operates and locks over its lower front contact, normal contact of relay 2600, to ground over conductor 2002. Relay 2620 closes a circuit from ground at the outer left contact of key 1915, upper contact of relay 2620, normal contacts of relays 2605, 1914 and 1908 to the normal contact and winding of relay 2000. Relay 2000 locks to conductor 2002 and closes a circuit for relay 2004 which cannot operate, being shunted by the operating circuit of relay 2000. With relay 2000 operated the first sender is selected as previously described and relay 2605 is operated.

With relay 2605 operated, ground is connected from ground at the inner lower back contact of relay 2600, upper contact of key 2619, third upper front contact of relay 2605 to the winding of relay 1914 and battery. Relay 1914 operates relay 1908 and releases relay 2605 which in turn releases relays 1914 and 1908. Relay 1908 in operating and releasing permits relay 3004 to operate and then releases relay 2000 to select the next sender. When relay 2000 releases to close the circuit for the odd hold magnet a circuit is closed from grounded conductor 1916, outer upper back contact of relay 2000, conductor 2025, upper back contact of relay 2600, outer lower contact of key 2619, to the winding of relay 2700 and battery. Relay 2700 locks to conductor 2025, removes ground from start key 1900 and closes at its inner lower front contact a connection from ground at the inner lower back contact of relay 2600 to the third upper armature of relay 2605 so that the release of key 2619 will not block the advance.

When relay 2000 next operates, relay 2006 is operated over the outer lower front contact of relay 2700, and the odd hold magnet and relay 2700 are released, causing the advance to the next sender in the usual manner. The advance to the next level is as previously described. This operation continues as long as key 2619 is held operated.

Since each select relay, as it operates, closes a local circuit for the corresponding lamp and relays 1810 to 2519 close similar circuits individual to the horizontal magnets, by watching the lamps, it may be determined when the test circuit nears the desired sender.

At this time key 2619 is released. Key 2621 is now operated, closing a circuit from battery through resistance 2607, upper contact of key 2621, lower normal contact of relay 2600, second upper front contact of relay 2605 to the winding of relay 2613 and ground. Relay 2613 locks over its right contact, normal contact of relay 2600 and contact of key 2621 to battery. At its left contact it closes a circuit for relay 1914 which operates, operates relay 1908 and releases relay 2605.

When key 2621 is released, relays 2613, 1914 and 1908 release and cause the test circuit to advance to the next sender. This operation is repeated until the desired sender has been selected.

If key 2621 is operated while no sender is connected to the test circuit, the circuit of relay 2613 extends over the lower back contact of relay 2620 to the normal contact of relay 2600, over key 2621 to battery. As usual, relay 2613 operates relay 1914 which operates relay 1908. With relay 1908 operated, a circuit is closed from battery through the winding of relay 2620, lower front contact of relay 1908, to ground at the lower contact of key 2621. Relay 2620 locks under the control of relay 2600. When key 2621 is released the first sender is selected. Subsequent operation of key 2621 will advance the cross-bar switch one step at a time.

When key 1900 is operated, in turn operating relay 2600 to start testing, relay 2605 is operated and prevents stepping to the next sender until the test is completed.

What is claimed is:

1. In a telephone system a plurality of register senders, a sender test circuit, a cross-bar switch for connecting said test circuit with any one of said register senders, said switch having a plurality of cross-points controlled by a plurality of hold magnets and a plurality of select magnets, and means in said test circuit to successively operate said select magnets and to successively and repeatedly operate said hold magnets to select said senders for test.

2. In a telephone system a plurality of register senders, a sender test circuit, a cross-bar switch for connecting said test circuit with any one of said register senders, said switch having a plurality of cross-points controlled by a plurality of hold magnets and a plurality of select magnets, means in said test circuit to operate any one of said select magnets and any one of said hold magnets to select a sender for test, means for testing said sender and means responsive to the completion of said test for operating a succeeding hold magnet to select another sender for test.

3. In a telephone system a plurality of register senders, a sender test circuit, a cross-bar switch for connecting said test circuit with any one of said register senders, said switch having a plurality of cross-points controlled by a plurality of hold magnets and a plurality of select magnets, means in said test circuit to operate any one of said select magnets and any one of said hold magnets to select a sender for test, means for testing said sender and means under the control of the operated hold magnet for operating a succeeding hold magnet to select another sender for test.

4. In a telephone system a plurality of register senders, a sender test circuit, a cross-bar switch for connecting said test circuit with any one of said register senders, said switch having a plurality of cross-points controlled by a plurality of hold magnets and a plurality of select magnets, means in said test circuit to operate any one of said select magnets and any one of said hold magnets to select a sender for test, means for testing said sender and means under the control of the operated hold magnet responsive to the completion of said test for operating another hold magnet to select another sender for test.

5. In a telephone system a plurality of register senders, a sender test circuit, a cross-bar switch for connecting said test circuit with any one of said register senders, said switch having a plurality of cross-points controlled by a plurality of hold magnets and a plurality of select magnets, means in said test circuit to operate any one of said select magnets and any one of said hold magnets to select a sender for test, means for testing said sender, means under the control of the operated hold magnet responsive to the completion of said test for operating another hold magnet to select another sender for test, and means responsive to the operation of said other hold magnet to release said previously operated hold magnet.

6. In a telephone system a plurality of register senders, a sender test circuit, a cross-bar switch for connecting said test circuit with said register senders, said cross-bar switch operated by a series of select magnets and a series of hold magnets, means in said test circuit to operate a select magnet and a hold magnet to connect a sender with said test circuit, means responsive to the completion of a test and controlled by the operated hold magnet to operate the next hold magnet in said series, and means responsive to the operation of the last hold magnet of said series to operate the next select magnet of the series and the first hold magnet of said series.

7. In a telephone system a plurality of register senders, a sender test circuit, a cross-bar switch for connecting said test circuit with said register senders, said cross-bar switch operated by a series of select magnets and a series of hold magnets, means for progressively testing said senders comprising means to operate one select magnet of said series, means to successively and repeatedly operate said series of hold magnets in response to the completion of tests and means responsive to each operation of the last hold magnet in said series to successively operate the select magnets of said series.

8. In a telephone system a plurality of register senders, a plurality of control circuits, a connector for connecting any one of said senders with any one of said control circuits, a sender test circuit, means in said test circuit for selecting a sender for test, means for identifying said selected sender in said connector, means responsive to the test of said sender for connecting said sender with one of said control circuits and means responsive to the connection of said sender with said control circuit for causing said connected control circuit to connect itself with said test circuit.

9. In a telephone system a plurality of register senders, a plurality of control circuits, a connector having a set of terminals for each sender and each control circuit and means for operating said terminals to connect any sender with any control circuit, a sender test circuit, means in said test circuit for selecting a sender for test, means to identify the set of terminals individual to the selected sender in said connector, means responsive to the test of said sender for connecting said sender with one of said control circuits, means in said control circuit for connecting said control circuit with said test circuit and means responsive to the connection of said sender with said control circuit for operating said control circuit connecting means.

10. In a telephone system a plurality of register senders, a plurality of markers, a connector for connecting said senders to said markers, a sender test circuit, means in said test circuit for selecting a sender for test, means to set up a registration in said sender, means in said sender responsive to said registration to cause said connector to connect said sender with a marker, means responsive to said connection to transfer said registration to said marker, means in said marker normally responsive to said registration to perform a switch controlling operation, means in said test circuit to identify the selected sender in said connector, and means in said marker responsive to said identification to connect said marker with said test circuit and to disable said switch controlling function.

11. In a telephone system, senders arranged in groups, a link circuit for seizing said senders for service connections, including a group circuit individual to each group of senders, said group circuit comprising a sender busy relay for each sender and means for indicating the number of idle senders in the group, a sender test circuit, means for connecting said test circuit with any desired sender, means for testing whether said sender is busy or idle, means for connecting said test circuit with said link circuit and means to control said sender through said link circuit to mark said sender busy to a service connection.

12. In a telephone system, a registering device, means in said registering device to simultaneously transmit revertive pulses to a distant selection control device and to establish a corresponding registration in said registering device, a switch controlling device, means for connecting said registering device with said switch controlling device, means for transferring said registration to said switch controlling device, a test circuit, means for connecting said test circuit with said registering device, means in said test circuit responsive to revertive pulses to control the establishment of a registration in said registering device, means for connecting said test circuit with said switch controlling device and means in said test circuit for recording said transferred registration.

13. In a telephone system, a registering device, means in said registering device to simultaneously transmit revertive pulses to a distant selection control device and to establish a corresponding registration in said registering device, a switch controlling device, means for connecting said registering device with said switch controlling device, means for transferring said registration to said switch controlling device, a test circuit, means for connecting said test circuit with said registering device, means in said test circuit responsive to revertive pulses to control the establishment of a registration in said registering device, means for connecting said test circuit with said switch controlling device, means in said test circuit for recording said transferred registration, and means for comparing said transferred registation with the registration established in said registering device.

14. In a telephone system, senders arranged in groups, a link circuit for seizing said senders for service connections including a group circuit individual to each group of senders, said group circuit comprising a relay for each sender and chain circuits controlled by said relays for permitting the selection of one of the senders of said group, a test circuit, means to connect said test circuit with said link circuit and with a particular group circuit, means in said test circuit operated over said chain circuits, and means to prevent the advance of the test if said last-mentioned means fails to operate.

15. In a telephone system, senders arranged in groups, a link circuit for seizing said senders for service connections including a group circuit individual to each group of senders, said group circuit comprising a relay for each sender and chain circuits controlled by said relays for permitting the selection of one of the senders of said group, a test circuit, means to connect said test circuit with said link circuit and with a particular group circuit, relays in said test circuit operated over said chain circuits, means to prevent the progress of the test if said relays fail to operate, and means to prevent the progress of the test if said relays fail to release following the selection of a sender.

JOSEPH W. DEHN.